US012689855B2

(12) United States Patent
Shumard

(10) Patent No.: US 12,689,855 B2
(45) Date of Patent: Jul. 21, 2026

(54) MULTI-DIMENSIONAL ARRAY MICROPHONE

(71) Applicant: Shure Acquisition Holdings, Inc., Niles, IL (US)

(72) Inventor: Brent Robert Shumard, Mount Prospect, IL (US)

(73) Assignee: Shure Acquisition Holdings, Inc., Niles, IL (US)

(*) Notice: Subject to any disclaimer, the term of this patent is extended or adjusted under 35 U.S.C. 154(b) by 166 days.

(21) Appl. No.: 18/648,033

(22) Filed: Apr. 26, 2024

(65) Prior Publication Data

US 2024/0381022 A1 Nov. 14, 2024

Related U.S. Application Data

(60) Provisional application No. 63/501,998, filed on May 12, 2023.

(51) Int. Cl.
*H04R 1/26* (2006.01)
*H04R 1/40* (2006.01)

(52) U.S. Cl.
CPC ............. *H04R 1/265* (2013.01); *H04R 1/406* (2013.01); *H04R 2201/003* (2013.01);
(Continued)

(58) Field of Classification Search
CPC .. H04R 1/265; H04R 1/406; H04R 2201/003; H04R 2201/401; H04R 2201/403; H04R 2201/405; H04R 2203/12
See application file for complete search history.

(56) References Cited

U.S. PATENT DOCUMENTS 1,535,408 A 4/1925 Fricke
1,540,788 A 6/1925 Mcclure
(Continued)

FOREIGN PATENT DOCUMENTS

AU 2004200802 3/2004
BE 775247 3/1972
(Continued)

OTHER PUBLICATIONS

"Philips Hue Bulbs and Wireless Connected Lighting System," Web page https://www.philips-hue.com/en-in, 8 pp, Sep. 23, 2020, retrieved from Internet Archive Wayback Machine, <https://web.archive.org/web/20200923171037/https://www.philips-hue.com/en-in> on Sep. 27, 2021. 8 pages.
(Continued)

*Primary Examiner* — Jason R Kurr
(74) *Attorney, Agent, or Firm* — ALSTON & BIRD LLP

(57) ABSTRACT

Embodiments include an array microphone, comprising: a plurality of microphone boards arranged in a linear pattern along a first axis and comprising a plurality of microphone elements configured to cover a plurality of frequency bands, each microphone board comprising: a first linear array comprising a first microphone element of the plurality of microphone elements and one or more second microphone elements of the plurality of microphone elements, the first microphone element located on the first axis and the one or more second microphone elements located on a second axis orthogonal to the first axis, and a second linear array comprising the first microphone element and one or more third microphone elements of the plurality of microphone elements, the one or more third microphone elements located on a third axis orthogonal to the first axis and to the second axis.

15 Claims, 9 Drawing Sheets

(52) U.S. Cl.
CPC .. *H04R 2201/401* (2013.01); *H04R 2201/403* (2013.01); *H04R 2201/405* (2013.01); *H04R 2203/12* (2013.01)

(56) References Cited

U.S. PATENT DOCUMENTS

| | | | |
|---|---|---|---|
| 1,965,830 | A | 7/1934 | Hammer |
| 2,075,588 | A | 3/1937 | Meyers |
| 2,113,219 | A | 4/1938 | Olson |
| 2,164,655 | A | 7/1939 | Kleerup |
| D122,771 | S | 10/1940 | Doner |
| 2,233,412 | A | 3/1941 | Hill |
| 2,268,529 | A | 12/1941 | Stiles |
| 2,343,037 | A | 2/1944 | William, I |
| 2,377,449 | A | 6/1945 | Prevette |
| 2,481,250 | A | 9/1949 | Schneider |
| 2,521,603 | A | 9/1950 | Prew |
| 2,533,565 | A | 12/1950 | Eichelman |
| 2,539,671 | A | 1/1951 | Olson |
| 2,777,232 | A | 1/1957 | Kulicke |
| 2,828,508 | A | 4/1958 | Labarre |
| 2,840,181 | A | 6/1958 | Wildman |
| 2,882,633 | A | 4/1959 | Howell |
| 2,912,605 | A | 11/1959 | Tibbetts |
| 2,938,113 | A | 5/1960 | Schnell |
| 2,950,556 | A | 8/1960 | Larios |
| 3,019,854 | A | 2/1962 | Obryant |
| 3,132,713 | A | 5/1964 | Seeler |
| 3,143,182 | A | 8/1964 | Sears |
| 3,160,225 | A | 12/1964 | Sechrist |
| 3,161,975 | A | 12/1964 | Mcmillan |
| 3,205,601 | A | 9/1965 | Gawne |
| 3,239,973 | A | 3/1966 | Hannes |
| 3,240,883 | A | 3/1966 | Seeler |
| 3,310,901 | A | 3/1967 | Sarkisian |
| 3,321,170 | A | 5/1967 | Vye |
| 3,509,290 | A | 4/1970 | Mochida |
| 3,573,399 | A | 4/1971 | Schroeder |
| 3,657,490 | A | 4/1972 | Scheiber |
| 3,696,885 | A | 10/1972 | Grieg |
| 3,699,271 | A | 10/1972 | Berkley |
| 3,755,625 | A | 8/1973 | Maston |
| 3,828,508 | A | 8/1974 | Moeller |
| 3,857,191 | A | 12/1974 | Sadorus |
| 3,895,194 | A | 7/1975 | Fraim |
| 3,906,431 | A | 9/1975 | Clearwaters |
| D237,103 | S | 10/1975 | Fisher |
| 3,936,606 | A | 2/1976 | Wanke |
| 3,938,617 | A | 2/1976 | Forbes |
| 3,941,638 | A | 3/1976 | Horky |
| 3,992,584 | A | 11/1976 | Dugan |
| 4,007,461 | A | 2/1977 | Luedtke |
| 4,008,408 | A | 2/1977 | Kodama |
| 4,029,170 | A | 6/1977 | Phillips |
| 4,032,725 | A | 6/1977 | Mcgee |
| 4,070,547 | A | 1/1978 | Dellar |
| 4,072,821 | A | 2/1978 | Bauer |
| 4,096,353 | A | 6/1978 | Bauer |
| 4,127,156 | A | 11/1978 | Brandt |
| 4,131,760 | A | 12/1978 | Christensen |
| 4,169,219 | A | 9/1979 | Beard |
| 4,184,048 | A | 1/1980 | Alcaide |
| 4,198,705 | A | 4/1980 | Massa |
| D255,234 | S | 6/1980 | Wellward |
| D256,015 | S | 7/1980 | Doherty |
| 4,212,133 | A | 7/1980 | Lufkin |
| 4,237,339 | A | 12/1980 | Bunting |
| 4,244,096 | A | 1/1981 | Kashichi |
| 4,244,906 | A | 1/1981 | Heinemann |
| 4,254,417 | A | 3/1981 | Speiser |
| 4,275,694 | A | 6/1981 | Nagaishi |
| 4,296,280 | A | 10/1981 | Richie |
| 4,305,141 | A | 12/1981 | Massa |
| 4,308,425 | A | 12/1981 | Momose |
| 4,311,874 | A | 1/1982 | Wallace, Jr. |
| 4,330,691 | A | 5/1982 | Gordon |
| 4,334,740 | A | 6/1982 | Wray |
| 4,365,449 | A | 12/1982 | Liautaud |
| 4,373,191 | A | 2/1983 | Fette |
| 4,393,631 | A | 7/1983 | Krent |
| 4,414,433 | A | 11/1983 | Horie |
| 4,429,850 | A | 2/1984 | Weber |
| 4,436,966 | A | 3/1984 | Botros |
| 4,449,238 | A | 5/1984 | Lee |
| 4,466,117 | A | 8/1984 | Rudolf |
| 4,485,484 | A | 11/1984 | Flanagan |
| 4,489,442 | A | 12/1984 | Anderson |
| 4,518,826 | A | 5/1985 | Caudill |
| 4,521,908 | A | 6/1985 | Miyaji |
| 4,566,557 | A | 1/1986 | Lemaitre |
| 4,593,404 | A | 6/1986 | Bolin |
| 4,594,478 | A | 6/1986 | Gumb |
| D285,067 | S | 8/1986 | Delbuck |
| 4,625,827 | A | 12/1986 | Bartlett |
| 4,653,102 | A | 3/1987 | Hansen |
| 4,658,425 | A | 4/1987 | Julstrom |
| 4,669,108 | A | 5/1987 | Deinzer |
| 4,675,906 | A | 6/1987 | Sessler |
| 4,693,174 | A | 9/1987 | Anderson |
| 4,696,043 | A | 9/1987 | Iwahara |
| 4,712,231 | A | 12/1987 | Julstrom |
| 4,741,038 | A | 4/1988 | Elko |
| 4,752,961 | A | 6/1988 | Kahn |
| 4,768,086 | A | 8/1988 | Paist |
| 4,805,730 | A | 2/1989 | O'Neill |
| 4,815,132 | A | 3/1989 | Minami |
| 4,860,366 | A | 8/1989 | Fukushi |
| 4,862,507 | A | 8/1989 | Woodard |
| 4,866,868 | A | 9/1989 | Kass |
| 4,881,135 | A | 11/1989 | Heilweil |
| 4,888,807 | A | 12/1989 | Reichel |
| 4,903,247 | A | 2/1990 | Van Gerwen |
| 4,923,032 | A | 5/1990 | Nuernberger |
| 4,928,312 | A | 5/1990 | Hill |
| 4,969,197 | A | 11/1990 | Takaya |
| 5,000,286 | A | 3/1991 | Crawford |
| 5,038,935 | A | 8/1991 | Wenkman |
| 5,058,170 | A | 10/1991 | Kanamori |
| 5,088,574 | A | 2/1992 | Kertesz, III |
| D324,780 | S | 3/1992 | Sebesta |
| 5,121,426 | A | 6/1992 | Baumhauer |
| D329,239 | S | 9/1992 | Hahn |
| 5,189,701 | A | 2/1993 | Jain |
| 5,204,907 | A | 4/1993 | Staple |
| 5,214,709 | A | 5/1993 | Ribic |
| 5,224,170 | A | 6/1993 | Waite, Jr. |
| D340,718 | S | 10/1993 | Leger |
| 5,289,544 | A | 2/1994 | Franklin |
| D345,346 | S | 3/1994 | Alfonso |
| D345,379 | S | 3/1994 | Chan |
| 5,297,210 | A | 3/1994 | Julstrom |
| 5,322,979 | A | 6/1994 | Cassity |
| 5,323,459 | A | 6/1994 | Hirano |
| 5,329,593 | A | 7/1994 | Lazzeroni |
| 5,335,011 | A | 8/1994 | Addeo |
| 5,353,279 | A | 10/1994 | Koyama |
| 5,359,374 | A | 10/1994 | Schwartz |
| 5,371,789 | A | 12/1994 | Hirano |
| 5,383,293 | A | 1/1995 | Royal |
| 5,384,843 | A | 1/1995 | Masuda |
| 5,396,554 | A | 3/1995 | Hirano |
| 5,400,413 | A | 3/1995 | Kindel |
| D363,045 | S | 10/1995 | Phillips |
| 5,473,701 | A | 12/1995 | Cezanne |
| 5,509,634 | A | 4/1996 | Gebka |
| 5,513,265 | A | 4/1996 | Hirano |
| 5,525,765 | A | 6/1996 | Freiheit |
| 5,550,924 | A | 8/1996 | Helf |
| 5,550,925 | A | 8/1996 | Hori |
| 5,555,447 | A | 9/1996 | Kotzin |
| 5,574,793 | A | 11/1996 | Hirschhorn |
| 5,602,962 | A | 2/1997 | Kellermann |
| 5,612,929 | A | 3/1997 | Lopes |
| 5,633,936 | A | 5/1997 | Oh |

(56) References Cited

U.S. PATENT DOCUMENTS

| | | | |
|---|---|---|---|
| 5,645,257 | A | 7/1997 | Ward |
| D382,118 | S | 8/1997 | Ferrero |
| 5,657,393 | A | 8/1997 | Crow |
| 5,661,813 | A | 8/1997 | Shimauchi |
| 5,673,327 | A | 9/1997 | Julstrom |
| 5,687,229 | A | 11/1997 | Sih |
| 5,706,344 | A | 1/1998 | Finn |
| 5,715,319 | A | 2/1998 | Chu |
| 5,717,171 | A | 2/1998 | Miller |
| D392,977 | S | 3/1998 | Kim |
| D394,061 | S | 5/1998 | Fink |
| 5,761,318 | A | 6/1998 | Shimauchi |
| 5,766,702 | A | 6/1998 | Lin |
| 5,787,183 | A | 7/1998 | Chu |
| 5,796,819 | A | 8/1998 | Romesburg |
| 5,848,146 | A | 12/1998 | Slattery |
| 5,870,482 | A | 2/1999 | Loeppert |
| 5,878,147 | A | 3/1999 | Killion |
| 5,888,412 | A | 3/1999 | Sooriakumar |
| 5,888,439 | A | 3/1999 | Miller |
| D416,315 | S | 11/1999 | Nanjo |
| 5,978,211 | A | 11/1999 | Hong |
| 5,991,277 | A | 11/1999 | Maeng |
| 6,035,962 | A | 3/2000 | Lin |
| 6,039,457 | A | 3/2000 | O'Neal |
| 6,041,127 | A | 3/2000 | Elko |
| 6,049,607 | A | 4/2000 | Marash |
| D424,538 | S | 5/2000 | Hayashi |
| 6,069,961 | A | 5/2000 | Nakazawa |
| 6,125,179 | A | 9/2000 | Wu |
| D432,518 | S | 10/2000 | Muto |
| 6,128,395 | A | 10/2000 | De Vries |
| 6,137,887 | A | 10/2000 | Anderson |
| 6,144,746 | A | 11/2000 | Azima |
| 6,151,399 | A | 11/2000 | Killion |
| 6,173,059 | B1 | 1/2001 | Huang |
| 6,198,831 | B1 | 3/2001 | Azima |
| 6,205,224 | B1 | 3/2001 | Underbrink |
| 6,215,881 | B1 | 4/2001 | Azima |
| 6,266,427 | B1 | 7/2001 | Mathur |
| 6,285,770 | B1 | 9/2001 | Azima |
| 6,301,357 | B1 | 10/2001 | Romesburg |
| 6,329,908 | B1 | 12/2001 | Frecska |
| 6,332,029 | B1 | 12/2001 | Azima |
| D453,016 | S | 1/2002 | Nevill |
| 6,386,315 | B1 | 5/2002 | Roy |
| 6,393,129 | B1 | 5/2002 | Conrad |
| 6,424,635 | B1 | 7/2002 | Song |
| 6,442,272 | B1 | 8/2002 | Osovets |
| 6,449,593 | B1 | 9/2002 | Valve |
| 6,481,173 | B1 | 11/2002 | Roy |
| 6,488,367 | B1 | 12/2002 | Debesis |
| D469,090 | S | 1/2003 | Tsuji |
| 6,505,057 | B1 | 1/2003 | Finn |
| 6,507,659 | B1 | 1/2003 | Iredale |
| 6,510,919 | B1 | 1/2003 | Roy |
| 6,526,147 | B1 | 2/2003 | Rung |
| 6,556,682 | B1 | 4/2003 | Gilloire |
| 6,592,237 | B1 | 7/2003 | Pledger |
| 6,622,030 | B1 | 9/2003 | Romesburg |
| D480,923 | S | 10/2003 | Neubourg |
| 6,633,647 | B1 | 10/2003 | Markow |
| 6,665,971 | B2 | 12/2003 | Lowry |
| 6,694,028 | B1 | 2/2004 | Matsuo |
| 6,704,422 | B1 | 3/2004 | Jensen |
| D489,707 | S | 5/2004 | Kobayashi |
| 6,731,334 | B1 | 5/2004 | Maeng |
| 6,741,720 | B1 | 5/2004 | Myatt |
| 6,757,393 | B1 | 6/2004 | Spitzer |
| 6,768,795 | B2 | 7/2004 | Jimen |
| 6,868,377 | B1 | 3/2005 | Laroche |
| 6,885,750 | B2 | 4/2005 | Egelmeers |
| 6,885,986 | B1 | 4/2005 | Gigi |
| D504,889 | S | 5/2005 | Andre |
| 6,889,183 | B1 | 5/2005 | Gunduzhan |
| 6,895,093 | B1 | 5/2005 | Ali |
| 6,931,123 | B1 | 8/2005 | Hughes |
| 6,944,312 | B2 | 9/2005 | Mason |
| D510,729 | S | 10/2005 | Chen |
| 6,968,064 | B1 | 11/2005 | Ning |
| 6,990,193 | B2 | 1/2006 | Beaucoup |
| 6,993,126 | B1 | 1/2006 | Kyrylenko |
| 6,993,145 | B2 | 1/2006 | Combest |
| 7,003,099 | B1 | 2/2006 | Zhang |
| 7,013,267 | B1 | 3/2006 | Huart |
| 7,031,269 | B2 | 4/2006 | Lee |
| 7,035,398 | B2 | 4/2006 | Matsuo |
| 7,035,415 | B2 | 4/2006 | Belt |
| 7,050,576 | B2 | 5/2006 | Zhang |
| 7,054,451 | B2 | 5/2006 | Janse |
| D526,643 | S | 8/2006 | Ishizaki |
| D527,372 | S | 8/2006 | Allen |
| 7,092,516 | B2 | 8/2006 | Furuta |
| 7,092,882 | B2 | 8/2006 | Arrowood |
| 7,098,865 | B2 | 8/2006 | Christensen |
| 7,106,876 | B2 | 9/2006 | Santiago |
| 7,110,553 | B1 | 9/2006 | Julstrom |
| 7,120,269 | B2 | 10/2006 | Lowell |
| 7,130,309 | B2 | 10/2006 | Boaz |
| D533,177 | S | 12/2006 | Andre |
| 7,149,320 | B2 | 12/2006 | Haykin |
| 7,161,534 | B2 | 1/2007 | Tsai |
| 7,187,765 | B2 | 3/2007 | Popovic |
| 7,203,308 | B2 | 4/2007 | Kubota |
| D542,543 | S | 5/2007 | Bruce |
| 7,212,628 | B2 | 5/2007 | Mirjana |
| D546,318 | S | 7/2007 | Yoon |
| D546,814 | S | 7/2007 | Takita |
| D547,748 | S | 7/2007 | Tsuge |
| 7,239,714 | B2 | 7/2007 | De Blok |
| D549,673 | S | 8/2007 | Niitsu |
| 7,269,263 | B2 | 9/2007 | Dedieu |
| D552,570 | S | 10/2007 | Niitsu |
| D559,553 | S | 1/2008 | Mischel |
| 7,333,476 | B2 | 2/2008 | LeBlanc |
| D566,685 | S | 4/2008 | Koller |
| 7,359,504 | B1 | 4/2008 | Reuss |
| 7,366,310 | B2 | 4/2008 | Stinson |
| 7,387,151 | B1 | 6/2008 | Payne |
| 7,412,376 | B2 | 8/2008 | Florencio |
| 7,415,117 | B2 | 8/2008 | Tashev |
| D578,509 | S | 10/2008 | Thomas |
| D581,510 | S | 11/2008 | Albano |
| D582,391 | S | 12/2008 | Morimoto |
| D587,709 | S | 3/2009 | Niitsu |
| D589,605 | S | 3/2009 | Reedy |
| 7,503,616 | B2 | 3/2009 | Linhard |
| 7,515,719 | B2 | 4/2009 | Hooley |
| 7,536,769 | B2 | 5/2009 | Pedersen |
| D595,402 | S | 6/2009 | Miyake |
| D595,736 | S | 7/2009 | Son |
| 7,558,381 | B1 | 7/2009 | Ali |
| 7,561,700 | B1 | 7/2009 | Bernardi |
| 7,565,949 | B2 | 7/2009 | Tojo |
| D601,585 | S | 10/2009 | Andre |
| 7,651,390 | B1 | 1/2010 | Profeta |
| 7,660,428 | B2 | 2/2010 | Rodman |
| 7,667,728 | B2 | 2/2010 | Kenoyer |
| 7,672,445 | B1 | 3/2010 | Zhang |
| D613,338 | S | 4/2010 | Marukos |
| 7,701,110 | B2 | 4/2010 | Fukuda |
| 7,702,116 | B2 | 4/2010 | Stone |
| D614,871 | S | 5/2010 | Tang |
| 7,724,891 | B2 | 5/2010 | Beaucoup |
| D617,441 | S | 6/2010 | Koury |
| 7,747,001 | B2 | 6/2010 | Kellermann |
| 7,756,278 | B2 | 7/2010 | Moorer |
| 7,783,063 | B2 | 8/2010 | Pocino |
| 7,787,328 | B2 | 8/2010 | Chu |
| 7,830,862 | B2 | 11/2010 | James |
| 7,831,035 | B2 | 11/2010 | Stokes |
| 7,831,036 | B2 | 11/2010 | Beaucoup |
| 7,856,097 | B2 | 12/2010 | Tokuda |
| 7,881,486 | B1 | 2/2011 | Killion |

(56) References Cited

U.S. PATENT DOCUMENTS 7,894,421 B2 2/2011 Kwan
D636,188 S 4/2011 Kim
7,925,006 B2 4/2011 Hirai
7,925,007 B2 4/2011 Stokes
7,936,886 B2 5/2011 Kim
7,970,123 B2 6/2011 Beaucoup
7,970,151 B2 6/2011 Oxford
D642,385 S 8/2011 Lee
D643,015 S 8/2011 Kim
7,991,167 B2 8/2011 Oxford
7,995,768 B2 8/2011 Miki
8,000,481 B2 8/2011 Nishikawa
8,005,238 B2 8/2011 Tashev
8,019,091 B2 9/2011 Burnett
8,041,054 B2 10/2011 Yeldener
8,059,843 B2 11/2011 Hung
8,064,629 B2 11/2011 Jiang
8,085,947 B2 12/2011 Haulick
8,085,949 B2 12/2011 Kim
8,095,120 B1 1/2012 Blair
8,098,842 B2 1/2012 Florencio
8,098,844 B2 1/2012 Elko
8,103,030 B2 1/2012 Barthel
8,109,360 B2 2/2012 Stewart, Jr.
8,112,272 B2 2/2012 Nagahama
8,116,500 B2 2/2012 Oxford
8,121,834 B2 2/2012 Rosec
D655,271 S 3/2012 Park
D656,473 S 3/2012 Laube
8,130,969 B2 3/2012 Buck
8,130,977 B2 3/2012 Chu
8,135,143 B2 3/2012 Ishibashi
8,144,886 B2 3/2012 Ishibashi
D658,153 S 4/2012 Woo
8,155,331 B2 4/2012 Nakadai
8,170,882 B2 5/2012 Davis
8,175,291 B2 5/2012 Chan
8,175,871 B2 5/2012 Wang
8,184,801 B1 5/2012 Hamalainen
8,189,765 B2 5/2012 Nishikawa
8,189,810 B2 5/2012 Wolff
8,194,863 B2 6/2012 Takumai
8,199,927 B1 6/2012 Raftery
8,204,198 B2 6/2012 Adeney
8,204,248 B2 6/2012 Haulick
8,208,664 B2 6/2012 Iwasaki
8,213,596 B2 7/2012 Beaucoup
8,213,634 B1 * 7/2012 Daniel .................. H04R 3/005 381/91
8,219,387 B2 7/2012 Cutler
8,229,134 B2 7/2012 Duraiswami
8,233,352 B2 7/2012 Beaucoup
8,243,951 B2 8/2012 Ishibashi
8,244,536 B2 8/2012 Arun
8,249,273 B2 8/2012 Inoda
8,259,959 B2 9/2012 Marton
8,275,120 B2 9/2012 Stokes, III
8,280,728 B2 10/2012 Chen
8,284,949 B2 10/2012 Farhang
8,284,952 B2 10/2012 Reining
8,286,749 B2 10/2012 Stewart
8,290,142 B1 10/2012 Lambert
8,291,670 B2 10/2012 Gard
8,297,402 B2 10/2012 Stewart
8,315,380 B2 11/2012 Liu
8,331,582 B2 12/2012 Steele
8,345,898 B2 1/2013 Reining
8,355,521 B2 1/2013 Larson
8,370,140 B2 2/2013 Guillaume
8,379,823 B2 2/2013 Ratmanski
8,385,557 B2 2/2013 Tashev
D678,329 S 3/2013 Lee
8,395,653 B2 3/2013 Feng
8,403,107 B2 3/2013 Stewart
8,406,436 B2 3/2013 Craven
8,428,661 B2 4/2013 Chen
8,433,061 B2 4/2013 Cutler
D682,266 S 5/2013 Wu
8,437,490 B2 5/2013 Marton
8,443,930 B2 5/2013 Stewart, Jr.
8,447,590 B2 5/2013 Ishibashi
8,472,639 B2 6/2013 Reining
8,472,640 B2 6/2013 Marton
D685,346 S 7/2013 Szymanski
D686,182 S 7/2013 Ashiwa
8,479,871 B2 7/2013 Stewart
8,483,398 B2 7/2013 Fozunbal
8,498,423 B2 7/2013 Thaden
D687,432 S 8/2013 Duan
8,503,653 B2 8/2013 Ahuja
8,515,089 B2 8/2013 Nicholson
8,515,109 B2 8/2013 Dittberner
8,522,263 B2 8/2013 Amada
8,526,633 B2 9/2013 Ukai
8,553,904 B2 10/2013 Said
8,559,611 B2 10/2013 Ratmanski
D693,328 S 11/2013 Goetzen
8,583,481 B2 11/2013 Walter
8,599,194 B2 12/2013 Lewis
8,600,443 B2 12/2013 Kawaguchi
8,605,890 B2 12/2013 Zhang
8,620,650 B2 12/2013 Walters
8,630,431 B2 1/2014 Gran
8,631,897 B2 1/2014 Stewart
8,634,569 B2 1/2014 Lu
8,638,951 B2 1/2014 Zurek
D699,712 S 2/2014 Bourne
8,644,477 B2 2/2014 Gilbert
8,654,955 B1 2/2014 Lambert
8,654,990 B2 2/2014 Faller
8,660,274 B2 2/2014 Wolff
8,660,275 B2 2/2014 Buck
8,670,581 B2 3/2014 Harman
8,672,087 B2 3/2014 Stewart
8,675,890 B2 3/2014 Schmidt
8,675,899 B2 3/2014 Jung
8,676,728 B1 3/2014 Velusamy
8,682,675 B2 3/2014 Togami
8,724,829 B2 5/2014 Visser
8,730,156 B2 5/2014 Weising
8,744,069 B2 6/2014 Cutler
8,744,101 B1 6/2014 Burns
8,755,536 B2 6/2014 Chen
8,787,560 B2 7/2014 Buck
8,811,601 B2 8/2014 Mohammad
8,818,002 B2 8/2014 Tashev
8,824,693 B2 9/2014 Åhgren
8,842,851 B2 9/2014 Beaucoup
8,855,326 B2 10/2014 Derkx
8,855,327 B2 10/2014 Tanaka
8,861,713 B2 10/2014 Xu
8,861,756 B2 10/2014 Zhu
8,873,789 B2 10/2014 Bigeh
D717,272 S 11/2014 Kim
8,886,343 B2 11/2014 Ishibashi
8,893,849 B2 11/2014 Hudson
8,898,633 B2 11/2014 Bryant
D718,731 S 12/2014 Lee
8,903,106 B2 12/2014 Meyer
8,923,529 B2 12/2014 Mccowan
8,929,564 B2 1/2015 Kikkeri
8,934,640 B2 1/2015 Goodwin
8,942,382 B2 1/2015 Elko
8,965,546 B2 2/2015 Visser
D725,059 S 3/2015 Kim
D725,631 S 3/2015 Mcnamara
8,976,977 B2 3/2015 De
8,983,089 B1 3/2015 Chu
8,983,834 B2 3/2015 Davis
D726,144 S 4/2015 Kang
D727,968 S 4/2015 Onoue
9,002,028 B2 4/2015 Haulick
D729,767 S 5/2015 Lee
9,038,301 B2 5/2015 Zelbacher

(56) References Cited

U.S. PATENT DOCUMENTS 9,084,037 B2 7/2015 Derkx
9,088,336 B2 7/2015 Mani
9,094,496 B2 7/2015 Teutsch
D735,717 S 8/2015 Lam
D737,245 S 8/2015 Fan
9,099,094 B2 8/2015 Burnett
9,107,001 B2 8/2015 Diethorn
9,111,543 B2 8/2015 Åhgren
9,113,242 B2 8/2015 Hyun
9,113,247 B2 8/2015 Chatlani
9,126,827 B2 9/2015 Hsieh
9,129,223 B1 9/2015 Velusamy
9,140,054 B2 9/2015 Oberbroeckling
9,143,879 B2 * 9/2015 McElveen ............... H04S 3/002
D740,279 S 10/2015 Wu
9,172,345 B2 10/2015 Kok
D743,376 S 11/2015 Kim
D743,939 S 11/2015 Seong
9,196,261 B2 11/2015 Burnett
9,197,974 B1 11/2015 Clark
9,203,494 B2 12/2015 Tarighat Mehrabani
9,215,327 B2 12/2015 Bathurst
9,215,543 B2 12/2015 Sun
9,226,062 B2 12/2015 Sun
9,226,070 B2 12/2015 Hyun
9,226,088 B2 12/2015 Pandey
9,232,185 B2 1/2016 Graham
9,237,391 B2 1/2016 Benesty
9,247,367 B2 1/2016 Nobile
9,253,567 B2 2/2016 Morcelli
9,257,132 B2 2/2016 Gowreesunker
9,264,553 B2 2/2016 Pandey
9,264,805 B2 2/2016 Buck
9,280,985 B2 3/2016 Tawada
9,286,908 B2 3/2016 Zhang
9,294,839 B2 3/2016 Lambert
9,301,049 B2 3/2016 Elko
D754,103 S 4/2016 Fischer
9,307,326 B2 4/2016 Elko
9,319,532 B2 4/2016 Bao
9,319,799 B2 4/2016 Salmon
9,326,060 B2 4/2016 Nicholson
D756,502 S 5/2016 Lee
9,330,673 B2 5/2016 Cho
9,338,301 B2 5/2016 Pocino
9,338,549 B2 5/2016 Haulick
9,354,310 B2 5/2016 Visser
9,357,080 B2 5/2016 Beaucoup
9,403,670 B2 8/2016 Schelling
9,426,598 B2 8/2016 Walsh
D767,748 S 9/2016 Nakai
9,451,078 B2 9/2016 Yang
D769,239 S 10/2016 Li
9,462,378 B2 10/2016 Kuech
9,473,868 B2 10/2016 Huang
9,479,627 B1 10/2016 Rung
9,479,885 B1 10/2016 Ivanov
9,489,948 B1 11/2016 Chu
9,510,090 B2 11/2016 Lissek
9,514,723 B2 12/2016 Silfvast
9,516,412 B2 12/2016 Shigenaga
9,521,057 B2 12/2016 Klingbeil
9,521,486 B1 12/2016 Barton
9,549,245 B2 1/2017 Frater
9,560,446 B1 1/2017 Chang
9,560,451 B2 1/2017 Eichfeld
9,565,493 B2 2/2017 Abraham
9,565,507 B2 2/2017 Case
9,578,413 B2 2/2017 Sawa
9,578,440 B2 2/2017 Otto
9,589,556 B2 3/2017 Gao
9,591,123 B2 3/2017 Sorensen
9,591,404 B1 3/2017 Chhetri
D784,299 S 4/2017 Cho
9,615,173 B2 4/2017 Sako
9,628,596 B1 4/2017 Bullough
9,635,186 B2 4/2017 Pandey
9,635,474 B2 4/2017 Kuster
D787,481 S 5/2017 Jorunn
D788,073 S 5/2017 Silvera
9,640,187 B2 5/2017 Niemisto
9,641,688 B2 5/2017 Pandey
9,641,929 B2 5/2017 Li
9,641,935 B1 5/2017 Ivanov
9,653,091 B2 5/2017 Matsuo
9,653,092 B2 5/2017 Sun
9,655,001 B2 5/2017 Metzger
9,659,576 B1 5/2017 Kotvis
D789,323 S 6/2017 Mackiewicz
9,674,604 B2 6/2017 Deroo
9,692,882 B2 6/2017 Mani
9,706,057 B2 7/2017 Mani
9,716,944 B2 7/2017 Yliaho
9,721,582 B1 8/2017 Huang
9,734,835 B2 8/2017 Fujieda
9,754,572 B2 9/2017 Salazar
9,761,243 B2 9/2017 Taenzer
D801,285 S 10/2017 Timmins
9,788,119 B2 10/2017 Miikka
9,807,498 B1 10/2017 Harmke
9,813,806 B2 11/2017 Graham
9,818,425 B1 11/2017 Ayrapetian
9,818,426 B2 11/2017 Kotera
9,826,211 B2 11/2017 Sawa
9,854,101 B2 12/2017 Pandey
9,854,363 B2 12/2017 Sladeczek
9,860,439 B2 1/2018 Sawa
9,866,952 B2 1/2018 Pandey
D811,393 S 2/2018 Ahn
9,894,434 B2 2/2018 Rollow, IV
9,930,448 B1 3/2018 Chen
9,936,290 B2 4/2018 Mohammad
9,966,059 B1 5/2018 Ayrapetian
9,973,848 B2 5/2018 Chhetri
9,980,042 B1 5/2018 Benattar
D819,607 S 6/2018 Chui
D819,631 S 6/2018 Matsumiya
10,015,589 B1 7/2018 Ebenezer
10,021,506 B2 7/2018 Johnson
10,021,515 B1 7/2018 Mallya
10,034,116 B2 7/2018 Kadri
10,038,769 B2 7/2018 Ukai
10,054,320 B2 8/2018 Choi
10,061,009 B1 8/2018 Family
10,062,379 B2 8/2018 Katuri
10,080,088 B1 9/2018 Yang
10,153,744 B1 12/2018 Every
10,165,386 B2 12/2018 Lehtiniemi
D841,589 S 2/2019 Böhmer
10,206,030 B2 2/2019 Matsumoto
10,210,882 B1 2/2019 Mccowan
10,231,062 B2 3/2019 Pedersen
10,244,121 B2 3/2019 Mani
10,244,219 B2 3/2019 Sawa
10,269,343 B2 4/2019 Wingate
10,341,784 B2 7/2019 Recker
10,366,702 B2 7/2019 Morton
10,367,948 B2 7/2019 Wells-Rutherford
D857,873 S 8/2019 Shimada
10,389,861 B2 8/2019 Mani
10,389,885 B2 8/2019 Sun
D860,319 S 9/2019 Beruto
D860,997 S 9/2019 Jhun
10,425,727 B2 9/2019 Jost
D864,136 S 10/2019 Kim
10,433,086 B1 10/2019 Juszkiewicz
10,440,469 B2 10/2019 Barnett
D865,723 S 11/2019 Cho
10,566,008 B2 2/2020 Thorpe
10,602,267 B2 3/2020 Grosche
D883,952 S 5/2020 Lucas
10,650,797 B2 5/2020 Kumar
D888,020 S 6/2020 Lyu
10,728,653 B2 7/2020 Graham

(56) References Cited

U.S. PATENT DOCUMENTS

D900,070 S 10/2020 Lantz
D900,071 S 10/2020 Lantz
D900,072 S 10/2020 Lantz
D900,073 S 10/2020 Lantz
D900,074 S 10/2020 Lantz
10,827,263 B2 11/2020 Christoph
10,863,270 B1 12/2020 O'Neill
10,930,297 B2 2/2021 Christoph
10,959,018 B1 3/2021 Shi
10,979,805 B2 4/2021 Chowdhary
10,979,806 B1 4/2021 Johnson
D924,189 S 7/2021 Park
11,109,133 B2 8/2021 Lantz
D940,116 S 1/2022 Cho
11,218,802 B1 1/2022 Kandadai
11,310,592 B2 4/2022 Abraham
11,671,751 B2 * 6/2023 Athineos ................ H04R 3/005 381/92
12,395,792 B1 * 8/2025 Chen ........................ H04R 3/00
2001/0031058 A1 10/2001 Anderson
2002/0015500 A1 2/2002 Belt
2002/0041679 A1 4/2002 Beaucoup
2002/0048377 A1 4/2002 Vaudrey
2002/0064158 A1 5/2002 Yokoyama
2002/0064287 A1 5/2002 Kawamura
2002/0069054 A1 6/2002 Arrowood
2002/0110255 A1 8/2002 Killion
2002/0126861 A1 9/2002 Colby
2002/0131580 A1 9/2002 Smith
2002/0140633 A1 10/2002 Rafii
2002/0146282 A1 10/2002 Wilkes
2002/0149070 A1 10/2002 Sheplak
2002/0159603 A1 10/2002 Hirai
2003/0026437 A1 2/2003 Janse
2003/0053639 A1 3/2003 Beaucoup
2003/0059061 A1 3/2003 Tsuji
2003/0063762 A1 4/2003 Tajima
2003/0063768 A1 4/2003 Cornelius
2003/0072461 A1 4/2003 Moorer
2003/0107478 A1 6/2003 Hendricks
2003/0118200 A1 6/2003 Beaucoup
2003/0122777 A1 7/2003 Grover
2003/0138119 A1 7/2003 Pocino
2003/0156725 A1 8/2003 Boone
2003/0161485 A1 8/2003 Smith
2003/0163326 A1 8/2003 Maase
2003/0169888 A1 9/2003 Subotic
2003/0185404 A1 10/2003 Milsap
2003/0198339 A1 10/2003 Roy
2003/0198359 A1 10/2003 Killion
2003/0202107 A1 10/2003 Slattery
2004/0013038 A1 1/2004 Kajala
2004/0013252 A1 1/2004 Craner
2004/0076305 A1 4/2004 Santiago
2004/0105557 A1 6/2004 Matsuo
2004/0125942 A1 7/2004 Beaucoup
2004/0175006 A1 9/2004 Kim
2004/0202345 A1 10/2004 Stenberg
2004/0240664 A1 12/2004 Freed
2005/0005494 A1 1/2005 Way
2005/0041530 A1 2/2005 Goudie
2005/0069156 A1 3/2005 Haapapuro
2005/0094580 A1 5/2005 Kumar
2005/0094795 A1 5/2005 Rambo
2005/0149320 A1 7/2005 Kajala
2005/0157897 A1 7/2005 Saltykov
2005/0175189 A1 8/2005 Lee
2005/0175190 A1 8/2005 Tashev
2005/0213747 A1 9/2005 Popovich
2005/0221867 A1 10/2005 Zurek
2005/0238196 A1 10/2005 Furuno
2005/0270906 A1 12/2005 Ramenzoni
2005/0271221 A1 12/2005 Cerwin
2005/0286698 A1 12/2005 Bathurst
2005/0286729 A1 12/2005 Harwood
2006/0083390 A1 4/2006 Kaderavek
2006/0088173 A1 4/2006 Rodman
2006/0093128 A1 5/2006 Oxford
2006/0098403 A1 5/2006 Smith
2006/0104458 A1 5/2006 Kenoyer
2006/0109983 A1 5/2006 Young
2006/0151256 A1 7/2006 Lee
2006/0159293 A1 7/2006 Azima
2006/0161430 A1 7/2006 Schweng
2006/0165242 A1 7/2006 Miki
2006/0192976 A1 8/2006 Hall
2006/0198541 A1 9/2006 Henry
2006/0204022 A1 9/2006 Hooley
2006/0215866 A1 9/2006 Francisco
2006/0222187 A1 10/2006 Jarrett
2006/0233353 A1 10/2006 Beaucoup
2006/0239471 A1 10/2006 Mao
2006/0262942 A1 11/2006 Oxford
2006/0269080 A1 11/2006 Oxford
2006/0269086 A1 11/2006 Page
2006/0280318 A1 12/2006 Warren
2007/0006474 A1 1/2007 Taniguchi
2007/0009116 A1 1/2007 Reining
2007/0019828 A1 1/2007 Hughes
2007/0053524 A1 3/2007 Haulick
2007/0093714 A1 4/2007 Beaucoup
2007/0116255 A1 5/2007 Derkx
2007/0120029 A1 5/2007 Keung
2007/0165871 A1 7/2007 Roovers
2007/0230712 A1 10/2007 Belt
2007/0253561 A1 11/2007 Williams
2007/0269066 A1 11/2007 Derleth
2008/0008339 A1 1/2008 Ryan
2008/0033723 A1 2/2008 Jang
2008/0046235 A1 2/2008 Chen
2008/0056517 A1 3/2008 Algazi
2008/0101622 A1 5/2008 Sugiyama
2008/0130907 A1 6/2008 Sudo
2008/0144848 A1 6/2008 Buck
2008/0152167 A1 6/2008 Taenzer
2008/0168283 A1 7/2008 Penning
2008/0175375 A1 7/2008 Ishiguro
2008/0188965 A1 8/2008 Bruey
2008/0212805 A1 9/2008 Fincham
2008/0232607 A1 9/2008 Tashev
2008/0247567 A1 10/2008 Morgan
2008/0253553 A1 10/2008 Li
2008/0253589 A1 10/2008 Trahms
2008/0259731 A1 10/2008 Happonen
2008/0260175 A1 10/2008 Elko
2008/0267422 A1 10/2008 Cox
2008/0279400 A1 11/2008 Knoll
2008/0285772 A1 11/2008 Haulick
2009/0003586 A1 1/2009 Lai
2009/0003626 A1 1/2009 Burnett
2009/0030536 A1 1/2009 Gur
2009/0046847 A1 2/2009 Wu
2009/0052684 A1 2/2009 Ishibashi
2009/0052686 A1 2/2009 Wu
2009/0052715 A1 2/2009 Zhang
2009/0086998 A1 4/2009 Jeong
2009/0087000 A1 4/2009 Ko
2009/0087001 A1 4/2009 Jiang
2009/0094817 A1 4/2009 Killion
2009/0129609 A1 5/2009 Oh
2009/0147967 A1 6/2009 Ishibashi
2009/0150149 A1 6/2009 Cutter
2009/0161880 A1 6/2009 Hooley
2009/0169027 A1 7/2009 Ura
2009/0173030 A1 7/2009 Gulbrandsen
2009/0173570 A1 7/2009 Levit
2009/0226004 A1 9/2009 Moeller
2009/0233545 A1 9/2009 Sutskover
2009/0235870 A1 9/2009 Troy
2009/0237561 A1 9/2009 Kobayashi
2009/0254340 A1 10/2009 Sun
2009/0274318 A1 11/2009 Ishibashi
2009/0287482 A1 11/2009 Hetherington
2009/0310794 A1 12/2009 Ishibashi

(56) References Cited

U.S. PATENT DOCUMENTS

2010/0011644 A1 1/2010 Kramer
2010/0034397 A1 2/2010 Nakadai
2010/0074433 A1 3/2010 Zhang
2010/0111323 A1 5/2010 Marton
2010/0111324 A1 5/2010 Yeldener
2010/0119097 A1 5/2010 Ohtsuka
2010/0123785 A1 5/2010 Chen
2010/0128892 A1 5/2010 Chen
2010/0128901 A1 5/2010 Herman
2010/0131749 A1 5/2010 Kim
2010/0142721 A1 6/2010 Wada
2010/0150364 A1 6/2010 Buck
2010/0158268 A1 6/2010 Marton
2010/0165071 A1 7/2010 Ishibashi
2010/0166219 A1 7/2010 Marton
2010/0189275 A1 7/2010 Christoph
2010/0189299 A1 7/2010 Grant
2010/0202628 A1 8/2010 Meyer
2010/0208605 A1 8/2010 Wang
2010/0215184 A1 8/2010 Buck
2010/0215189 A1 8/2010 Marton
2010/0217590 A1 8/2010 Nemer
2010/0245624 A1 9/2010 Beaucoup
2010/0246873 A1 9/2010 Chen
2010/0284185 A1 11/2010 Ngai
2010/0305728 A1 12/2010 Aiso
2010/0314513 A1 12/2010 Evans
2010/0329478 A1 12/2010 Kubin
2011/0002469 A1 1/2011 Ojala
2011/0007921 A1 1/2011 Stewart
2011/0033063 A1 2/2011 Mcgrath
2011/0038229 A1 2/2011 Beaucoup
2011/0096136 A1 4/2011 Liu
2011/0096631 A1 4/2011 Kondo
2011/0096915 A1 4/2011 Nemer
2011/0164761 A1 7/2011 Mccowan
2011/0194719 A1 8/2011 Frater
2011/0211706 A1 9/2011 Tanaka
2011/0235821 A1 9/2011 Okita
2011/0268287 A1 11/2011 Ishibashi
2011/0311064 A1 12/2011 Teutsch
2011/0311085 A1 12/2011 Stewart
2011/0317862 A1 12/2011 Hosoe
2012/0002835 A1 1/2012 Stewart
2012/0014049 A1 1/2012 Ogle
2012/0027227 A1 2/2012 Kok
2012/0070015 A1 3/2012 Oh
2012/0076316 A1 3/2012 Zhu
2012/0080260 A1 4/2012 Stewart
2012/0093344 A1 4/2012 Sun
2012/0106755 A1 5/2012 Zhang
2012/0117474 A1 5/2012 Miki
2012/0128160 A1 5/2012 Kim
2012/0128166 A1 5/2012 Kim
2012/0128175 A1 5/2012 Erik
2012/0155688 A1 6/2012 Wilson
2012/0155703 A1 6/2012 Hernandez-Abrego
2012/0163625 A1 6/2012 Siotis
2012/0169826 A1 7/2012 Jeong
2012/0177219 A1 7/2012 Mullen
2012/0182429 A1 7/2012 Forutanpour
2012/0207335 A1 8/2012 Spaanderman
2012/0224709 A1 9/2012 Keddem
2012/0230511 A1 9/2012 Burnett
2012/0243698 A1 9/2012 Elko
2012/0262536 A1 10/2012 Chen
2012/0263019 A1 10/2012 Armstong-Muntner
2012/0275621 A1 11/2012 Elko
2012/0288079 A1 11/2012 Burnett
2012/0288114 A1 11/2012 Duraiswami
2012/0294472 A1 11/2012 Hudson
2012/0327115 A1 12/2012 Chhetri
2012/0328142 A1 12/2012 Horibe
2013/0002797 A1 1/2013 Thapa
2013/0004013 A1 1/2013 Stewart
2013/0015014 A1 1/2013 Stewart
2013/0016847 A1 1/2013 Steiner
2013/0028451 A1 1/2013 De Roo
2013/0029684 A1 1/2013 Kawaguchi
2013/0034241 A1 2/2013 Pandey
2013/0039504 A1 2/2013 Pandey
2013/0083911 A1 4/2013 Bathurst
2013/0094689 A1 4/2013 Tanaka
2013/0101136 A1 4/2013 Mcelveen
2013/0101141 A1 4/2013 Mcelveen
2013/0121498 A1 5/2013 Giesbrecht
2013/0136274 A1 5/2013 Aehgren
2013/0142343 A1 6/2013 Matsui
2013/0147835 A1 6/2013 Lee
2013/0156198 A1 6/2013 Kim
2013/0182190 A1 7/2013 Mccartney
2013/0206501 A1 8/2013 Yu
2013/0216066 A1 8/2013 Yerrace
2013/0226593 A1 8/2013 Magnusson
2013/0251181 A1 9/2013 Stewart
2013/0264144 A1 10/2013 Hudson
2013/0271559 A1 10/2013 Feng
2013/0282372 A1 10/2013 Erik
2013/0294616 A1 11/2013 Mulder
2013/0297302 A1 11/2013 Pan
2013/0304476 A1 11/2013 Kim
2013/0304479 A1 11/2013 Teller
2013/0329908 A1 12/2013 Lindahl
2013/0332156 A1 12/2013 Tackin
2013/0336516 A1 12/2013 Stewart
2013/0343549 A1 12/2013 Vemireddy
2014/0003635 A1 1/2014 Mohammad
2014/0010383 A1 1/2014 Mackey
2014/0016794 A1 1/2014 Lu
2014/0029761 A1 1/2014 Maenpaa
2014/0037097 A1 2/2014 Mark
2014/0050332 A1 2/2014 Nielsen
2014/0072151 A1 3/2014 Ochs
2014/0098233 A1 4/2014 Martin
2014/0098964 A1 4/2014 Rosca
2014/0112496 A1 4/2014 Murgia
2014/0122060 A1 5/2014 Kaszczuk
2014/0126746 A1 5/2014 Shin
2014/0177857 A1 6/2014 Kuster
2014/0233777 A1 8/2014 Tseng
2014/0233778 A1 8/2014 Hardiman
2014/0264654 A1 9/2014 Salmon
2014/0265774 A1 9/2014 Stewart
2014/0270271 A1 9/2014 Dehe
2014/0286518 A1 9/2014 Stewart
2014/0294211 A1 10/2014 Schneider
2014/0295768 A1 10/2014 Wu
2014/0301586 A1 10/2014 Stewart
2014/0307882 A1 10/2014 Leblanc
2014/0314251 A1 10/2014 Rosca
2014/0341392 A1 11/2014 Lambert
2014/0357177 A1 12/2014 Stewart
2014/0363008 A1 12/2014 Chen
2015/0003638 A1 1/2015 Kasai
2015/0024799 A1 1/2015 Swanson
2015/0025878 A1 1/2015 Gowreesunker
2015/0030172 A1 1/2015 Gaensler
2015/0033042 A1 1/2015 Iwamoto
2015/0050967 A1 2/2015 Bao
2015/0055796 A1 2/2015 Nugent
2015/0055797 A1 2/2015 Nguyen
2015/0063579 A1 3/2015 Bao
2015/0070188 A1 3/2015 Aramburu
2015/0078581 A1 3/2015 Etter
2015/0078582 A1 3/2015 Graham
2015/0097719 A1 4/2015 Balachandreswaran
2015/0104023 A1 4/2015 Bilobrov
2015/0112672 A1 4/2015 Giacobello
2015/0117672 A1 4/2015 Christoph
2015/0118960 A1 4/2015 Petit
2015/0126255 A1 5/2015 Yang
2015/0156578 A1 6/2015 Alexandridis
2015/0163577 A1 6/2015 Benesty
2015/0185825 A1 7/2015 Mullins

(56) References Cited

U.S. PATENT DOCUMENTS

2015/0189423 A1 7/2015 Giannuzzi
2015/0195644 A1 7/2015 Wilson
2015/0208171 A1 7/2015 Funakoshi
2015/0237424 A1 8/2015 Wilker
2015/0281832 A1 10/2015 Kishimoto
2015/0281833 A1 10/2015 Shigenaga
2015/0281834 A1 10/2015 Takano
2015/0312662 A1 10/2015 Kishimoto
2015/0312691 A1 10/2015 Jussi
2015/0326968 A1 11/2015 Shigenaga
2015/0341734 A1 11/2015 Sherman
2015/0350621 A1 12/2015 Sawa
2015/0358734 A1 12/2015 Butler
2016/0011851 A1 1/2016 Zhang
2016/0021478 A1 1/2016 Katagiri
2016/0029120 A1 1/2016 Nesta
2016/0031700 A1 2/2016 Sparks
2016/0037277 A1 2/2016 Matsumoto
2016/0055859 A1 2/2016 Finlow-Bates
2016/0080867 A1 3/2016 Nugent
2016/0088392 A1 3/2016 Huttunen
2016/0100092 A1 4/2016 Bohac
2016/0105473 A1 4/2016 Klingbeil
2016/0111109 A1 4/2016 Tsujikawa
2016/0127527 A1 5/2016 Mani
2016/0134928 A1 5/2016 Ogle
2016/0142548 A1 5/2016 Pandey
2016/0142814 A1 5/2016 Deroo
2016/0142815 A1 5/2016 Norris
2016/0148057 A1 5/2016 Oh
2016/0150315 A1 5/2016 Tzirkel-Hancock
2016/0150316 A1 5/2016 Kubota
2016/0155455 A1 6/2016 Ojanperä
2016/0161588 A1 6/2016 Benattar
2016/0165339 A1 6/2016 Benattar
2016/0165340 A1 6/2016 Benattar
2016/0165341 A1 6/2016 Benattar
2016/0173976 A1 6/2016 Podhradsky
2016/0173978 A1 6/2016 Li
2016/0189727 A1 6/2016 Wu
2016/0192068 A1 6/2016 Ng
2016/0196836 A1 7/2016 Yu
2016/0234593 A1 8/2016 Matsumoto
2016/0245698 A1 8/2016 Pau
2016/0249132 A1 8/2016 Oliaei
2016/0275961 A1 9/2016 Yu
2016/0295279 A1 10/2016 Srinivasan
2016/0300584 A1 10/2016 Pandey
2016/0302002 A1 10/2016 Lambert
2016/0302006 A1 10/2016 Pandey
2016/0323667 A1 11/2016 Shumard
2016/0323668 A1 11/2016 Abraham
2016/0330545 A1 11/2016 Mcelveen
2016/0337523 A1 11/2016 Pandey
2016/0353200 A1 12/2016 Bigeh
2016/0357508 A1 12/2016 Moore
2017/0019744 A1 1/2017 Matsumoto
2017/0064451 A1 3/2017 Park
2017/0105066 A1 4/2017 Mclaughlin
2017/0134849 A1 5/2017 Pandey
2017/0134850 A1 5/2017 Graham
2017/0164101 A1 6/2017 Rollow, IV
2017/0164102 A1 6/2017 Ivanov
2017/0180861 A1 6/2017 Chen
2017/0206064 A1 7/2017 Breazeal
2017/0230748 A1 8/2017 Shumard
2017/0238114 A1 8/2017 Milne
2017/0264999 A1 9/2017 Fukuda
2017/0295429 A1 10/2017 Poletti
2017/0303887 A1 10/2017 Richmond
2017/0308352 A1 10/2017 Kessler
2017/0374454 A1 12/2017 Bernardini
2018/0083848 A1 3/2018 Siddiqi
2018/0102135 A1 4/2018 Ebenezer
2018/0102136 A1 4/2018 Ebenezer
2018/0109873 A1 4/2018 Xiang
2018/0115799 A1 4/2018 Thiele
2018/0160224 A1 6/2018 Graham
2018/0196585 A1 7/2018 Densham
2018/0219922 A1 8/2018 Bryans
2018/0227666 A1 8/2018 Barnett
2018/0240472 A1 8/2018 Vickers
2018/0292079 A1 10/2018 Branham
2018/0310096 A1 10/2018 Shumard
2018/0313558 A1 11/2018 Byers
2018/0338205 A1 11/2018 Abraham
2018/0359565 A1 12/2018 Kim
2019/0014399 A1 1/2019 Sano
2019/0042187 A1 2/2019 Truong
2019/0082249 A1 3/2019 Kim
2019/0124462 A1 4/2019 Lindahl
2019/0166424 A1 5/2019 Harney
2019/0182607 A1 6/2019 Pedersen
2019/0215540 A1 7/2019 Nicol
2019/0230436 A1 7/2019 Tsingos
2019/0259408 A1 8/2019 Freeman
2019/0268683 A1 8/2019 Miyahara
2019/0295540 A1 9/2019 Grima
2019/0295569 A1 9/2019 Wang
2019/0297422 A1 9/2019 Anderson
2019/0297542 A1 9/2019 Tang
2019/0319677 A1 10/2019 Hansen
2019/0371354 A1 12/2019 Lester
2019/0373362 A1 12/2019 Ansai
2019/0385629 A1 12/2019 Moravy
2019/0387311 A1 12/2019 Schultz
2019/0391783 A1 12/2019 Moore
2020/0015021 A1 1/2020 Leppanen
2020/0021910 A1 1/2020 Rollow, IV
2020/0027472 A1 1/2020 Huang
2020/0037068 A1 1/2020 Barnett
2020/0068297 A1 2/2020 Rollow, IV
2020/0100009 A1 3/2020 Lantz
2020/0100025 A1 3/2020 Shumard
2020/0107137 A1 4/2020 Koutrouli
2020/0137485 A1 4/2020 Yamakawa
2020/0145753 A1 5/2020 Rollow, IV
2020/0152218 A1 5/2020 Kikuhara
2020/0162618 A1 5/2020 Enteshari
2020/0228663 A1 7/2020 Wells-Rutherford
2020/0228896 A1 7/2020 Chesney
2020/0251119 A1 8/2020 Yang
2020/0275204 A1 8/2020 Labosco
2020/0278043 A1 9/2020 Cao
2020/0288237 A1 9/2020 Abraham
2020/0329308 A1 10/2020 Tateishi
2021/0012789 A1 1/2021 Husain
2021/0021940 A1 1/2021 Petersen
2021/0044881 A1 2/2021 Lantz
2021/0051397 A1 2/2021 Veselinovic
2021/0067870 A1 3/2021 Berge
2021/0098014 A1 4/2021 Tanaka
2021/0098015 A1 4/2021 Pandey
2021/0120335 A1 4/2021 Veselinovic
2021/0200504 A1 7/2021 Park
2021/0243522 A1 8/2021 Rollow, IV
2021/0263126 A1 8/2021 Arai
2021/0375298 A1 12/2021 Zhang
2022/0337946 A1 10/2022 Shumard
2022/0369028 A1 11/2022 Abraham

FOREIGN PATENT DOCUMENTS

CA 2359771 4/2003
CA 2475283 1/2005
CA 2505496 10/2006
CA 2838856 12/2012
CA 2846323 9/2014
CN 1204425 1/1999
CN 1741686 3/2006
CN 1780495 5/2006
CN 101217830 7/2008
CN 101388213 3/2009
CN 101447190 6/2009

(56) References Cited

FOREIGN PATENT DOCUMENTS

| | | | |
|---|---|---|---|
| CN | 101828407 | | 9/2010 |
| CN | 101833954 | | 9/2010 |
| CN | 101860776 | | 10/2010 |
| CN | 101894558 | | 11/2010 |
| CN | 102196334 | | 9/2011 |
| CN | 102474680 | | 5/2012 |
| CN | 102646418 | | 8/2012 |
| CN | 102821336 | | 12/2012 |
| CN | 102833664 | | 12/2012 |
| CN | 102860039 | | 1/2013 |
| CN | 104036784 | | 9/2014 |
| CN | 104053088 | | 9/2014 |
| CN | 104080289 | A1 | 10/2014 |
| CN | 104347076 | | 2/2015 |
| CN | 104581463 | | 4/2015 |
| CN | 104681038 | | 6/2015 |
| CN | 105355210 | | 2/2016 |
| CN | 105513596 | | 4/2016 |
| CN | 105548998 | | 5/2016 |
| CN | 105812969 | | 7/2016 |
| CN | 106162427 | | 11/2016 |
| CN | 106233751 | | 12/2016 |
| CN | 106251857 | | 12/2016 |
| CN | 106782584 | | 5/2017 |
| CN | 106851036 | | 6/2017 |
| CN | 206349145 | | 7/2017 |
| CN | 107113528 | | 8/2017 |
| CN | 107205196 | | 9/2017 |
| CN | 107221336 | | 9/2017 |
| CN | 107534725 | | 1/2018 |
| CN | 108172235 | | 6/2018 |
| CN | 109087664 | | 12/2018 |
| CN | 208190895 | | 12/2018 |
| CN | 208462000 | | 2/2019 |
| CN | 109727604 | | 5/2019 |
| CN | 110010147 | | 7/2019 |
| CN | 306391029 | | 3/2021 |
| DE | 2941485 | | 4/1981 |
| EM | 0077546430001 | | 3/2020 |
| EP | 0381498 | | 8/1990 |
| EP | 0594098 | | 4/1994 |
| EP | 0869697 | | 10/1998 |
| EP | 1180914 | | 2/2002 |
| EP | 1184676 | | 3/2002 |
| EP | 0944228 | | 6/2003 |
| EP | 1439526 | | 7/2004 |
| EP | 1651001 | | 4/2006 |
| EP | 1727344 | | 11/2006 |
| EP | 1906707 | | 4/2008 |
| EP | 1952393 | | 8/2008 |
| EP | 1962547 | | 8/2008 |
| EP | 2133867 | | 12/2009 |
| EP | 2159789 | | 3/2010 |
| EP | 2197219 | | 6/2010 |
| EP | 2360940 | | 8/2011 |
| EP | 2710788 | | 3/2014 |
| EP | 2721837 | | 4/2014 |
| EP | 2772910 | | 9/2014 |
| EP | 2778310 | | 9/2014 |
| EP | 2802157 | | 11/2014 |
| EP | 2942975 | | 11/2015 |
| EP | 2988527 | | 2/2016 |
| EP | 3035556 | | 6/2016 |
| EP | 3131311 | | 2/2017 |
| GB | 2393601 | | 3/2004 |
| GB | 2446620 | | 8/2008 |
| GB | 2512155 | | 9/2014 |
| GB | 2563857 | | 1/2019 |
| JP | S63144699 | | 6/1988 |
| JP | H01260967 | | 10/1989 |
| JP | H0241099 | | 2/1990 |
| JP | H05260589 | | 10/1993 |
| JP | H07336790 | | 12/1995 |
| JP | 2518823 | | 7/1996 |
| JP | 3175622 | | 6/2001 |
| JP | 2003060530 | | 2/2003 |
| JP | 2003087890 | | 3/2003 |
| JP | 2004349806 | | 12/2004 |
| JP | 2004537232 | | 12/2004 |
| JP | 2005323084 | | 11/2005 |
| JP | 2006067127 | | 3/2006 |
| JP | 2006094389 | | 4/2006 |
| JP | 2006101499 | | 4/2006 |
| JP | 2006148330 | | 6/2006 |
| JP | 4120646 | | 8/2006 |
| JP | 4258472 | | 8/2006 |
| JP | 4196956 | | 9/2006 |
| JP | 2006340151 | | 12/2006 |
| JP | 4760160 | | 1/2007 |
| JP | 4752403 | | 3/2007 |
| JP | 2007089058 | | 4/2007 |
| JP | 4867579 | | 6/2007 |
| JP | 2007208503 | | 8/2007 |
| JP | 2007228069 | | 9/2007 |
| JP | 2007228070 | | 9/2007 |
| JP | 2007274131 | | 10/2007 |
| JP | 2007274463 | | 10/2007 |
| JP | 2007288679 | | 11/2007 |
| JP | 2008005347 | | 1/2008 |
| JP | 2008042754 | | 2/2008 |
| JP | 2008154056 | | 7/2008 |
| JP | 2008259022 | | 10/2008 |
| JP | 2008263336 | | 10/2008 |
| JP | 2008312002 | | 12/2008 |
| JP | 2009206671 | | 9/2009 |
| JP | 2010028653 | | 2/2010 |
| JP | 2010114554 | | 5/2010 |
| JP | 2010268129 | | 11/2010 |
| JP | 2011015018 | | 1/2011 |
| JP | 4779748 | | 9/2011 |
| JP | 2012105199 | | 5/2012 |
| JP | 2012165189 | | 8/2012 |
| JP | 5028944 | | 9/2012 |
| JP | 5139111 | | 2/2013 |
| JP | 5306565 | | 10/2013 |
| JP | 5685173 | | 3/2015 |
| JP | 2016051038 | | 4/2016 |
| KR | 100298300 | | 5/2001 |
| KR | 20040083109 | | 1/2004 |
| KR | 100901464 | | 6/2009 |
| KR | 100960781 | | 6/2010 |
| KR | 1020130033723 | | 4/2013 |
| KR | 300856915 | | 5/2016 |
| TW | 201331932 | | 8/2013 |
| TW | 201347404 | | 11/2013 |
| TW | 1484478 | | 5/2015 |
| TW | 201643688 | | 12/2016 |
| TW | 201728075 | | 8/2017 |
| TW | 201908761 | | 3/2019 |
| WO | 1997008896 | | 3/1997 |
| WO | 1998047291 | | 10/1998 |
| WO | 2000030402 | | 5/2000 |
| WO | 2003073786 | | 9/2003 |
| WO | 2003088429 | | 10/2003 |
| WO | 2004027754 | | 4/2004 |
| WO | 2004090865 | | 10/2004 |
| WO | 2006049260 | | 5/2006 |
| WO | 2006071119 | | 7/2006 |
| WO | 2006114015 | | 11/2006 |
| WO | 2006121896 | | 11/2006 |
| WO | 2007045971 | | 4/2007 |
| WO | 2007052269 | | 5/2007 |
| WO | 2007090010 | | 8/2007 |
| WO | 2008074249 | | 6/2008 |
| WO | 2008125523 | | 10/2008 |
| WO | 2009039783 | | 4/2009 |
| WO | 2009109069 | | 9/2009 |
| WO | 2010001508 | | 1/2010 |
| WO | 2010091999 | | 8/2010 |
| WO | 2010140084 | | 12/2010 |
| WO | 2010144148 | | 12/2010 |
| WO | 2011104501 | | 9/2011 |
| WO | 2012122132 | | 9/2012 |
| WO | 2012140435 | | 10/2012 |

(56) References Cited

FOREIGN PATENT DOCUMENTS

| | | |
|---|---|---|
| WO | 2012160459 | 11/2012 |
| WO | 2012174159 | 12/2012 |
| WO | 2013016986 | 2/2013 |
| WO | 2013182118 | 12/2013 |
| WO | 2014156292 | 10/2014 |
| WO | 2016176429 | 11/2016 |
| WO | 2016179211 | 11/2016 |
| WO | 2017208022 | 12/2017 |
| WO | 2018140444 | 8/2018 |
| WO | 2018140618 | 8/2018 |
| WO | 2018211806 | 11/2018 |
| WO | 2019231630 | 12/2019 |
| WO | 2020053601 | 3/2020 |
| WO | 2020168873 | 8/2020 |
| WO | 2020191354 | 9/2020 |
| WO | 211843001 | 11/2020 |
| WO | 2022078791 | 4/2022 |

OTHER PUBLICATIONS

"Vsa 2050 II Digitally Steerable col. Speaker," Web page https://www.rcf.it/en_US/products/product-detail/vsa-2050-ii/972389, 15 pages, Dec. 24, 2018.

Advanced Network Devices, IPSCM Ceiling Tile IP Speaker, Feb. 2011, 2 pgs.

Advanced Network Devices, IPSCM Standard 2' by 2' Ceiling Tile Speaker, 2 pgs.

Affes, et al., "A Signal Subspace Tracking Algorithm for Microphone Array Processing of Speech," IEEE Trans. on Speech and Audio Processing, vol. 5, No. 5, Sep. 1997, pp. 425-437.

Affes, et al., "A Source Subspace Tracking Array of Microphones for Double Talk Situations," 1996 IEEE International Conference on Acoustics, Speech, and Signal Processing Conference Proceedings, May 1996, pp. 909-912.

Affes, et al., "An Algorithm for Multisource Beamforming and Multitarget Tracking," IEEE Trans. on Signal Processing, vol. 44, No. 6, Jun. 1996, pp. 1512-1522.

Affes, et al., "Robust Adaptive Beamforming via LMS-Like Target Tracking," Proceedings of IEEE International Conference on Acoustics, Speech and Signal Processing, Apr. 1994, pp. IV-269-IV-272.

Ahonen, et al., "Directional Analysis of Sound Field with Linear Microphone Array and Applications in Sound Reproduction," Audio Engineering Socity, Convention Paper 7329, May 2008, 11 pp.

Alarifi, et al., "Ultra Wideband Indoor Positioning Technologies: Analysis and Recent Advances," Sensors 2016, vol. 16, No. 707, 36 pp.

Amazon webpage for Metalfab MFLCRFG (last visited Apr. 22, 2020) available at <https://www.amazon.com/RETURN-FILTERGRILLE-Drop-Ceiling/dp/B0064Q9A7I/ref=sr 12?dchild=1&keywords=drop+ceiling+return+air+grille&qid=1585862723&s=hi&sr=1-2>, 11 pp.

Armstrong "Walls" Catalog available at <https://www.armstrongceilings.com/content/dam/armstrongceilings/commercial/north-america/catalogs/armstrong-ceilings-wallsspecifiers-reference.pdf>, 2019, 30 pp.

Armstrong Tectum Ceiling & Wall Panels Catalog available at <https://www.armstrongceilings.com/content/dam/armstrongceilings/commercial/north-america/brochures/tectum-brochure.pdf>, 2019, 16 pp.

Armstrong Woodworks Concealed Catalog available at <https://sweets.construction.com/swts_content_files/3824/442581.pdf>, 2014, 6 pp.

Armstrong Woodworks Walls Catalog available at <https://www.armstrongceilings.com/pdbupimagesclg/220600.pdf/download/data-sheet-woodworks-walls.pdf>, 2019, 2 pp.

Armstrong World Industries, Inc., I-Ceilings Sound Systems Speaker Panels, 2002, 4 pgs.

Armstrong, Acoustical Design: Exposed Structure, available at <https://www.armstrongceilings.com/pdbupimagesclg/217142.pdf/download/acoustical-design-exposed-structurespaces-brochure.pdf>, 2018, 19 pp.

Armstrong, Ceiling Systems, Brochure page for Armstrong Softlook, 1995, 2 pp.

Armstrong, Excerpts from Armstrong 2011-2012 Ceiling Wall Systems Catalog, available at <https://web.archive.org/web/20121116034120/http://www.armstrong.com/commceilingsna/en_us/pdf/ceilings_catalog_screen-2011.pdf>, as early as 2012, 162 pp.

Armstrong, i-Ceilings, Brochure, 2009, 12 pp.

Arnold, et al., "A Directional Acoustic Array Using Silicon Micromachined Piezoresistive Microphones," Journal of the Acoustical Society of America, 113(1), Jan. 2003, 10 pp.

Atlas Sound, I128SYSM IP Compliant Loudspeaker System with Microphone Data Sheet, 2009, 2 pgs.

Atlas Sound, 1'x2' IP Speaker with Micophone for Suspended Ceiling Systems, https://www.atlasied.com/i128sysm, retrieved Oct. 25, 2017, 5 pgs.

Audio Technica, ES945 Omnidirectional Condenser Boundary Microphones, https://eu.audio-technica.com/resources/ES945%20Specifications.pdf, 2007, 1 pg.

Audix Microphones, Audix Introduces Innovative Ceiling Mics, http://audixusa.com/docs_12/latest_news/EFplFkAAkIOtSdolke.shtml, Jun. 2011, 6 pgs.

Audix Microphones, M70 Flush Mount Ceiling Mic, May 2016, 2 pgs.

Automixer Gated, Information Sheet, MIT, Nov. 2019, 9 pp.

Avnetwork, "Top Five Conference Room Mic Myths," Feb. 25, 2015, 14 pp.

Beh, et al., "Combining Acoustic Echo Cancellation and Adaptive Beamforming for Achieving Robust Speech Interface in Mobile Robot," 2008 IEEE/RSJ International Conference on Intelligent Robots and Systems, Sep. 2008, pp. 1693-1698.

Benesty, et al., "A New Class of Doubletalk Detectors Based on Cross-Correlation," IEEE Transactions on Speech and Audio Processing, vol. 8, No. 2, Mar. 2000, pp. 168-172.

Benesty, et al., "Adaptive Algorithms for Mimo Acoustic Echo Cancellation," AI2 Allen Institute for Artifical Intelligence, 2003. 30 pages.

Benesty, et al., "Differential Beamforming," Fundamentals of Signal Enhancement and Array Signal Processing, First Edition, 2017, 39 pp.

Benesty, et al., "Frequency-Domain Adaptive Filtering Revisited, Generalization to the Multi-Channel Case, and Application to Acoustic Echo Cancellation," 2000 IEEE International Conference on Acoustics, Speech, and Signal Processing Proceedings, Jun. 2000, pp. 789-792.

Benesty, et al., "Microphone Array Signal Processing," Springer, 2010, 20 pp.

Berkun, et al., "Combined Beamformers for Robust Broadband Regularized Superdirective Beamforming," IEEE/ACM Transactions on Audio, Speech, and Language Processing, vol. 23, No. 5, May 2015, 10 pp.

Beyer Dynamic, Classis BM 32-33-34 DE-EN-FR 2016, 1 pg.

Beyer Dynamic, Classis-BM- 33-PZ A1, 2013, 1 pg.

BNO055, Intelligent 9-axis absolute orientation sensor, Data sheet, Bosch, Nov. 2020, 118 pp.

Boyd, et al., Convex Optimization, Mar. 15, 1999, 216 pgs.

Brandstein, et al., "Microphone Arrays: Signal Processing Techniques and Applications," Digital Signal Processing, Springer-Verlag Berlin Heidelberg, 2001, 401 pgs.

Brooks, et al., "A Quantitative Assessment of Group Delay Methods for Identifying Glottal Closures in Voiced Speech," IEEE Transaction on Audio, Speech, and Language Processing, vol. 14, No. 2, Mar. 2006, 11 pp.

Bruel & Kjaer, by J.J. Christensen and J. Hald, Technical Review: Beamforming, No. 1, 2004, 54 pgs.

BSS Audio, Soundweb London Application Guides, 2010, 120 pgs.

Buchner, et al., "An Acoustic Human-Machine Interface with Multi-Channel Sound Reproduction," IEEE Fourth Workshop on Multimedia Signal Processing, Oct. 2001, pp. 359-364.

Buchner, et al., "An Efficient Combination of Multi-Channel Acoustic Echo Cancellation with a Beamforming Microphone Array," International Workshop on Hands-Free Speech Communication (HSC2001), Apr. 2001, pp. 55-58.

(56) References Cited

OTHER PUBLICATIONS

Buchner, et al., "Full-Duplex Communication Systems Using Loudspeaker Arrays and Microphone Arrays," IEEE International Conference on Multimedia and Expo, Aug. 2002, pp. 509-512.
Buchner, et al., "Generalized Multichannel Frequency-Domain Adaptive Filtering: Efficient Realization and Application to Hands-Free Speech Communication," Signal Processing 85, 2005, pp. 549-570.
Buchner, et al., "Multichannel Frequency-Domain Adaptive Filtering with Application to Multichannel Acoustic Echo Cancellation," Adaptive Signal Processing, 2003, pp. 95-128.
Buck, "Aspects of First-Order Differential Microphone Arrays in the Presence of Sensor Imperfections," Transactions on Emerging Telecommunications Technologies, 13.2, 2002, 8 pp.
Buck, et al., "First Order Differential Microphone Arrays for Automotive Applications," 7th International Workshop on Acoustic Echo and Noise Control, Darmstadt University of Technology, Sep. 10-13, 2001, 4 pp.
Invensense, Recommendations for Mounting and Connecting InvenSense MEMS Microphones, Application Note AN-1003, 2013, 11 pp.
Invitation to Pay Additional Fees for PCT/US2022/045694 dated Jan. 24, 2023, 13 pp.
Ishii et al., Investigation on Sound Localization using Multiple Microphone Arrays, Reflection and Spatial Information, Japanese Society for Artificial Intelligence, JSAI Technical Report, SIG-Challenge-B202-11, 2012, pp. 64-69.
Ito et al., Aerodynamic/Aeroacoustic Testing in Anechoic Closed Test Sections of Low-speed Wind Tunnels, 16th AIAA/CEAS Aeroacoustics Conference, 2010, 11 pgs.
Johansson et al., Robust Acoustic Direction of Arrival Estimation using Root-SRP-PHAT, a Realtime Implementation, IEEE International Conference on Acoustics, Speech, and Signal Processing, Mar. 2005, 4 pgs.
Johansson, et al., Speaker Localisation using the Far-Field SRP-PHAT in Conference Telephony, 2002 International Symposium on Intelligent Signal Processing and Communication Systems, 5 pgs.
Johnson, et al., "Array Signal Processing: Concepts and Techniques," p. 59, Prentice Hall, 1993, 3 pp.
Julstrom et al., Direction-Sensitive Gating: A New Approach to Automatic Mixing, J. Audio Eng. Soc., vol. 32, No. 7/8, Jul./Aug. 1984, pp. 490-506.
Kahrs, Ed., The Past, Present, and Future of Audio Signal Processing, IEEE Signal Processing Magazine, Sep. 1997, pp. 30-57.
Kallinger et al., Multi-Microphone Residual Echo Estimation, 2003 IEEE International Conference on Acoustics, Speech, and Signal Processing, Apr. 2003, 4 pgs.
Kammeyer, et al., New Aspects of Combining Echo Cancellers with Beamformers, IEEE International Conference on Acoustics, Speech, and Signal Processing, Mar. 2005, pp. III-137-III-140.
Kellermann, A Self-Steering Digital Microphone Array, 1991 International Conference on Acoustics, Speech, and Signal Processing, Apr. 1991, pp. 3581-3584.
Kellermann, Acoustic Echo Cancellation for Beamforming Microphone Arrays, in Brandstein, ed., Microphone Arrays: Techniques and Applications, 2001, Springer-Verlag Berlin Heidelberg, pp. 281-306.
Kellermann, Integrating Acoustic Echo Cancellation with Adaptive Beamforming Microphone Arrays, Forum Acusticum, Berlin, Mar. 1999, pp. 1-4.
Kellermann, Strategies for Combining Acoustic Echo Cancellation and Adaptive Beamforming Microphone Arrays, 1997 IEEE International Conference on Acoustics, Speech, and Signal Processing, Apr. 1997, 4 pgs.
Klegon, "Achieve Invisible Audio with the MXA910 Ceiling Array Microphone," Jun. 27, 2016, 10 pp.
Knapp, et al., The Generalized Correlation Method for Estimation of Time Delay, IEEE Transactions on Acoustics, Speech, and Signal Processing, vol. ASSP-24, No. 4, Aug. 1976, pp. 320-327.
Kobayashi et al., A Hands-Free Unit with Noise Reduction by Using Adaptive Beamformer, IEEE Transactions on Consumer Electronics, vol. 54, No. 1, Feb. 2008, pp. 116-122.
Kobayashi et al., A Microphone Array System with Echo Canceller, Electronics and Communications in Japan, Part 3, vol. 89, No. 10, Feb. 2, 2006, pp. 23-32.
Kolundija, et al., "Baffled circular loudspeaker array with broadband high directivity," 2010 IEEE International Conference on Acoustics, Speech and Signal Processing, Dallas, TX, 2010, pp. 73-76.
Lai, et al., "Design of Robust Steerable Broadband Beamformers with Spiral Arrays and the Farrow Filter Structure," Proc. Intl. Workshop Acoustic Echo Noise Control, 2010, 4 pp.
Lebret, et al., Antenna Array Pattern Synthesis via Convex Cptimization, IEEE Trans. on Signal Processing, vol. 45, No. 3, Mar. 1997, pp. 526-532.
LecNet2 Sound System Design Guide, Lectrosonics, Jun. 2, 2006. 28 pages.
Lectrosonics, LecNet2 Sound System Design Guide, Jun. 2006, 28 pgs.
Lee et al., Multichannel Teleconferencing System with Multispatial Region Acoustic Echo Cancellation, International Workshop on Acoustic Echo and Noise Control (IWAENC2003), Sep. 2003, pp. 51-54.
Li, "Broadband Beamforming and Direction Finding Using Concentric Ring Array," Ph. D. Dissertation, University of Missouri-Columbia, Jul. 2005, 163 pp.
Lindstrom et al., An Improvement of the Two-Path Algorithm Transfer Logic for Acoustic Echo Cancellation, IEEE Transactions on Audio, Speech, and Language Processing, vol. 15, No. 4, May 2007, pp. 1320-1326.
Liu et al., Adaptive Beamforming with Sidelobe Control: A Second-Order Cone Programming Approach, IEEE Signal Proc. Letters, vol. 10, No. 11, Nov. 2003, pp. 331-334.
Liu, et al., "Frequency Invariant Beamforming in Subbands," IEEE Conference on Signals, Systems and Computers, 2004, 5 pp.
Liu, et al., "Wideband Beamforming," Wiley Series on Wireless Communications and Mobile Computing, pp. 143-198, 2010, 297 pp.
Lobo, et al., Applications of Second-Order Cone Programming, Linear Algebra and its Applications 284, 1998, pp. 193-228.
Luo et al., Wideband Beamforming with Broad Nulls of Nested Array, Third Int'l Conf. on Info. Science and Tech., Mar. 23-25, 2013, pp. 1645-1648.
Marquardt et al., A Natural Acoustic Front-End for Interactive TV in the EU-Project Dicit, IEEE Pacific Rim Conference on Communications, Computers and Signal Processing, Aug. 2009, pp. 894-899.
Martin, Small Microphone Arrays with Postfilters for Noise and Acoustic Echo Reduction, in Brandstein, ed., Microphone Arrays: Techniques and Applications, 2001, Springer-Verlag Berlin Heidelberg, pp. 255-279.
Maruo et al., On the Optimal Solutions of Beamformer Assisted Acoustic Echo Cancellers, IEEE Statistical Signal Processing Workshop, 2011, pp. 641-644.
Matheja, et al., "Dynamic Signal Combining for Distributed Microphone Systems in Car Environments," 2011 IEEE International Conference on Acoustics, Speech and Signal Processing, May 22, 2011, 6 pp.
Mccowan, Microphone Arrays: A Tutorial, Apr. 2001, 36 pgs.
MFLCRFG Datasheet, Metal_Fab Inc., Sep. 7, 2007, 1 p.
Microphone Array Primer, Shure Question and Answer Page, <https://service.shure.com/s/article/microphone-array-primer?language=en_US>, Jan. 2019, 5 pp.
Milanovic, et al., "Design and Realization of FPGA Platform for Real Time Acoustic Signal Acquisition and Data Processing" 22nd Telecommunications Forum TELFOR, 2014, 6 pp.
Moazzen, et al., "Efficient Implementation of Broadband Beamformers Using Nested Hexagonal Arrays and Frustum Filters," IEEE Transactions on Signal Processing, vol. 61, No. 19, Oct. 1, 2013, 10 pp.

(56) References Cited

OTHER PUBLICATIONS

Mohammed, A New Adaptive Beamformer for Optimal Acoustic Echo and Noise Cancellation with Less Computational Load, Canadian Conference on Electrical and Computer Engineering, May 2008, pp. 000123-000128.
Mohammed, A New Robust Adaptive Beamformer for Enhancing Speech Corrupted with Colored Noise, AICCSA, Apr. 2008, pp. 508-515.
Mohammed, Real-time Implementation of an efficient RLS Algorithm based on IIR Filter for Acoustic Echo Cancellation, AICCSA, Apr. 2008, pp. 489-494.
Mohan, et al., "Localization of multiple acoustic sources with small arrays using a coherence test," Journal Acoustic Soc Am., 123(4), Apr. 2008, 12 pp.
Moulines, et al., "Pitch-Synchronous Waveform Processing Techniques for Text-to-Speech Synthesis Using Diphones," Speech Communication 9, 1990, 15 pp.
Multichannel Acoustic Echo Cancellation, Obtained from website http://www.buchner-net.com/mcaec.html, Jun. 2011. 3 pages.
Myllyla et al., Adaptive Beamforming Methods for Dynamically Steered Microphone Array Systems, 2008 IEEE International Conference on Acoustics, Speech and Signal Processing, Mar .- Apr. 2008, pp. 305-308.
New Shure Microflex Advance MXA910 Microphone With Intellimix Audio Processing Provides Greater Simplicity, Flexibility, Clarity, Press Release, Jun. 12, 2019, 4 pp.
Nguyen-Ky, et al., "An Improved Error Estimation Algorithm for Stereophonic Acoustic Echo Cancellation Systems," 1st International Conference on Signal Processing and Communication Systems, Dec. 17-19, 2007, 5 pp.
International Search Report and Written Opinion for PCT/US2024/026771 dated Oct. 25, 2024, 14 pp.
Double Condenser Microphone SM 69, Datasheet, Georg Neumann GmbH, available at <https://ende.neumann.com/product_files/7453/download>, 8 pp.
Eargle, "The Microphone Handbook," Elar Publ. Co., 1st ed., 1981, 4 pp.
Enright, Notes From Logan, June edition of Scanlines, Jun. 2009, 9 pp.
Fan, et al., "Localization Estimation of Sound Source by Microphones Array," Procedia Engineering 7, 2010, pp. 312-317.
Firoozabadi, et al., "Combination of Nested Microphone Array and Subband Processing for Multiple Simultaneous Speaker Localization," 6th International Symposium on Telecommunications, Nov. 2012, pp. 907-912.
Flanagan et al., Autodirective Microphone Systems, Acustica, vol. 73, 1991, pp. 58-71.
Flanagan, et al., "Computer-Steered Microphone Arrays for Sound Transduction in Large Rooms," J. Acoust. Soc. Am. 78 (5), Nov. 1985, pp. 1508-1518.
Fohhn Audio New Generation of Beam Steering Systems Available Now, audioXpress Staff, May 10, 2017, 8 pp.
Fox, et al., "A Subband Hybrid Beamforming for In-Car Speech Enhancement," 20th European Signal rocessing Conference, Aug. 2012, 5 pp.
Frost, III, An Algorithm for Linearly Constrained Adaptive Array Processing, Proc. IEEE, vol. 60, No. 8, Aug. 1972, pp. 926-935.
Gannot et al., Signal Enhancement using Beamforming and Nonstationarity with Applications to Speech, IEEE Trans. on Signal Processing, vol. 49, No. 8, Aug. 2001, pp. 1614-1626.
Gansler et al., A Double-Talk Detector Based on Coherence, IEEE Transactions on Communications, vol. 44, No. 11, Nov. 1996, pp. 1421-1427.
Gazor et al., Robust Adaptive Beamforming via Target Tracking, IEEE Transactions on Signal Processing, vol. 44, No. 6, Jun. 1996, pp. 1589-1593.
Gazor et al., Wideband Multi-Source Beamforming with Adaptive Array Location Calibration and Direction Finding, 1995 International Conference on Acoustics, Speech, and Signal Processing, May 1995, pp. 1904-1907.
Gentner Communications Corp., AP400 Audio Perfect 400 Audioconferencing System Installation & Operation Manual, Nov. 1998, 80 pgs.
Gentner Communications Corp., XAP 800 Audio Conferencing System Installation & Operation Manual, Oct. 2001, 152 pgs.
Gil-Cacho et al., Multi-Microphone Acoustic Echo Cancellation Using Multi-Channel Warped Linear Prediction of Common Acoustical Poles, 18th European Signal Processing Conference, Aug. 2010, pp. 2121-2125.
Giuliani, et al., "Use of Different Microphone Array Configurations for Hands-Free Speech Recognition in Noisy and Reverberant Environment," IRST-Istituto per la Ricerca Scientifica e Tecnologica, Sep. 22, 1997, 4 pp.
Gritton et al., Echo Cancellation Algorithms, IEEE ASSP Magazine, vol. 1, issue 2, Apr. 1984, pp. 30-38.
Hald, et al., "A class of optimal broadband phased array geometries designed for easy construction," 2002 Int'l Congress & Expo. on Noise Control Engineering, Aug. 2002, 6 pp.
Hamalainen, et al., "Acoustic Echo Cancellation for Dynamically Steered Microphone Array Systems," 2007 IEEE Workshop on Applications of Signal Processing to Audio and Acoustics, Oct. 2007, pp. 58-61.
Hayo, Virtual Controls for Real Life, Web page downloaded from https://hayo.io/ on Sep. 18, 2019, 19 pp.
Herbordt et al., A Real-time Acoustic Human-Machine Front-End for Multimedia Applications Integrating Robust Adaptive Beamforrning and Stereophonic Acoustic Echo Cancellation, 7th International Conference on Spoken Language Processing, Sep. 2002, 4 pgs.
Herbordt et al., GSAEC—Acoustic Echo Cancellation embedded into the Generalized Sidelobe Canceller, 10th European Signal Processing Conference, Sep. 2000, 5 pgs.
Herbordt et al., Multichannel Bin-Wise Robust Frequency-Domain Adaptive Filtering and Its Application to Adaptive Beamforming, IEEE Transactions on Audio, Speech, and Language Processing, vol. 15, No. 4, May 2007, pp. 1340-1351.
Herbordt, "Combination of Robust Adaptive Beamforming with Acoustic Echo Cancellation for Acoustic Human/ Machine Interfaces," Friedrich-Alexander University, 2003, 293 pgs.
Herbordt, et al., Joint Optimization of LCMV Beamforming and Acoustic Echo Cancellation for Automatic Speech Recognition, IEEE International Conference on Acoustics, Speech, and Signal Processing, Mar. 2005, pp. III-77-III-80.
Holm, "Optimizing Microphone Arrays for use in Conference Halls," Norwegian University of Science and Technology, Jun. 2009, 101 pp.
Huang et al., Immersive Audio Schemes: The Evolution of Multiparty Teleconferencing, IEEE Signal Processing Magazine, Jan. 2011, pp. 20-32.
ICONYX Gen5, Product Overview; Renkus-Heinz, Dec. 24, 2018, 2 pp.
International Search Report and Written Opinion for PCT/US2016/022773 dated Jun. 10, 2016. 13 pages.
International Search Report and Written Opinion for PCT/US2016/029751 dated Nov. 28, 2016, 21 pp.
International Search Report and Written Opinion for PCT/US2018/013155 dated Jun. 8, 2018. 12 pages.
International Search Report and Written Opinion for PCT/US2018/015269 dated Mar. 26, 2018, 12 pp.
International Search Report and Written Opinion for PCT/US2019/031833 dated Jul. 24, 2019, 16 pp.
International Search Report and Written Opinion for PCT/US2019/033470 dated Jul. 31, 2019, 12 pp.
International Search Report and Written Opinion for PCT/US2019/034692 dated Sep. 10, 2019, 11 pp.
International Search Report and Written Opinion for PCT/US2019/051491 dated Dec. 10, 2019, 13 pp.
International Search Report and Written Opinion for PCT/US2019/051989 dated Jan. 10, 2020, 15 pp.
International Search Report and Written Opinion for PCT/US2020/024063 dated Aug. 31, 2020, 18 pp.
International Search Report and Written Opinion for PCT/US2020/035185 dated Sep. 15, 2020, 11 pp.

(56) References Cited

OTHER PUBLICATIONS

International Search Report and Written Opinion for PCT/US2020/058385 dated Mar. 31, 2021, 20 pp.
International Search Report and Written Opinion for PCT/US2021/070625 dated Sep. 17, 2021, 17 pp.
International Search Report and Written Opinion for PCT/US2022/014061 dated May 10, 2022, 14 pp.
International Search Report and Written Opinion for PCT/US2022/045694 dated Mar. 17, 2023, 19 pp.
International Search Report and Written Opinion for PCT/US2022/079056 dated Feb. 17, 2023, 13 pp.
International Search Report and Written Opinion for PCT/US2023/060243 dated Apr. 6, 2023, 13 pp.
International Search Report and Written Opinion for PCT/US2023/075377 dated Feb. 8, 2024, 11 pp.
International Search Report for PCT/US2020/024005 dated Jun. 12, 2020, 12 pp.
InvenSense, "Microphone Array Beamforming," Application Note AN-1140, Dec. 31, 2013, 12 pp.
Invitation to Pay Additional Fees for PCT/US2024/026771 dated Sep. 3, 2024, 8 pp.
Office Action for Taiwan Patent Application No. 105109900 dated May 5, 2017. 10 pages.
Office Action issued for Japanese Patent Application No. 2015-023781 dated Jun. 20, 2016, 4 pp.
Oh, et al., "Hands-Free Voice Communication in an Automobile With a Microphone Array," 1992 IEEE International Conference on Acoustics, Speech, and Signal Processing, Mar. 1992, pp. I-281-1-284.
Olszewski, et al., "Steerable Highly Directional Audio Beam Loudspeaker," Interspeech 2005, 4 pp.
Omologo, Multi-Microphone Signal Processing for Distant-Speech Interaction, Human Activity and Vision Summer School (HAVSS), Inria Sophia Antipolis, Oct. 3, 2012, 79 pgs.
Order, Conduct of the Proceeding, *Clearone, Inc.* v. *Shure Acquisition Holdings, Inc.*, Nov. 2, 2020, 10 pp.
Pados et al., An Iterative Algorithm for the Computation of the MVDR Filter, IEEE Trans. on Signal Processing, vol. 49 no. 2, Feb. 2001, pp. 290-300.
Palladino, "This App Lets You Control Your Smarthome Lights via Augmented Reality," Next Reality Mobile AR News, Jul. 2, 2018, 5 pp.
Parikh, et al., "Methods for Mitigating IP Network Packet Loss in Real Time Audio Streaming Applications," GatesAir, 2014, 6 pp.
Pasha, et al., "Clustered Multi-channel Dereverberation for Ad-hoc Microphone Arrays," Proceedings of APSIPA Annual Summit and Conference, Dec. 2015, pp. 274-278.
Petitioner's Motion for Sanctions, *Clearone, Inc.* v. *Shure Acquisition Holdings, Inc.*, Aug. 24, 2020, 20 pp.
Pettersen, "Broadcast Applications for Voice-Activated Microphones," db, Jul./Aug. 1985, 6 pgs.
Pfeifenberger, et al., "Nonlinear Residual Echo Suppression using a Recurrent Neural Network," Interspeech 2020, 5 pp.
Phoenix Audio Technologies, "Beamforming and Microphone Arrays—Common Myths", Apr. 2016, http://info.phnxaudio.com/blog/microphone-arrays-beamforming-myths-1, 19 pp.
Plascore, PCGA-XR1 3003 Aluminum Honeycomb Data Sheet, 2008, 2 pgs.
Polycom Inc., Vortex EF2211/EF2210 Reference Manual, 2003, 66 pgs.
Polycom, Inc., Polycom SoundStructure C16, C12, C8, and SR12 Design Guide, Nov. 2013, 743 pgs.
Polycom, Inc., Setting Up the Polycom HDX Ceiling Microphone Array Series, https://support.polycom.com/content/dam/polycom-support/products/Telepresence-and-Video/HDX%20Series/setup-maintenance/en/hdx_ceiling_microphone_array_setting_up.pdf, 2010, 16 pgs.
Polycom, Inc., Vortex EF2241 Reference Manual, 2002, 68 pgs.
Polycom, Inc., Vortex EF2280 Reference Manual, 2001, 60 pp.
Pomona, Model 3306, Datasheet, Jun. 9, 1999, 1 p.
Powers, et al., "Proving Adaptive Directional Technology Works: A Review of Studies," The Hearing Review, Apr. 6, 2004, 5 pp.
Prime, et al., "Beamforming Array Optimisation Averaged Sound Source Mapping on a Model Wind Turbine," ResearchGate, Nov. 2014, 10 pp.
Rabinkin et al., Estimation of Wavefront Arrival Delay Using the Cross-Power Spectrum Phase Technique, 132nd Meeting of the Acoustical Society of America, Dec. 1996, pp. 1-10.
Rane Corp., Halogen Acoustic Echo Cancellation Guide, AEC Guide Version 2, Nov. 2013, 16 pgs.
Rao, et al., "Fast LMS/Newton Algorithms for Stereophonic Acoustic Echo Cancelation," IEEE Transactions on Signal Processing, vol. 57, No. 8, Aug. 2009. 12 pages.
Reuven et al., Joint Acoustic Echo Cancellation and Transfer Function GSC in the Frequency Domain, 23rd IEEE Convention of Electrical and Electronics Engineers in Israel, Sep. 2004, pp. 412-415.
Reuven et al., Joint Noise Reduction and Acoustic Echo Cancellation Using the Transfer-Function Generalized Sidelobe Canceller, Speech Communication, vol. 49, 2007, pp. 623-635.
Reuven, et al., "Multichannel Acoustic Echo Cancellation and Noise Reduction in Reverberant Environments Using the Transfer-Function GSC," 2007 IEEE International Conference on Acoustics, Speech and Signal Processing, Apr. 2007, 4 pp.
Ristimaki, Distributed Microphone Array System for Two-Way Audio Communication, Helsinki Univ. of Technology, Master's Thesis, Jun. 15, 2009, 73 pgs.
Rombouts et al., An Integrated Approach to Acoustic Noise and Echo Cancellation, Signal Processing 85, 2005, pp. 849-871.
Sällberg, "Faster Subband Signal Processing," IEEE Signal Processing Magazine, vol. 30, No. 5, Sep. 2013, 6 pp.
Sasaki et al., A Predefined Command Recognition System Using a Ceiling Microphone Array in Noisy Housing Environments, 2008 IEEE/RSJ International Conference on Intelligent Robots and Systems, Sep. 2008, pp. 2178-2184.
Sennheiser, New microphone solutions for ceiling and desk installation, https://en-us.sennheiser.com/news-new-microphone-solutions-for-ceiling-and-desk-installation, Feb. 2011, 2 pgs.
Sennheiser, TeamConnect Ceiling, https://en-us.sennheiser.com/conference-meeting-rooms-teamconnect-ceiling, 2017, 7 pgs.
Serdes, Wikipedia article, last edited on Jun. 25, 2018; retrieved on Jun. 27, 2018, 3 pp., https://en.wikipedia.org/wiki/SerDes.
Sessler, et al., "Directional Transducers," IEEE Transactions on Audio and Electroacoustics, vol. AU-19, No. 1, Mar. 1971, pp. 19-23.
Sessler, et al., "Toroidal Microphones," Journal of Acoustical Society of America, vol. 46, No. 1, 1969, 10 pp.
Shure AMS Update, vol. 1, No. 1, 1983, 2 pgs.
Shure AMS Update, vol. 4, No. 4, 1997, 8 pgs.
Shure Debuts Microflex Advance Ceiling and Table Array Microphones, Press Release, Feb. 9, 2016, 4 pp.
Shure Inc., A910-HCM Hard Ceiling Mount, retrieved from website <http://www.shure.com/en-US/products/accessories/a910hcm> on Jan. 16, 2020, 3 pp.
Shure Inc., Microflex Advance, http://www.shure.com/americas/microflex-advance, 12 pgs.
Shure Inc., MX395 Low Profile Boundary Microphones, 2007, 2 pgs.
Shure Inc., MXA910 Ceiling Array Microphone, http://www.shure.com/americas/products/microphones/microflex-advance/mxa910-ceiling-array-microphone, 7 pp. 2009-2017.
Shure, MXA910 With IntelliMix, Ceiling Array Microphone, available at <https://www.shure.com/en-US/products/microphones/mxa910>, as early as 2020, 12 pp.
Shure, New MXA910 Variant Now Available, Press Release, Dec. 13, 2019, 5 pp.
Shure, Q&A in Response to Recent US Court Ruling on Shure MXA910, Available at <https://www.shure.com/en-US/meta/legal/q-and-a-inresponse-to-recent-US-court-ruling-on-shure-mxa910-response>, As early as 2020, 5 pp.
Shure, RK244G Replacement Screen and Grille, Datasheet, 2013, 1 p.

(56) References Cited

OTHER PUBLICATIONS

Shure, The Microflex Advance MXA310 Table Array Microphone, Available at <https://www.shure.com/en-US/products/microphones/mxa310>, As early as 2020, 12 pp.
Buck, et al., "Self-Calibrating Microphone Arrays for Speech Signal Acquisition: A Systematic Approach," Signal Processing, vol. 86, 2006, pp. 1230-1238.
Burton, et al., "A New Structure for Combining Echo Cancellation and Beamforming in Changing Acoustical Environments," IEEE International Conference on Acoustics, Speech and Signal Processing, 2007, pp. 1-77-1-80.
BZ-3a Installation Instructions, XEDIT Corporation, Available at <chrome-extension://efaidnbmnnnibpcajpcglclefindmkaj/viewer.html?pdfurl=https%3A%2F%2Fwww.servoreelers.com%2Fmt-content%2Fuploads%2F2017%2F05%2Fbz-a-3universal-2017c.pdf&clen=189067&chunk=true>, 1 p.
Cabral, et al., Glottal Spectral Separation for Speech Synthesis, IEEE Journal of Selected Topics in Signal Processing, 2013, 15 pp.
Campbell, "Adaptive Beamforming Using a Microphone Array for Hands-Free Telephony," Virginia Polytechnic Institute and State University, Feb. 1999, 154 pgs.
Canetto, et al., "Speech Enhancement Systems Based on Microphone Arrays," VI Conference of the Italian Society for Applied and Industrial Mathematics, May 27, 2002, 9 pp.
Cao, "Survey on Acoustic Vector Sensor and its Applications in Signal Processing" Proceedings of the 33rd Chinese Control Conference, Jul. 2014, 17 pp.
Cech, et al., "Active-Speaker Detection and Localization with Microphones and Cameras Embedded into a Robotic Head," IEEE-RAS International Conference on Humanoid Robots, Oct. 2013, pp. 203-210.
Chan, et al., "Uniform Concentric Circular Arrays with Frequency-Invariant Characteristics-Theory, Design, Adaptive Beamforming and DOA Estimation," IEEE Transactions on Signal Processing, vol. 55, No. 1, Jan. 2007, pp. 165-177.
Chau, et al., "A Subband Beamformer on an Ultra Low-Power Miniature DSP Platform," 2002 IEEE International Conference on Acoustics, Speech, and Signal Processing, 4 pp.
Chen, et al., "A General Approach to the Design and Implementation of Linear Differential Microphone Arrays," Signal and Information Processing Association Annual Summit and Conference, 2013 Asia-Pacific, IEEE, 7 pp.
Chen, et al., "Design and Implementation of Small Microphone Arrays," PowerPoint Presentation, Northwestern Polytechnical University and Institut national de la recherche scientifique, Jan. 1, 2014, 56 pp.
Chen, et al., "Design of Robust Broadband Beamformers with Passband Shaping Characteristics using Tikhonov Regularization," IEEE Transactions on Audio, Speech, and Language Processing, vol. 17, No. 4, May 2009, pp. 565-681.
Chou, "Frequency-Independent Beamformer with Low Response Error," 1995 International Conference on Acoustics, Speech, and Signal Processing, pp. 2995-2998, May 9, 1995, 4 pp.
Chu, "Desktop Mic Array for Teleconferencing," 1995 International Conference on Acoustics, Speech, and Signal Processing, May 1995, pp. 2999-3002.
Circuit Specialists webpage for an aluminum enclosure, available at <https://www.circuitspecialists.com/metal-instrument-enclosure-la7.html?otaid=gpl&gclid=EAlalQobChMI2JTw-Ynm6AlVgbblCh3F4QKuEAkYBiABEgJZMPD_BWE>, 3 pp, 2019.
ClearOne Introduces Ceiling Microphone Array With Built-In Dante Interface, Press Release; GlobeNewswire, Jan. 8, 2019, 2 pp.
ClearOne Launches Second Generation of its Groundbreaking Beamforming Microphone Array, Press Release, Acquire Media, Jun. 1, 2016, 2 pp.
ClearOne to Unveil Beamforming Microphone Array with Adaptive Steering and Next Generation Acoustic Echo Cancellation Technology, Press Release, InfoComm, Jun. 4, 2012, 1 p.
Clearone, Clearly Speaking Blog, "Advanced Beamforming Microphone Array Technology for Corporate Conferencing Systems," Nov. 11, 2013, 5 pp., http://www.clearone.com/blog/advanced-beamforming-microphone-array-technology-for-corporate-conferencing-systems/.
Clearone, Beamforming Microphone Array, Mar. 2012, 6 pgs.
Clearone, Ceiling Microphone Array Installation Manual, Jan. 9, 2012, 20 pgs.
Clearone, Converge/Converge Pro, Manual, 2008, 51 pp.
Clearone, Professional Conferencing Microphones, Brochure, Mar. 2015, 3 pp.
Coleman, "Loudspeaker Array Processing for Personal Sound Zone Reproduction," Centre for Vision, Speech and Signal Processing, 2014, 239 pp.
Cook, et al., An Alternative Approach to Interpolated Array Processing for Uniform Circular Arrays, Asia-Pacific Conference on Circuits and Systems, 2002, pp. 411-414.
Cox, et al., "Robust Adaptive Beamforming," IEEE Trans. Acoust., Speech, and Signal Processing, vol. ASSP-35, No. 10, Oct. 1987, pp. 1365-1376.
CTG Audio, Ceiling Microphone CTG CM-01, Jun. 5, 2008, 2 pgs.
CTG Audio, CM-01 & CM-02 Ceiling Microphones Specifications, 2 pgs.
CTG Audio, CM-01 & CM-02 Ceiling Microphones, 2017, 4 pgs.
CTG Audio, CTG FS-400 and RS-800 with "Beamforming" Technology, Datasheet, As early as 2009, 2 pp.
CTG Audio, CTG User Manual for the FS- 400/800 Beamforming Mixers, Nov. 2008, 26 pp.
CTG Audio, Expand Your IP Teleconferencing to Full Room Audio, Obtained from website htt. )://www ct audio com/ex and-, our-i -teleconforencino-to-ful-room-audio-while-conquennc. 1-echo-cancelation-issues Mull, 2014. 3 pages.
CTG Audio, Frequently Asked Questions, As early as 2009, 2 pp.
CTG Audio, Installation Manual and User Guidelines for the Soundman SM 02 System, May 2001, 29 pp.
CTG Audio, Installation Manual, Nov. 21, 2008, 25 pgs.
CTG Audio, Introducing the Ctg FS-400 and FS-800 with Beamforming Technology, As early as 2008, 2 pp.
CTG Audio, Meeting the Demand for Ceiling Mics in the Enterprise 5 Best Practices, Brochure, 2012, 9 pp.
CTG Audio, White on White—Introducing the CM-02 Ceiling Microphone, https://ctgaudio.com/white-on-white-introducing-the-cm-02-ceiling-microphone/, Feb. 20, 2014, 3 pgs.
Dahl et al., Acoustic Echo Cancelling with Microphone Arrays, Research Report 3/95, Univ. of Karlskrona/Ronneby, Apr. 1995, 64 pgs.
Decawave, Application Note: APR001, UWB Regulations, A Summary of Worldwide Telecommunications Regulations governing the use of Ultra-Wideband radio, Version 1.2, 2015, 63 pp.
Desiraju, et al., "Efficient Multi-Channel Acoustic Echo Cancellation Using Constrained Sparse Filter Updates in the Subband Domain," Acoustic Speech Enhancement Research, Sep. 2014, 4 pp.
Dibiase et al., Robust Localization in Reverberent Rooms, in Brandstein, ed., Microphone Arrays: Techniques and Applications, 2001, Springer-Verlag Berlin Heidelberg, pp. 157-180.
Diethorn, "Audio Signal Processing For Next-Generation Multimedia Communication Systems," Chapter 4, 2004, 9 pp.
Digikey webpage for Converta box (last visited Apr. 22, 2020) <https://www.digikey.com/product-detail/en/bud-industries/CU-452-A/377-1969-ND/439257?utm_adgroup=Boxes&utm_source=google&utm_medium=cpc&utm_campaign=Shopping_Boxes%2C%20Enclosures%2C%20Racks_NEW&utm_term=&utm_content=Boxes&gclid=EAlalQobChMI2JTw-Ynm6AlVgbblCh3F4QKuEAkYCSABEgKybPD_BWE>, 3 pp.
Digikey webpage for Pomona Box (last visited Apr. 22, 2020) available at <https://www.digikey.com/product-detail/en/pomonaelectronics/3306/501-2054-ND/736489>, 2 pp.
Digital Wireless Conference System, MCW-D 50, Beyerdynamic Inc., 2009, 18 pp.
Do et al., A Real-Time SRP-PHAT Source Location Implementation using Stochastic Region Contraction (SRC) on a Large-Aperture Microphone Array, 2007 IEEE International Conference on Acoustics, Speech and Signal Processing—ICASSP '07, , Apr. 2007, pp. I-121-1-124.

(56) References Cited

OTHER PUBLICATIONS

Dominguez, et al., "Towards an Environmental Measurement Cloud: Delivering Pollution Awareness to the Public," International Journal of Distributed Sensor Networks, vol. 10, Issue 3, Mar. 31, 2014, 17 pp.
Dormehl, "Hololens concept lets you control your smart home via augmented reality," digitaltrends, Jul. 26, 2016, 12 pp.
Signal Processor MRX7-D Product Specifications, Yamaha Corporation, 2016. 12 pages.
Silverman et al., Performance of Real-Time Source-Location Estimators for a Large-Aperture Microphone Array, IEEE Transactions on Speech and Audio Processing, vol. 13, No. 4, Jul. 2005, pp. 593-606.
Sinha, Ch. 9: Noise and Echo Cancellation, in Speech Processing in Embedded Systems, Springer, 2010, pp. 127-142.
SM 69 Stereo Microphone, Datasheet, Georg Neumann GmbH, Available at <https://ende.neumann.com/product_files/6552/download>, 1 p.
Soda et al., Introducing Multiple Microphone Arrays for Enhancing Smart Home Voice Control, The Institute of Electronics, Information and Communication Engineers, Technical Report of IEICE, Jan. 2013, 6 pgs.
Soundweb London Application Guides, BSS Audio, 2010. 120 pgs.
Symetrix, Inc., SymNet Network Audio Solutions Brochure, 2008, 32 pgs.
Tan, et al., "Pitch Detection Algorithm: Autocorrelation Method and AMDF," Department of Computer Engineering, Prince of Songkhla University, Jan. 2003, 6 pp.
Tandon, et al., "An Efficient, Low-Complexity, Normalized LMS Algorithm for Echo Cancellation," 2nd Annual IEEE Northeast Workshop on Circuits and Systems, Jun. 2004, pp. 161-164.
Tetelbaum et al., Design and Implementation of a Conference Phone Based on Microphone Array Technology, Proc. Global Signal Processing Conference and Expo (GSPx), Sep. 2004, 6 pgs.
Tiete et al., SoundCompass: A Distributed MEMS Microphone Array-Based Sensor for Sound Source Localization, SENSORS, Jan. 23, 2014, pp. 1918-1949.
TOA Corp., Ceiling Mount Microphone AN-9001 Operating Instructions, http://www.toaelectronics.com/media/an9001_mt1e.pdf, 1 pg.
Togami, et al., "Subband Beamformer Combined with Time-Frequency ICA for Extraction of Target Source Under Reverberant Environments," 17th European Signal Processing Conference, Aug. 2009, 5 pp.
U.S. Appl. No. 16/598,918, filed Oct. 10, 2019, 50 pp.
Van Compernolle, Switching Adaptive Filters for Enhancing Noisy and Reverberant Speech from Microphone Array Recordings, Proc. IEEE Int. Conf. on Acoustics, Speech, and Signal Processing, Apr. 1990, pp. 833-836.
Van Trees, Optimum Array Processing: Part IV of Detection, Estimation, and Modulation Theory, 2002, 54 pgs., pp. i-xxv, 90-95, 201-230.
Van Veen et al., Beamforming: A Versatile Approach to Spatial Filtering, IEEE ASSP Magazine, vol. 5, issue 2, Apr. 1988, pp. 4-24.
Vicente, "Adaptive Array Signal Processing Using the Concentric Ring Array and the Spherical Array," Ph.D. Dissertation, University of Missouri, May 2009, 226 pp.
Wang et al., Combining Superdirective Beamforming and Frequency-Domain Blind Source Separation for Highly Reverberant Signals, EURASIP Journal on Audio, Speech, and Music Processing, vol. 2010, pp. 1-13.
Warsitz, et al., "Blind Acoustic Beamforming Based on Generalized Eigenvalue Decomposition," IEEE Transactions on Audio, Speech and Language Processing, vol. 15, No. 5, 2007, 11 pp.
Weinstein, et al., "LOUD: A 1020-Node Microphone Array and Acoustic Beamformer," 14th International Congress on Sound & Vibration, Jul. 2007, 8 pgs.
Weinstein, et al., "LOUD: A 1020-Node Modular Microphone Array and Beamformer for Intelligent Computing Spaces," MIT Computer Science and Artifical Intelligence Laboratory, 2004, 18 pp.
Wung, "A System Approach to Multi-Channel Acoustic Echo Cancellation and Residual Echo Suppression for Robust Hands-Free Teleconferencing," Georgia Institute of Technology, May 2015, 167 pp.
XAP Audio Conferencing Brochure, ClearOne Communications, Inc., 2002. 78 pages.
Yamaha Corp., MRX7-D Signal Processor Product Specifications, 2016, 12 pgs.
Yamaha Corp., PJP-100H Ip Audio Conference System Owner's Manual, Sep. 2006, 59 pgs.
Yamaha Corp., PJP-EC200 Conference Echo Canceller Brochure, Oct. 2009, 2 pgs.
Yan et al., Convex Optimization Based Time-Domain Broadband Beamforming with Sidelobe Control, Journal of the Acoustical Society of America, vol. 121, No. 1, Jan. 2007, pp. 46-49.
Yensen et al., Synthetic Stereo Acoustic Echo Cancellation Structure with Microphone Array Beamforming for VOIP Conferences, 2000 IEEE International Conference on Acoustics, Speech, and Signal Processing, Jun. 2000, pp. 817-820.
Yermeche, et al., "Real-Time DSP Implementation of a Subband Beamforming Algorithm for Dual Microphone Speech Enhancement," 2007 IEEE International Symposium on Circuits and Systems, 4 pp.
Zavarehei, et al., "Interpolation of Lost Speech Segments Using LP-HNM Model with Codebook Post-Processing," IEEE Transactions on Multimedia, vol. 10, No. 3, Apr. 2008, 10 pp.
Zhang, et al., "F-T-LSTM based Complex Network for Joint Acoustic Echo Cancellation and Speech Enhancement," Audio, Speech and Language Processing Group, Jun. 2021, 5 pp.
Zhang, et al., "Multichannel Acoustic Echo Cancelation in Multiparty Spatial Audio Conferencing with Constrained Kalman Filtering," 11th International Workshop on Acoustic Echo and Noise Control, Sep. 14, 2008, 4 pp.
Zhang, et al., "Selective Frequency Invariant Uniform Circular Broadband Beamformer," EURASIP Journal on Advances in Signal Processing, vol. 2010, pp. 1-11.
Zheng, et al., "Experimental Evaluation of a Nested Microphone Array With Adaptive Noise Cancellers," IEEE Transactions on Instrumentation and Measurement, vol. 53, No. 3, Jun. 2004, 10 pp.

* cited by examiner

MULTI-DIMENSIONAL ARRAY MICROPHONE

CROSS-REFERENCE

This application claims priority to U.S. Provisional Pat. App. No. 63/501,998, filed on May 12, 2023, the contents of which are incorporated herein in their entirety.

TECHNICAL FIELD

This application generally relates to an array microphone. In particular, this application relates to a multi-dimensional array microphone configured to provide improved frequency-dependent directivity.

BACKGROUND

Audio environments, such as conference rooms, boardrooms, and other meeting rooms, video conferencing settings, and the like, can involve the use of one or more microphones to capture sound from various audio sources active in the environment. The audio sources may include in-room human speakers, for example. The captured sound may be disseminated to a local audience in the environment through speakers (for sound reinforcement) and/or to others located remotely (such as via a telecast, webcast, or the like). For example, persons in a conference room may be conducting a conference call with persons at a remote location.

In general, microphones and other audio capturing devices, such as, e.g., conferencing devices, are available in a variety of sizes, form factors, mounting options, and wiring options to suit the needs of particular environments. Moreover, the microphones can be designed to produce different polar response patterns, including, for example, omnidirectional, cardioid, subcardioid, supercardioid, hypercardioid, and bidirectional. The types of conferencing devices, their operational characteristics (e.g., lobe direction, gain, polar pattern, etc.), and their placement in a particular audio environment may depend on a number of factors, including, for example, the locations of the audio sources, locations of listeners, the desire to exclude unwanted noises, physical space requirements, aesthetics, room layout, and/or other considerations. As an example, in some environments, a conferencing device may be placed on a table or lectern to be near the audio sources and/or listeners. In other environments, a conferencing device may be mounted overhead or on a wall to capture the sound from, or project sound towards, the entire room, for example.

Micro-Electrical-Mechanical-System ("MEMS") microphones, or microphones that have a MEMS element as the core transducer, have become increasingly popular due to their smaller package size, thus enabling the audio device to have a smaller, thinner profile overall (e.g., compared to traditional microphones like dynamic, crystal, condenser/capacitor, boundary, button, etc.); high performance characteristics (e.g., high signal-to-noise ratio ("SNR"), low power consumption, good sensitivity, etc.); lower cost (e.g., compared to electret or condenser microphone cartridges); and general ease of assembly. While a conventional MEMS microphone, by itself, has an inherently omnidirectional polar pattern (i.e. the microphone is equally sensitive to sounds coming from any and all directions, regardless of the microphone's orientation), placing MEMS microphones in an array configuration, and applying appropriate beamforming techniques (e.g., signal processing), can produce a directional response, or a beam pattern that is more sensitive to sound coming from one or more specific directions than sound coming from other directions.

SUMMARY

The techniques of this disclosure provide systems and methods designed to, among other things, (1) provide an array microphone with a three-dimensional structure and microphone layout that has improved directivity transverse to the axis of the array, (2) steerable control of the array's direction of greatest sensitivity to any point at any azimuth and elevation around a sphere surrounding the center of the array, using appropriate beamforming techniques, thus providing increased ability to direct the array to where it is most effective at collecting sound, as well as generation of nulls, and (3) high performance acoustic characteristics suitable for conferencing environments, stage, sports, and other entertainment environments, including selective coverage of the stage or audience and/or isolation of ambience from game audio, and live sound reinforcement.

For example, one embodiment includes an array microphone comprising a plurality of microphone boards arranged in a linear pattern along a first axis and comprising a plurality of microphone elements configured to cover a plurality of frequency bands, each microphone board comprising: a first linear array comprising a first microphone element of the plurality of microphone elements and one or more second microphone elements of the plurality of microphone elements, the first microphone element located on the first axis and the one or more second microphone elements located on a second axis orthogonal to the first axis, and a second linear array comprising the first microphone element and one or more third microphone elements of the plurality of microphone elements, the one or more third microphone elements located on a third axis orthogonal to the first axis and to the second axis. According to various aspects, the linear pattern can be configured to place the microphone boards in a harmonically-nested configuration for covering the plurality of frequency bands.

Another example embodiment provides an array microphone comprising a plurality of microphone boards arranged in a first linear pattern along a first axis of the array microphone, the plurality of microphone boards comprising a plurality of microphone elements configured to cover a plurality of frequency bands, each microphone board comprising: a first microphone element of the plurality of microphone elements located on the first axis; one or more second microphone elements of the plurality of microphone elements located on a second axis of the microphone board, the second axis being orthogonal to the first axis; and one or more third microphone elements of the plurality of microphone elements located on a third axis of the microphone board, the third axis being orthogonal to the first axis and to the second axis, wherein the first microphone elements of the plurality of microphone boards are configured to form the first linear pattern along the first axis, and for each microphone board, the first microphone element and the one or more second microphone elements are configured to form a second linear pattern along the second axis of the corresponding microphone board, and the first microphone element and the one or more third microphone elements are configured to form the second linear pattern along the third axis of the corresponding microphone board.

Another example embodiment provides a microphone system, comprising: an array microphone comprising a plurality of microphone elements arranged on a plurality of microphone boards, the array microphone configured to provide audio coverage for a plurality of frequency bands; and one or more audio processors in communication with the array microphone and comprising one or more beamformers, the one or more audio processors being configured to, using the one or more beamformers: steer an audio pick-up lobe of the array microphone towards an audio source detected at a first point; and generate an audio output based on audio signals generated by the audio source and captured using the audio pick-up lobe, wherein the one or more beamformers are configured for steering the audio pick-up lobe towards any one of a plurality of points located on a sphere surrounding a center of the array microphone, the plurality of points comprising the first point. According to some aspects, the plurality of points are located at different azimuths and elevations around the sphere. According to some aspects, the plurality of points cover a solid angle of four times pi steradians. According to some aspects, the audio pick-up lobe comprises a direction of highest sensitivity for the array microphone.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
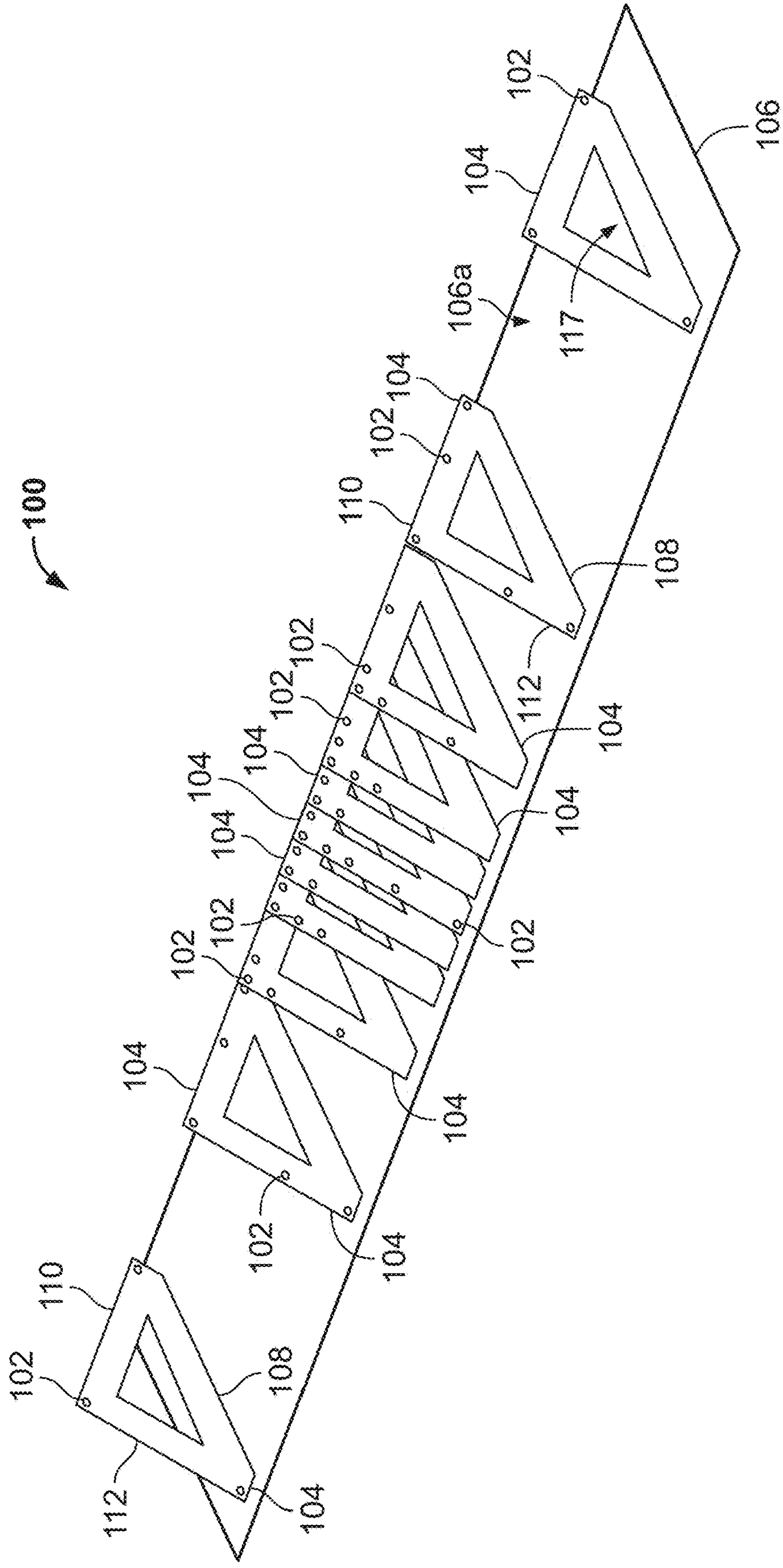
FIG. 1 is a schematic diagram of an exemplary array microphone placed in a horizontal orientation, in accordance with one or more embodiments.
Figure 2:
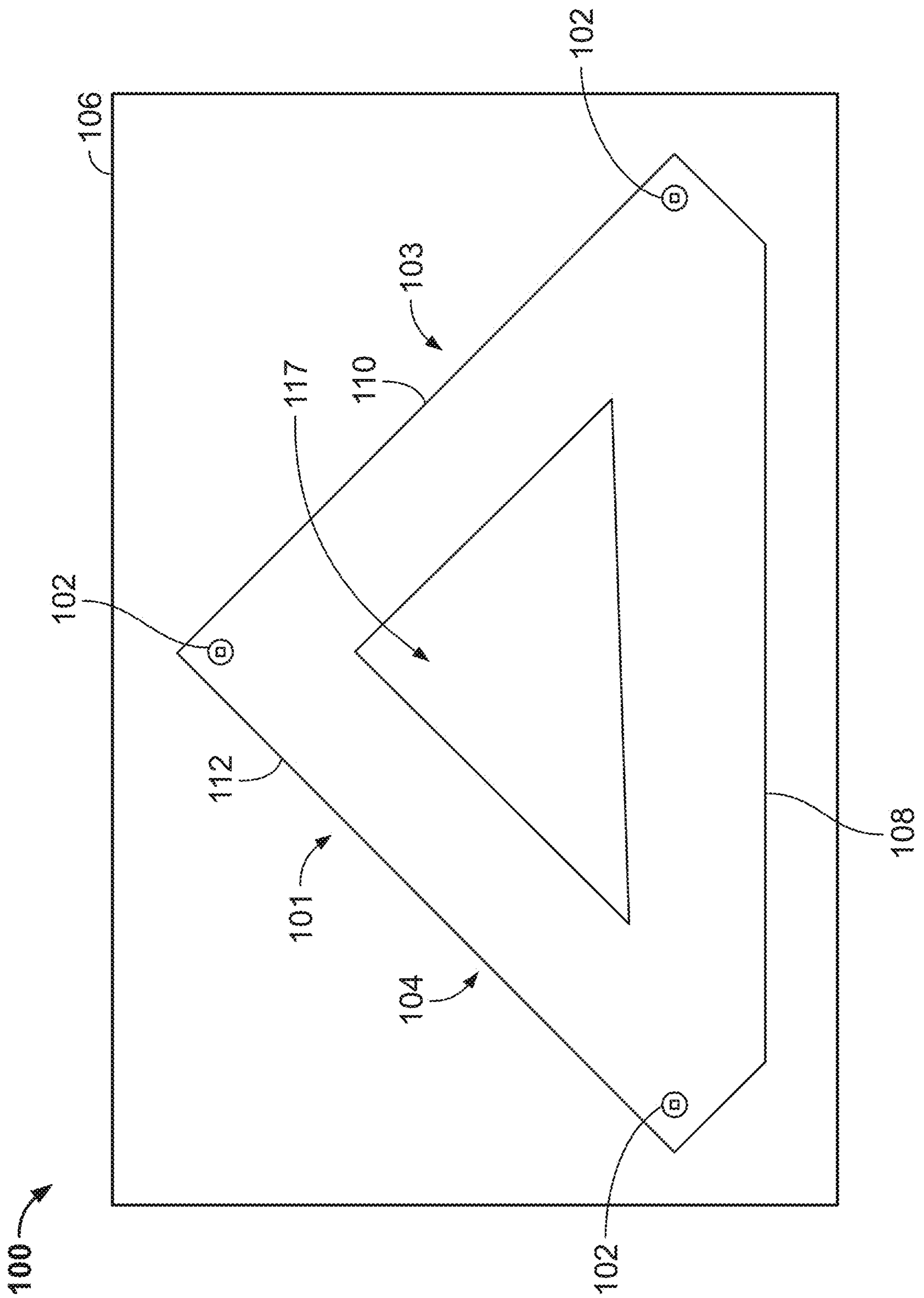
FIG. 2 is a side view of the array microphone of FIG. 1, in accordance with one or more embodiments.

In general, array microphones are comprised of multiple microphone elements aligned in a specific pattern or geometry (e.g., linear, circular, etc.) and configured to operate as a single microphone device. For example, a linear array microphone is comprised of microphone elements situated relatively close together along a single axis. Array microphones can have different configurations and frequency responses depending on the placement of the microphone elements relative to each other and the direction of arrival for sound waves. The directionality of array microphones can also provide steerable coverage, or pick up patterns that focus on desired audio sources and reject unwanted sounds, such as room noise, and this steerability can enable pick up of multiple audio sources with a single array or device. For example, a broadside linear array comprised of a line of MEMS microphones arranged perpendicular to the preferred direction of sound arrival can achieve a desired pickup pattern using a delay and sum beamformer to combine the signals from the various microphone elements accordingly. In some broadside arrays, the microphone elements are placed in nested pairs about a central point and may be spaced apart from each by certain predetermined distances in order to cover a variety of frequencies.

Systems and methods are provided herein for a multi-dimensional array microphone that has added directivity for most, if not all, frequencies in all dimensions. In particular, the array microphone comprises a first plurality of microphone elements arranged in a linear pattern along a first axis, a second plurality of differential and complementary microphone elements arranged along a second perpendicular axis, and a third plurality of differential and complementary microphone elements arranged along a third, mutually perpendicular axis. The linear pattern can be configured to place the first plurality of microphone elements in a harmonically-nested configuration for covering a plurality of frequency bands. The second and third pluralities of microphone elements can be configured to form second and third linear patterns, respectively, that are mirror images of each other. This geometry provides not only array control perpendicular to the first axis (or the axis of the array microphone) but also, control around the axis of the array, such that the direction of maximum or greatest microphone sensitivity can be pointed towards any location at any azimuth and elevation within a sphere surrounding the center of the array, or covering a solid angle of 4*pi steradians, using appropriate beamforming techniques. For example, in embodiments, microphone elements along two or more axes can be combined to generate any first-order pattern (e.g., cardioid, toroidal, etc.) steered to any direction about the defined sphere in order to capture a desired sound source, or generate a null for rejecting an unwanted sound source.

Moreover, the multi-dimensional form factor of the array microphone is provided by arranging the microphone elements on a plurality of microphone boards (e.g., made of printed circuit board (PCB) substrate or the like) that are structurally independent but electrically linked together and configured to minimize the impacts of the array structure on the incident acoustic field. For example, in embodiments, each board is aligned with the first axis at a central point for supporting a respective one of the first plurality of microphones and has a predefined shape that extends out from that point and is configured to support the second plurality of microphones along the second axis and support the third plurality of microphones along the third axis. The multi-dimensional structure is further configured to minimize the total number of microphone elements used and the amount of PCB substrate used, so as to reduce the diffraction and geometric shading that would otherwise be present in a three-dimensional array, all while improving the directivity and flexibility of the array.

FIGS. 1 through 3B illustrate an exemplary array microphone 100 for detecting sounds from one or more audio sources at various frequencies, such as speech spoken by human speakers, in accordance with embodiments. The array microphone 100 may be utilized in a conferencing environment, such as, for example, a conference room, a boardroom, or other meeting room, in an entertainment environment, such as, for example, a stage, a sports arena, or other live performance venue, or any other environment where the audio sources may include one or more human speakers or talkers. Other sounds may be present in the environment which may be undesirable, such as ambient noises and/or noises from ventilation systems, other persons (e.g., audience members, non-participants of the conference call, etc.), audio/visual equipment, electronic devices, etc. In a conferencing situation, the audio sources may be seated in chairs at a table, although other configurations and placements of the audio sources are contemplated and possible, including, for example, audio sources that move about the room. Similarly, in a live performance situation, the audio sources may be located on one or more stages or other performance areas, at designated positions and/or may move about the stage or between stages.

The array microphone 100 comprises a plurality of microphone elements 102 (also referred to herein as "transducers" and "cartridges") capable of forming multiple pickup patterns in order to optimally or consistently detect and capture sound from the audio sources. The polar patterns that can be formed by the array microphone 100 may depend on the placement of the microphone elements 102 within the array 100, as well as the type of beamformer(s) used to process the audio signals generated by the microphone elements 102. For example, a sum and differential beamformer may be used to form a cardioid, subcardioid, supercardioid, hypercardioid, bidirectional, and/or toroidal polar pattern directed to a desired sound source. Additional polar patterns may be created by combining the original polar patterns, and the combined pattern can be steered to any angle along the plane of, for example, the table on which the array microphone 100 rests, the wall on which the array microphone 100 is mounted, or other plane that is perpendicular to the axis of the array microphone 100. In some embodiments, a combination of beamforming techniques can be used to steer the direction of highest sensitivity to any direction at any azimuth and elevation around a sphere that surrounds the center of the array, or to cover a solid angle of 4*pi steradians. Other beamforming techniques may be utilized to combine the outputs of the microphone elements 102, so that the overall array microphone 100 achieves a desired frequency response, including, for example, lower noise characteristics, higher microphone sensitivity, and coverage of discrete frequency bands, as described in more detail herein. More description of the beamforming techniques used with the array microphone 100 is provided below with reference to FIGS. 10 through 12.

In preferred embodiments, each of the microphone elements 102 may be a MEMS (micro-electrical mechanical system) transducer with an inherent omnidirectional polar pattern. In some embodiments, the microphone elements 102 may be any type of omnidirectional microphone. In other embodiments, the microphone elements 102 may have other polar patterns and/or may be condenser microphones, dynamic microphones, piezoelectric microphones, or other types of traditional microphones. In still other embodiments, the arrangement and/or processing techniques described herein can be applied to other types of arrays comprised of omnidirectional transducers or sensors where directionality is desired (such as, e.g., sonar arrays, radio frequency applications, seismic devices, etc.). Also, although FIG. 1 shows a specific number of microphone elements 102, other amounts of microphone elements (e.g., more or fewer) are possible and contemplated.

Each of the microphone elements 102 can detect sound and convert the sound into an audio signal. In some cases, the audio signal can be a digital audio output (e.g., MEMS transducers). For other types of microphones, the audio signal may be an analog audio output, and components of the array microphone 100, such as analog to digital converters, processors, and/or other components, may process the analog audio signals to ultimately generate one or more digital audio output signals. The digital audio output signals may conform to the Dante standard for transmitting audio over Ethernet, in some embodiments, or may conform to another standard. In certain embodiments, one or more pickup patterns may be formed by a processor of the array microphone 100 from the audio signals of the microphone elements 102, and the processor may generate a digital audio output signal corresponding to each of the pickup patterns. In other embodiments, the microphone elements 102 may output analog audio signals and other components and devices (e.g., processors, mixers, recorders, amplifiers, etc.) external to the array microphone 100 that may process the analog audio signals.

As shown in FIG. 1, the array microphone 100 comprises a plurality of microphone boards 104 configured to comprise or support the plurality of microphone elements 102. The plurality of microphone boards 104 (also referred to as "unit cells") may be enclosed in a housing 106, which is only partially shown in each of FIGS. 1 through 3 for ease of illustration, as will be appreciated. The microphone elements 102 may be mechanically and/or electrically coupled to the microphone boards 104. The microphone boards 104 (also referred to as "supports") may be independent structures that are mechanically attached to the housing 106 and electrically coupled to each other and/or one or more processors or other electronic devices for receiving and processing audio signals captured by the microphone elements 102 (see, e.g., system 300 of FIG. 9). The microphone boards 104 may be made of a printed circuit board ("PCB"), a PCB substrate, or other suitable substrate or material. The housing 106 may be made of aluminum, plastic, or any other suitable material. While the illustrated embodiment shows the housing 106 as having a generally rectangular shape, in other embodiments the housing may have any other suitable shape or design. In some embodiments, two or more microphone boards 104 may be combined (e.g., side by side) to form a single unit, for example, in order to decrease the total number of boards 104.

The plurality of microphone boards 104 can be configured to position the microphone elements 102 in three-dimensional space so that they collectively form a multi-dimensional array configured to cover a plurality of frequency bands (e.g., 20 hertz (Hz)≤f≤20 kilohertz (kHz)). In particular, each microphone board 104 may have a matching or uniform shape comprised of multiple sides or surfaces for positioning the microphone elements 102 in different dimensions, as well as a bottom or back side for positioning the overall board 104 in an upright manner. For example, in the illustrated embodiment, the microphone boards 104 have a generally triangular shape with three sides meeting to form three corners. A first side 108 of each board 104 is attached to a mounting surface 106*a* of the housing 106, while the other two sides 110 and 112 are freestanding and substantially perpendicular to the mounting surface 106*a*. As shown, the microphone elements 102 may be included on the freestanding sides 110 and 112 of the microphone boards 104, while the first side 108 (also referred to herein as a "plain side") may have no microphone elements 102 thereon. This arrangement ensures that the microphone elements 102 are positioned in free space and, for example, away from any circuitry near the mounting surface 106*a* or other part of the housing 106. In other embodiments, the microphone boards 104 may be configured to form any other shape capable of implementing the techniques described herein.

According to embodiments, the array microphone 100 can produce a substantially consistent frequency response across a variety of settings or orientations, including, for example, whether mounted on a wall or other vertical surface, placed on a table, desktop, lectern, or other horizontal surface, or attached to a ceiling. That is, regardless of the array orientation, the audio pick-up lobes of the array microphone 100 can be directed towards a desired sound source with increased rear rejection and steering control, or isolated forward acceptance, thus improving the array's ability to reject unwanted sound sources and reflections in the room and provide a high signal to noise ratio (SNR) in any dimension.

Figure 3A:
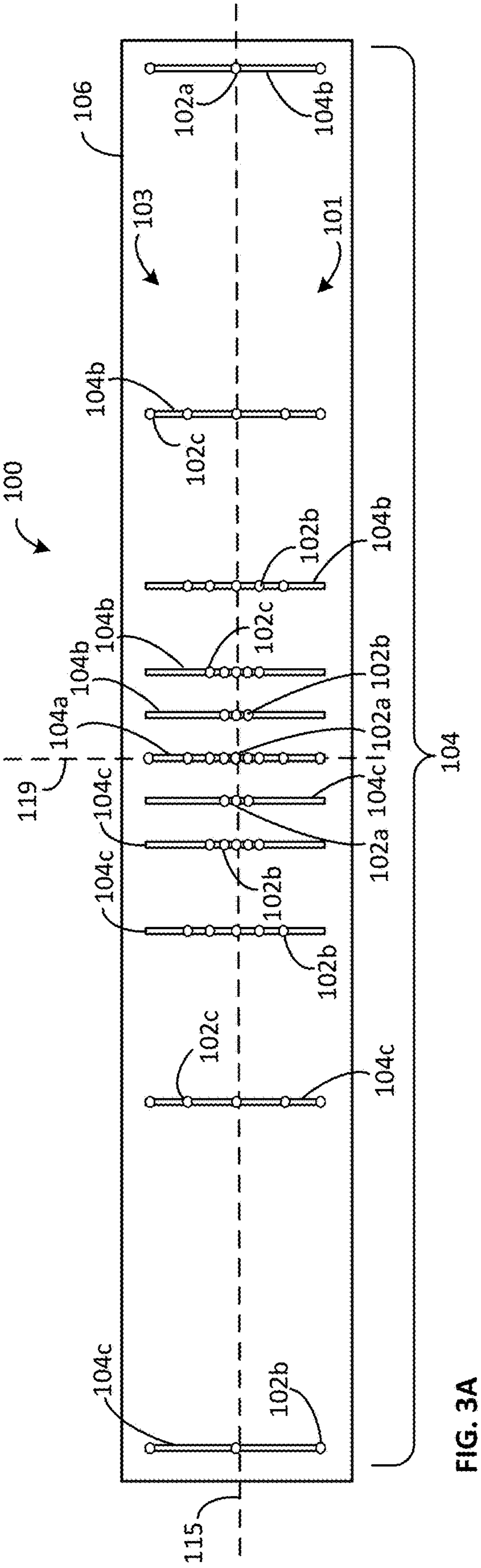
FIG. 3A is a top view of the array microphone of FIG. 1, in accordance with one or more embodiments.
Figure 3B:
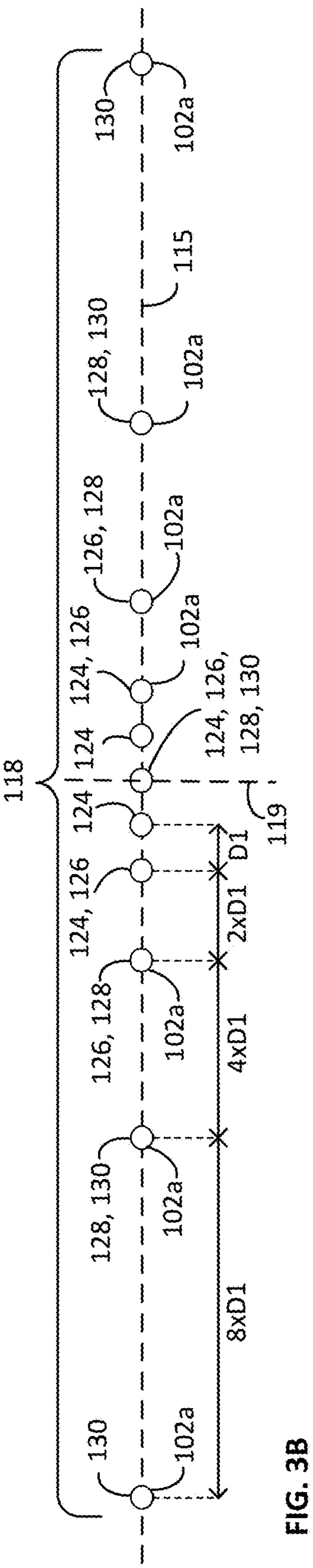
FIG. 3B is partial close-up view of a primary array included in the array microphone of FIG. 3A, in accordance with one or more embodiments.
Figure 4:
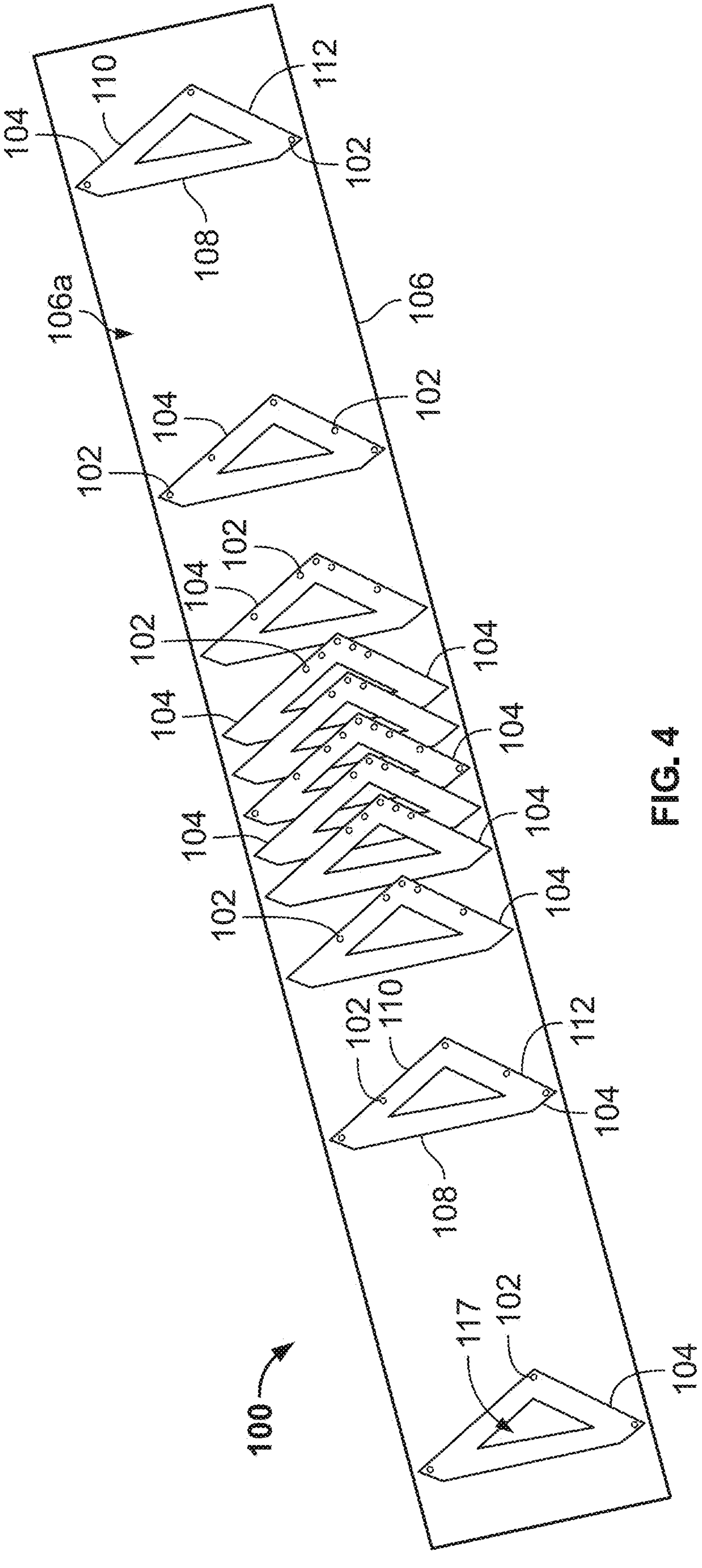
FIG. 4 is a schematic diagram of the array microphone of FIG. 1 placed in a vertical orientation, in accordance with one or more embodiments.
Figure 5A:
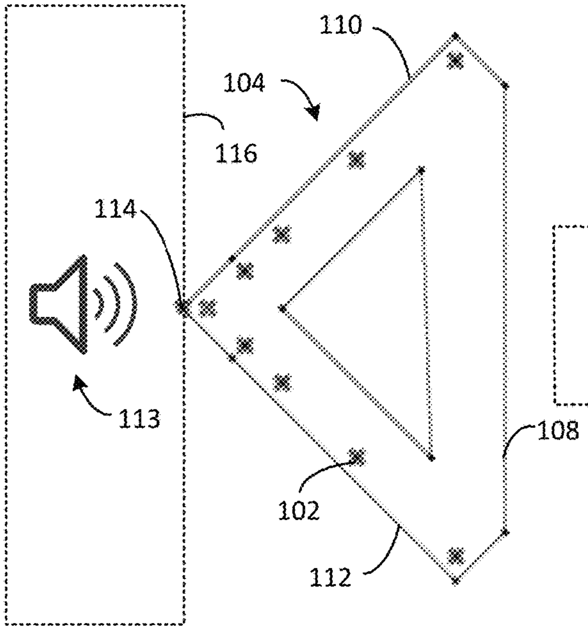
FIG. 5A is a schematic diagram of an exemplary microphone board placed in a vertical orientation, in accordance with one or more embodiments.
Figure 5B:
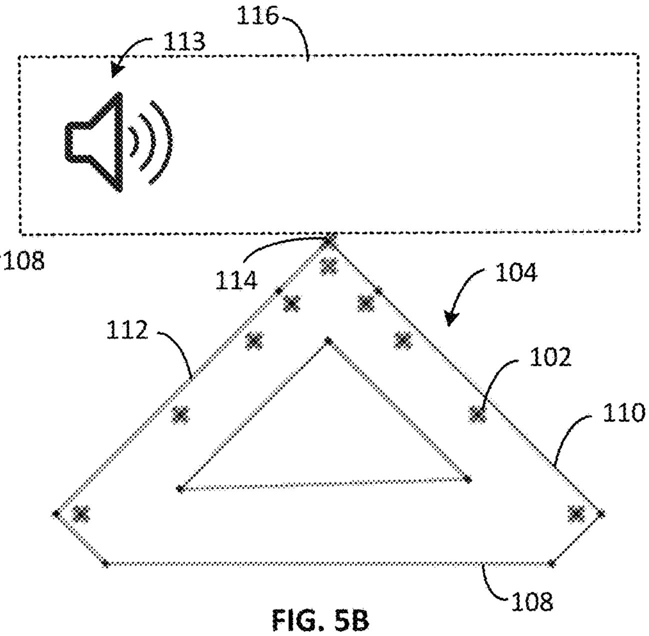
FIG. 5B is a schematic diagram of the microphone board of FIG. 5A placed in a horizontal orientation, in accordance with one or more embodiments.

To illustrate, FIGS. 1 through 3B show the array microphone 100 arranged in a horizontal orientation, or where the mounting surface 106*a* of the housing 106 is placed flat on a horizontal surface (not shown), while FIG. 4 shows the array microphone 100 arranged in a vertical orientation, or where the mounting surface 106*a* is placed flat against a vertical surface. As shown in FIGS. 5A and 5B, a given sound source 113 may impact the array microphone 100 at different angles, or have different directions of arrival relative to the array, depending on whether the boards 104 are oriented vertically or horizontally. For example, when the array microphone 100 is placed in the horizontal orientation, as in FIG. 5B, the sound source 113 may be directed towards one side 112 of the microphone boards 104, and when the array microphone 100 is placed in the vertical orientation, as in FIG. 5A, the sound source 113 may be directed towards a center 114 of the microphone boards 104, or perpendicular to a first axis 115 of the array (also referred to herein as the "axis of the array" and shown in FIG. 3A). In embodiments, the array microphone 100 can be configured, using the microphone placement and beamforming techniques described herein, to steer a main lobe or sound beam to any location within a plane 116 that is perpendicular to the axis 115 of the array. In some embodiments, additional beamforming techniques may be used to steer the main lobe to any direction at any azimuth and elevation around a sphere surrounding the center of the array, thus allowing the array microphone 100 to optimally capture the sound source 113 while in any orientation. The array microphone 100 can also use similar techniques to isolate or reject sound sources (e.g., unwanted talkers or other noise sources) coming from other directions within the plane 116, or the defined sphere, as described herein.

According to embodiments, dividing the microphone elements 102 across multiple microphone boards 104 that are structurally and physically separate allows for a more efficient use of the copper lines or wires, and minimizes or reduces an impact of the overall array structure on an incident acoustic field. Minimizing the structural footprint of the array microphone 100 also reduces the diffraction, resonance, and geometric shading, or shadowing effects, that would otherwise be present in a three-dimensional array structure, as will be appreciated. In embodiments, the microphone boards 104, themselves, are also configured to have minimal interactions with the incident acoustic field by reducing the structural footprint of each board 104. For example, as shown, each microphone board 104 has a cut-out or open center 117 to minimize the amount of PCB substrate, or other material, used to create the structure of the board 104. In some embodiments, the open center 117 may be configured (e.g., sized and shaped) to be as large as possible while still leaving enough room on the board 104 for placement and/or attachment of the microphone elements 102 and to maintain a structural integrity of the board 104. Similarly, a thickness of each microphone board 104 may be selected to further minimize interactions with the incident acoustic field while also maintaining the structural integrity and stability of the board 104.

In embodiments, the microphone boards 104 can be linearly arranged along a length of the array microphone 100, or its housing 106, and perpendicular to a preferred or expected direction of arrival for incoming sound waves, so as to form a linear pattern along the first axis 115 (or common axis) of the array microphone 100. For example, as shown in FIG. 3A, the linear pattern may be formed by aligning the center 117 of each board 104 with the first axis 115 and arranging the boards 104 substantially parallel to each other, or to an axis 119 that is orthogonal to the first axis 115 and parallel to the mounting surface 106*a* of the housing 106. As illustrated, the linear pattern is configured such that the plurality of microphone boards 104 comprises a central microphone board 104*a*, a first group of microphone boards 104*b* arranged on one side of the central microphone board 104*a* in a first pattern, and a second group of microphone boards 104*c* arranged on an opposite side of the central microphone board 104*a* in a second pattern that is a mirror image of the first pattern.

Figure 7:
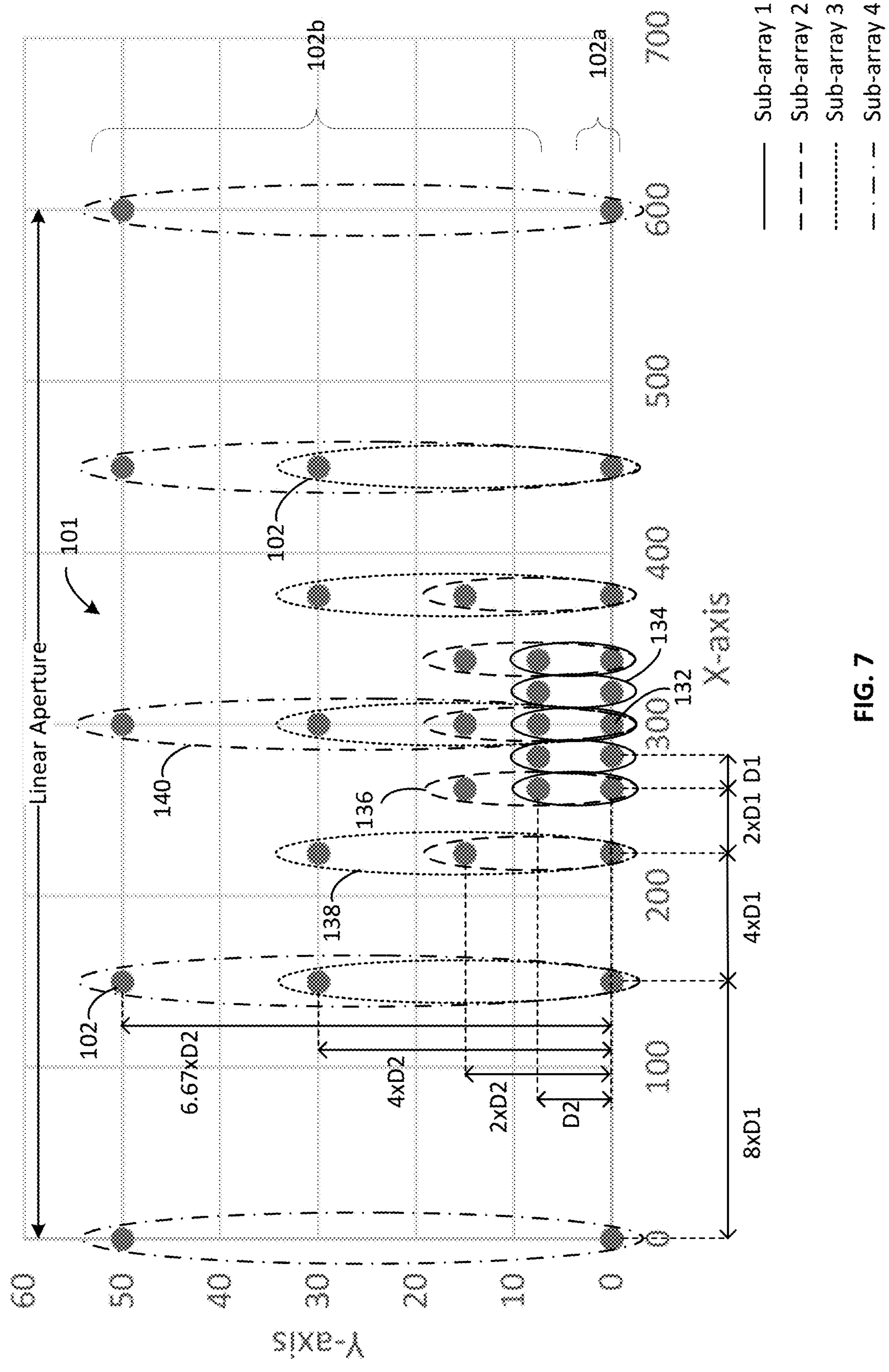
FIG. 7 is a schematic diagram of a first plane of the array microphone of FIG. 1, in accordance with one or more embodiments.

According to embodiments, the linear pattern formed by the microphone boards 104 along the first axis 115 can be configured to place the microphone boards 104 in a harmonically-nested configuration for covering a desired plurality of frequency bands, using one or more beamformers or other audio processing techniques. For example, the linear pattern formed by the microphone boards 104 can be configured to operate in different octaves (e.g., 600-1200 Hertz (Hz), 1200-2400 Hz, 2400-4800 Hz, etc.) within the covered plurality of frequency bands, so that the overall beam pattern for the array microphone 100 remains essentially constant from octave to octave. In some embodiments, the linear pattern may be implemented using a sub-band-based scaled aperture (SSA) approach that uses a different array aperture for each octave, so that progressively lower frequency octaves are processed by progressively wider linear arrays. In order to enhance spatial resolution, the aperture of the linear array formed by the microphone boards 104 may be doubled when moving from a higher octave to the next lower one (e.g., as shown in FIG. 7 and described in more detail below).

As best seen in FIG. 3A, each microphone board 104 comprises a select number of the plurality of microphone elements 102, with the central microphone board 104*a* comprising a largest number of microphone elements 102 (e.g., nine) and the other microphone boards 104*b* and 104*c* comprising a fewer number of microphone elements 102 (e.g., three or five). In embodiments, each microphone board 104 is configured to contain all of the microphone elements 102 that are necessary to build a functional array at the given location of the board 104 along the first axis 115. Thus, the exact number of microphone elements 102 included on each microphone board 104 may vary depending on a number of factors, such as, for example, a placement of the board 104 within the linear pattern formed by the plurality of microphone boards 104, a linear aperture of the overall array microphone 100, the plurality of frequency bands covered by the array microphone 100, a size and/or type of the microphone elements 102, a size and/or shape of the microphone boards 104, and/or a spacing between adjacent microphone boards 104, as described in more detail below. In embodiments, because the total number of microphone elements 102 that may be included on any given microphone board 104 will be nine or less, the audio signals captured by each microphone board 104 can be multiplexed into a TDM16 stream in all cases, or can be split into a TDM16 stream for the central microphone board 104*a* (which has the maximum number of microphone elements 102) and TDM8 streams for the rest of the microphone boards 104*b* and 104*c*. This can help minimize the use of copper wire or lines in each microphone board 104 and/or between the boards 104.

As also shown in FIG. 3A, each of the plurality of microphone boards 104 comprises a first microphone element 102*a* that is disposed on the first axis 115, or otherwise at or near the center 114 of the microphone board 104. As further shown by the close-up view in FIG. 3B, because of this placement at the center 114, the first microphone elements 102*a* may be linearly arranged along the first axis 115 to form the same linear pattern as the microphone boards 104. In various embodiments, the first microphone elements 102*a* may be configured to collectively form a primary array 118 that helps generate consistent behaviors during steering, while maximizing reuse of the microphone elements 102*a* and minimizing total microphone count within the primary array 118. For example, as shown in FIG. 3B, the primary array 118 may be comprised of eleven first microphone elements 102*a* arranged to form four harmonically-nested sub-arrays, each sub-array comprising a select five of the first microphone elements 102*a* (as further described below with respect to FIG. 7).

Figure 6:
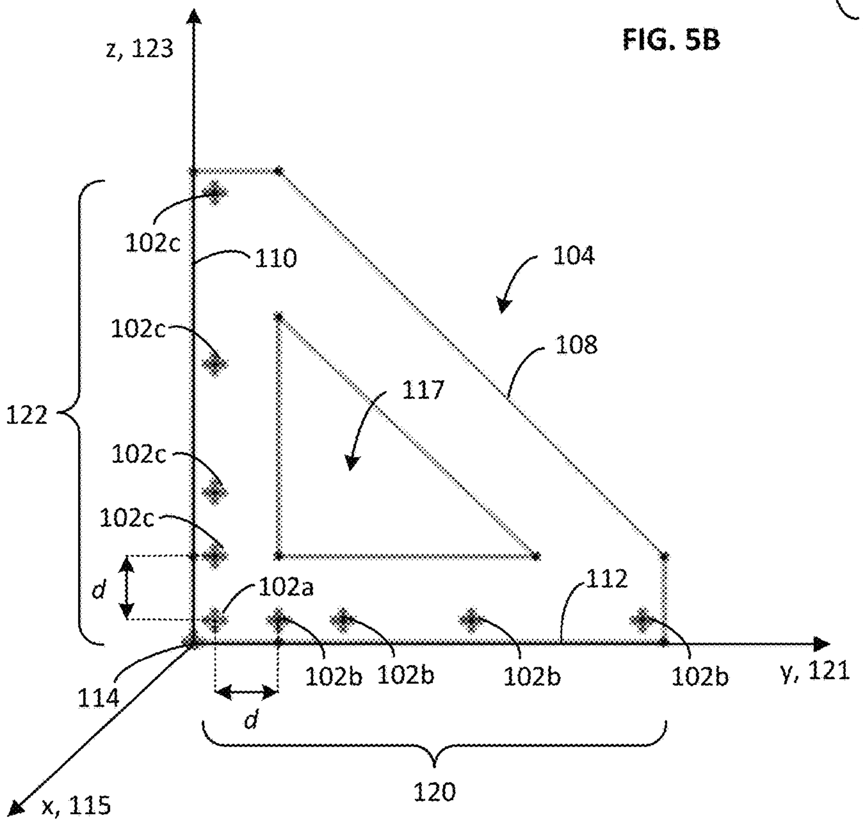
FIG. 6 is a schematic diagram of an exemplary microphone board oriented relative to XYZ axes, in accordance with one or more embodiments.

Referring additionally to FIG. 6, an exemplary microphone board 104 is shown oriented relative to XYZ axes, for ease of explanation. In particular, as shown, the center 114 of the board 104 aligns with a center (0, 0, 0) of the XYZ axes, and the axis of the array (e.g., first axis 115) aligns with the X-axis. In order to orient the rest of the board 104 to the XYZ axes, the microphone board 104 may be rotated about the first axis 115 so that the two sides 110 and 112 are aligned with the Z and Y axes, respectively. It should be appreciated that during use, the microphone board 104 may be oriented at different angles relative to the center of the XYZ axes depending on the orientation of the array microphone 100, for example, as shown in FIGS. 5A and 5B. Moreover, while FIG. 6 specifically shows the central microphone board 104*a*, similar principles may be used for placement of microphone elements 102 on one or more of the other microphone boards 104*b* and 104*c*.

According to embodiments, each microphone board 104 comprises a first linear array 120 disposed along a second axis 121 (e.g., the Y axis) that is orthogonal to the first axis 115 (e.g., the X axis) and a second linear array 122 disposed along a third axis 123 (e.g., the Z axis) that is orthogonal to both the first axis 115 and the second axis 121, as shown in FIG. 6. On each board 104, the first linear array 120 comprises the first microphone element 102*a*, which is disposed on the first axis 115 and at the center 114 of the board 104, and one or more second microphone elements 102*b* of the plurality of microphone elements 102, the second microphone elements 102*b* being disposed on the second axis 121 that is orthogonal to the first axis 115. Similarly, the second linear array 122 on each board 104 comprises the same first microphone element 102*a* and one or more third microphone elements 102*c* of the plurality of microphone elements 102, the third microphone elements 102*c* being disposed on the third axis 123 that is orthogonal to both the first axis 115 and the second axis 121. In embodiments, the first microphone elements 102*a* may be reused in each of the secondary arrays 120 and 122 and to create the primary array 118, so that the total number of microphone elements 102 included in the array microphone 100 is reduced, thus increasing efficiency and performance of the array while also reducing costs and complexity, as will be appreciated.

The secondary arrays 120 and 122 can be configured to form differential arrays along the second axis 121 and the third axis 123, respectively, based on harmonic nesting techniques, as described in more detail with respect to FIG. 7. As shown in FIG. 6, the first linear array 120 and the second linear array 122 may be disposed substantially perpendicular to each other and to the primary array 118 formed along the first axis 115. In addition, on each microphone board 104, the second linear array 122 along the third axis 123 may be configured as a mirror image of the first linear array 120 along the second axis 121. For example, as shown in FIG. 6, the first microphone element 102*a* is located a distance d from a first one of the second microphone elements 102*b* along the second axis 121. Likewise, the first microphone element 102*a* is located the same distance d from a first one of the third microphone elements 102*c* along the third axis 123. A similar correspondence may be present for each of the other microphone elements 102*b* and 102*c*, as well as in each of the other microphone boards 104*b* and 104*c*, for example, as seen in FIG. 3A when comparing the microphone elements 102 located above the first axis 115 to the microphone elements 102 located below the first axis 115. In embodiments, on each microphone board 104, a distance along the second axis 121 between the first microphone element 102*a* and each of the one or more second microphone elements 102*b* may be configured based on respective octaves of the plurality of frequency bands, and a distance along the third axis 123 between the first microphone element 102*a* and each of the one or more third microphone elements 102*c* may be respectively configured based on the same octaves. Thus, the array microphone 100 can be configured to provide respective differential arrays situated along the orthogonal axes 121 and 123 of each microphone board 104.

In embodiments, using one or more beamforming techniques described herein, each of the differential arrays formed on the microphone boards 104 may be configured to generate a first-order polar pattern that is oriented along a line defined by the microphone elements 102 in that array (e.g., along the second axis 121 or the third axis 123), and is directable in either the positive or negative direction. In addition, the resulting first-order polar patterns, from all or many of the microphone boards 104, can be combined to steer an overall audio pick-up lobe of the array microphone 100 towards any direction within the plane 116 (or the YZ plane in FIG. 6) that is transverse to the axis of the array (or the first axis 115), using one or more beamforming techniques described herein, thus providing the array microphone 100 with improved directivity. The primary array 118 can also be combined with one or more of the secondary arrays 120 and 122 to steer the overall audio pick-up lobe to any direction at any azimuth and elevation around a sphere surrounding the center of the array, e.g., the central microphone element 132, such that the array microphone 100 can cover a solid angle of, for example, 4*pi steradians.

In embodiments, the microphone elements 102 are arranged across the microphone boards 104 to collectively form a harmonically nested linear array, using one or more beamforming techniques. For example, the plurality of microphone elements 102 may be configured to form, across the plurality of microphone boards 104, a first sub-array for covering a first octave of the covered plurality of frequency bands and a second sub-array for covering a second octave of the plurality of frequency bands, the first sub-array being nested within the second sub-array, for example, as shown in FIG. 7. In such cases, the first microphone elements **102*a* in the first sub-array may be separated by a first distance along the first axis 115, and the first microphone elements 102*a* in the second sub-array may be separated by a second distance along the first axis 115 that is twice the first distance, such that the first sub-array and the second sub-array are harmonically nested, as also shown in FIG. 7**.

Referring back to FIG. 3A, since each microphone board 104 includes a respective one of the first microphone elements **102*a*, a spacing or distance between each set of adjacent microphone boards 104 along the first axis 115 may also be determined based on harmonic nesting principles. This also means the first linear arrays 120 on the sides 112 of the boards 104 may be harmonically nested relative to each other, and the second linear arrays 122 on the sides 110 of the boards 104 may be harmonically nested relative to each other as well. In some embodiments, the first linear arrays 120 can be combined, or aggregated, to form a first harmonically nested linear array directed parallel to the second axis 121 of any given microphone board 104, and the second linear arrays 122 can be combined to form a second harmonically nested linear array directed parallel to the third axis 123 of any given microphone board 104. These first and second harmonically nested linear arrays may then be combined to form the primary harmonically nested linear array of the array microphone 100, which can be steered to any direction within the plane 116 that is transverse to the first axis 115, or the axis of the array. The resulting first-order polar pattern can be further steered to a specific angle relative to the axis of the array, at any azimuth or elevation within a sphere centered on the array microphone 100, by aggregating the first and second linear arrays 120 and 122 with the primary array 118, which may be processed using a traditional linear array beamformer (e.g., delay and sum, differential, MVDR, etc.), as described herein. As will be understood, arranging the microphone elements 102 in harmonically nested sub-arrays (or nests) may be more efficient and economical because one or more of the microphone elements 102 can be reused as part of multiple sub-arrays (or nests), thus reducing the total number of microphone elements 102 required to cover the octaves of interest for the array microphone 100**.

Referring additionally to FIG. 7, shown is an exemplary harmonically-nested microphone arrangement on a first plane 101 (or portion) of the array microphone 100 of FIG. 1, in accordance with embodiments. As shown in the top view of FIG. 3A, the first plane 101 may be positioned on one side of the array microphone 100, for example, relative to a plane (not shown) that comprises the first axis 115 and extends perpendicular to the axis 119, or otherwise bisects the array microphone 100, while a second plane 103 of the array microphone 100 may be positioned on the opposite side or half of the array microphone 100 (e.g., relative to the bisecting plane). In FIG. 7, the first plane 101 is shown situated on an XY plane of the XYZ axes shown in FIG. 6, for ease of explanation. For example, the first plane 101 may be positioned on the XY plane by orienting all of the microphone boards 104 in the array microphone 100 so that the center 114 of each board 104 is disposed along the X axis of the XY plane (e.g., the first axis 115 shown in FIG. 6) and the side 112 of each board 104 aligns with the Y axis of the XY plane (e.g., the second axis 121 shown in FIG. 6).

In the illustrated example, the second plane 103 of the array microphone 100, though not shown, may be situated on a XZ plane of the XYZ axes because the second plane 103 is comprised of the board sides 110 that are aligned with the Z axis of the XZ plane (e.g., the third axis 123 shown in FIG. 6). In embodiments, the second plane 103 of the array microphone 100 may be a mirror image of the first plane 101, since the second linear array 122 disposed on the side 110 of each microphone board 104 is a mirror image of the first linear array 120 disposed on the side 112 of the same board 104. Accordingly, for the sake of brevity, the following description of FIG. 7 will primarily refer to the microphone arrangement disposed on the first plane 101. However, it should be appreciated that the second plane 103 has the same or similar characteristics as the first plane 101 and that similar techniques may be used to form a harmonically-nested microphone arrangement on the second plane 103 of the array microphone 100.

The harmonically-nested arrangement of the microphone elements **102*a* and 102*b* on the first plane 101 of the array microphone 100 will now be described with reference to FIGS. 3B and 7. As shown in FIG. 3B, the first microphone elements 102*a* may include a first group of elements 124 that are spaced apart from each other by a first distance, D1, to form a first sub-array (or nest) that is configured to cover a first, or Nth, frequency octave. As also shown in FIG. 3B, the first microphone elements 102*a* further include a second group of elements 126 that are configured to form a second sub-array for covering a second, or next lower, frequency octave (e.g., (N−1)th octave) by spacing the elements 126 apart by a second distance that is twice the first distance, D1. Similarly, FIG. 3B also shows that the first microphone elements 102*a* include a third group of elements 128 configured to form a third sub-array for covering a third, still lower, octave (e.g., (N−2)th octave) by spacing the elements 128 apart by a third distance that is twice the second distance, or four times the first distance, D1. As also shown in FIG. 3B, the first microphone elements 102*a* further include a fourth group of elements 130 configured to form a fourth sub-array for covering a fourth, still lower, octave (e.g., (N−3)th octave) by spacing the elements 130 apart by a fourth distance that is twice the third distance, or eight times the first distance, D1. In other words, the distance or spacing between the first microphone elements 102*a* may be halved for each octave's worth of frequencies, or increased by a factor of 2 for each decreasing octave. As a result, the microphone elements 124 for covering the highest, or Nth, octave are closest together, or form the smallest aperture size, and the microphone elements 130** for covering the lowest octave (e.g., (N−3)th octave), and below, are furthest apart, or form the largest aperture size.

In a preferred embodiment, harmonic nesting techniques are used to select the distances between adjacent first microphone elements 102*a* in the primary array 118, such that the linear pattern formed by the first, second, third, and fourth sub-arrays are harmonically nested, as shown in FIG. 3B. This arrangement may be more efficient and economical because one or more of the first microphone elements 102*a* can be reused as part of multiple sub-arrays, thus reducing the total number of microphone elements 102*a* required to cover the octaves of interest for the array microphone 100. In particular, because the second and third sub-arrays are placed at different double multiples (e.g., 2 and 4, respectively) of the distance D1 between the first microphone elements 102*a* in the first sub-array, the first sub-array can be nested within the second and third sub-arrays, and the second sub-array can be nested within the third sub-array, as also shown in FIG. 7. As a result, some of the first microphone elements 102*a* can be reused for multiple nests. For example, as shown in FIGS. 3B and 7, a central element 132 of the plurality of first microphone elements 102*a* may be reused for each of the first, second, third, and fourth sub-arrays. As another example, at least three of the elements 124 in the first sub-array also form part of the second sub-array, and at least three of the elements 126 from the second sub-array also form part of the third sub-array.

Various considerations may be used to determine the smallest distance value, D1, between the first microphone elements 102*a* along the first axis 115 and thus, the distance between adjacent microphone boards 104. In some embodiments, the distance between adjacent microphone boards 104 along the first axis 115 may be configured based on a frequency value included in the covered plurality of frequency bands. In such cases, the distance, D1, between the first microphone elements 102*a* may be selected based on the frequency bands that are to be spatially sampled in the array microphone 100. In some embodiments, the distance between adjacent microphone boards 104 along the first axis 115 may be configured based on a linear aperture size of the array microphone 100. In such cases, the distance, D1, between the first microphone elements 102*a* may be selected based on the desired linear array aperture size, as well as a total number of the first microphone elements 102*a* being used to form the linear array pattern (or primary array 118), thus enabling the array microphone 100 to have a scalable geometry that can be reconfigured to fit the design needs of a particular application. Other design considerations may also determine the D1 value, including, for example, desired locations for the frequency nulls, a desired amount of electrical delay, spatial sampling density, criteria for avoiding spatial aliasing, and processing overhead. In one example embodiment, the D1 distance is approximately 150 millimeters (mm) along the axis of the array.

As depicted in FIG. 7, the first plane 101 further comprises the second microphone elements 102*b* (also referred to herein as "additional microphone elements") that are arranged orthogonal to the first microphone elements 102*a*, or along the second axis 121 of the respective microphone board 104, to create differential arrays for added directivity at the various frequencies or octaves of interest. In particular, on each microphone board 104, the second microphone elements 102*b* are added to duplicate the first microphone element 102*a* included thereon in terms of placement relative to the first axis 115, but are disposed on the second axis 121 that is orthogonal to the corresponding first microphone element 102*a* and perpendicular to the first axis 115, such as, e.g., the Y axis shown in FIGS. 6 and 7 (also referred to herein as an "orthogonal axis").

In embodiments, on each microphone board 104, each of the second microphone elements 102*b* and the first microphone element 102*a* being duplicated thereby jointly form a microphone set, or differential pair, that is configured to operate in a frequency octave covered by the duplicated first microphone element 102*a*. For example, in each microphone set, a spacing or distance between the first microphone element 102*a* and the corresponding second microphone element 102*b* along the orthogonal axis 121 may be selected based on the frequency octave covered by that set. Moreover, the first and second microphone elements 102*a* and 102*b* of each microphone set may be treated or handled as a single microphone unit of the array microphone 100 by acoustically combining the two microphone elements 102*a* and 102*b* to create a new pickup pattern for that microphone set (e.g., using appropriate beamforming techniques).

Also in embodiments, microphone sets from different microphone boards 104 may be grouped together as sub-arrays to produce one or more combined outputs for the array microphone 100. As an example, all of the microphone sets configured to cover the first octave (e.g., N) can be combined or aggregated, across multiple microphone boards 104, to create a sub-array for operating in that octave (e.g., using appropriate beamforming techniques), for example, as shown by Sub-array 1 in FIG. 7. As also shown in FIG. 7, the first plane 101 of the array microphone 100 may include four groups of microphone sets 134, 136, 138, and 140, and the microphone sets in each group 134, 136, 138, and 140 may be combined to create the octave-specific Sub-arrays 1, 2, 3, and 4, respectively. These sub-arrays (also referred to as "differential sub-arrays") may be further aggregated to create an overall output for the array microphone 100 that has an essentially constant beamwidth, for example.

More specifically, the first group of microphone sets 134 comprises the elements 124 from the first microphone elements 102*a* that are disposed along the first axis 115 to form the first sub-array for covering the first, or Nth, octave. The first group of microphone sets 134 further comprises the second microphone elements 102*b* that are added to duplicate the first sub-array along the second axes of the corresponding microphone boards 104. In each microphone set 134, the second microphone element 102*b* is disposed a first distance, D2, from the corresponding first microphone element 102*a*. Similarly, the second group of microphone sets 136 comprises the elements 126 from the first microphone elements 102*a* that are disposed along the first axis 115 to form the second sub-array for covering the second, or (N−1)th, octave. The second group of microphone sets 136 further comprises the second microphone elements 102*b* that are added to duplicate the second sub-array along the second axes 121 of the corresponding microphone boards 104. In each microphone set 136, the second microphone element 102*b* is disposed a second distance that is twice the first distance, D2, from the corresponding first microphone element 102*a*. Likewise, the third group of microphone sets 138 comprises the elements 128 from the first microphone elements 102*a* that are disposed along the first axis 115 to form the third sub-array for covering the third, or (N−2)th, octave. The third group of microphone sets 138 further comprises the second microphone elements 102*b* that are added to duplicate the third sub-array along the second axes 121 of the corresponding microphone boards 104. In each microphone set 138, the second microphone element 102*b* is disposed a third distance that is four times the first distance, D2, from the corresponding first microphone element 102*a*.

And lastly, the fourth group of microphone sets 140 comprises the elements 130 from the first microphone elements 102*a* that are disposed along the first axis 115 to form the fourth sub-array for covering the fourth, or (N−3)th, octave. The fourth group of microphone sets 140 further comprises the second microphone elements 102*b* that are added to duplicate the fourth sub-array along the second axes 121 of the corresponding microphone boards 104. In each microphone set 140, the second microphone element 102*b* is disposed a fourth distance that is about 6.67 times the first distance, D2, from the corresponding first microphone element 102*a*.

Thus, like the distances between adjacent first microphone elements 102*a* along the first axis 115, the distance between the microphone elements in a given differential pair are halved with each octave's worth of frequencies, or increased by double multiples (i.e. a factor of 2) with each decreasing octave, except for the very highest frequencies. In embodiments, the distance D2 between the first microphone element 102*a* and the second microphone element 102*b* in each of the first plurality of microphone sets 134 may be equal to a half wavelength of a desired frequency from the octave covered by the sets 134 (i.e. the Nth octave), for example, to create nulls at the desired frequency. The distance D2 may also be selected to optimize cardioid formation when combining the first microphone element 102*a* and the second microphone element 102*b* of a given microphone set to produce a combined output, as described below. In one example embodiment, the D2 distance is approximately 7.5 millimeters (mm) along the corresponding second axis 121.

As shown in FIG. 7, a number of the microphone boards 104 have two or more microphone sets that are co-located along the orthogonal axis 121 because they share the same first microphone element 102*a*. This arrangement is due, at least in part, to the harmonic nesting of the first microphone elements 102*a* along the first axis 115 and the coverage of multiple octaves by several of the first microphone elements 102*a*. More specifically, each first microphone element 102*a* that is configured to cover a number of frequency octaves may be duplicated by an equal number of second microphone elements 102*b* disposed at appropriate (e.g., frequency-dependent) distances along the same orthogonal axis 121 of the corresponding microphone board 104, thus creating the co-located microphone sets. In other words, the total number of second microphone elements 102*b* that may be located on the same orthogonal axis 121 (or in the first linear array 120) depends on the number of octaves covered by the first microphone element 102*a* in that linear array 120. As an example, in FIG. 7, the central microphone element 132 is included in all four sub-arrays and therefore, is used to cover all four octaves (e.g., N, N−1, N−2, and N−3). Accordingly, as shown in FIG. 7, the central microphone element 132 is paired with four different second microphone elements 102*b* in order to provide coverage for each of the four octaves. Conversely, as also shown in FIG. 7, each of the first microphone elements 102*a* disposed on the far sides of the first plane 101 is paired with only one of the second microphone elements 102*b* because those first microphone elements 102*a* are only used to cover one octave (e.g., N−3) and thus, are only included in one of the sub-arrays (e.g., Sub-array 4).

In embodiments, the plurality of microphone sets formed by the microphone elements 102 on each of the first plane 101 and the second plane 103 are arranged orthogonal to the first axis 115 (or along the second orthogonal axis 121 and the third orthogonal axis 123, respectively, as shown in FIG. 6) in order to maintain the linear array pattern created by the first microphone elements 102*a* along the first axis 115. For example, the first microphone elements 102*a* may constitute the primary array 118 of the array microphone 100 (e.g., as shown in FIG. 3B), and the second and third microphone elements 102*b* and 102*c* may be disposed in the array microphone 100 to form multiple secondary or differential arrays (e.g., the first and second linear arrays 120 and 122 shown in FIG. 6) that are arranged orthogonal to the primary array 118 along two different dimensions or axes. This multi-dimensional arrangement of the microphone elements 102 allows the array microphone 100 to have a relatively thin form factor while providing directionality anywhere within the plane 116 (or the YZ plane in FIG. 6), or anywhere within a sphere centered on the array, using appropriate beamforming techniques. In some cases, an overall length of the array microphone 100 may be largely determined by the dimensions of the primary array 118, or more specifically, the linear aperture size formed by the first microphone elements 102*a* and other physical characteristics of the first microphone elements 102*a*, as well as the amount of space (e.g., D1 or a multiple thereof) between adjacent first microphone elements 102*a* along the first axis 115.

Other dimensions of the array microphone 100 (e.g., an overall depth or a height/width along the axis 119) may be determined by the number of differential pairings included on the orthogonal axes 121 and 123 of the microphone boards 104 and the spacing between adjacent microphone elements along each orthogonal axis (e.g., as shown in FIG. 6). The exact number of differential pairings included in the array 100 may depend on the total number of octaves to be covered by the array microphone 100, which in turn may determine the distances between each layer, as described herein. In some cases, the number of differential pairings, or covered octaves, may be determined by physical limitations on a device housing for the array microphone 100 (e.g., a maximum depth or height of the housing 106). In the illustrated embodiments, the overall height and depth of the array microphone 100 may be determined by the size and shape of the microphone boards 104, a length or linear aperture size formed by each of the first and second linear arrays 120 and 122, the amount of space (e.g., D2 or a multiple thereof) between adjacent second microphone elements 102*b* along the second axis 121 and adjacent third microphone elements 102*c* along the third axis 123, and/or other physical characteristics of the microphone elements 102*b* and 102*c*. While the illustrated embodiments show four layers of differential pairs configured to provide added directivity for four different octaves (e.g., N, N−1, N−2, N−3), other embodiments may include more layers to cover more octaves, thus increasing the height and depth of the array 100, or fewer layers to cover fewer octaves, thus decreasing the array height and depth.

Figure 8:
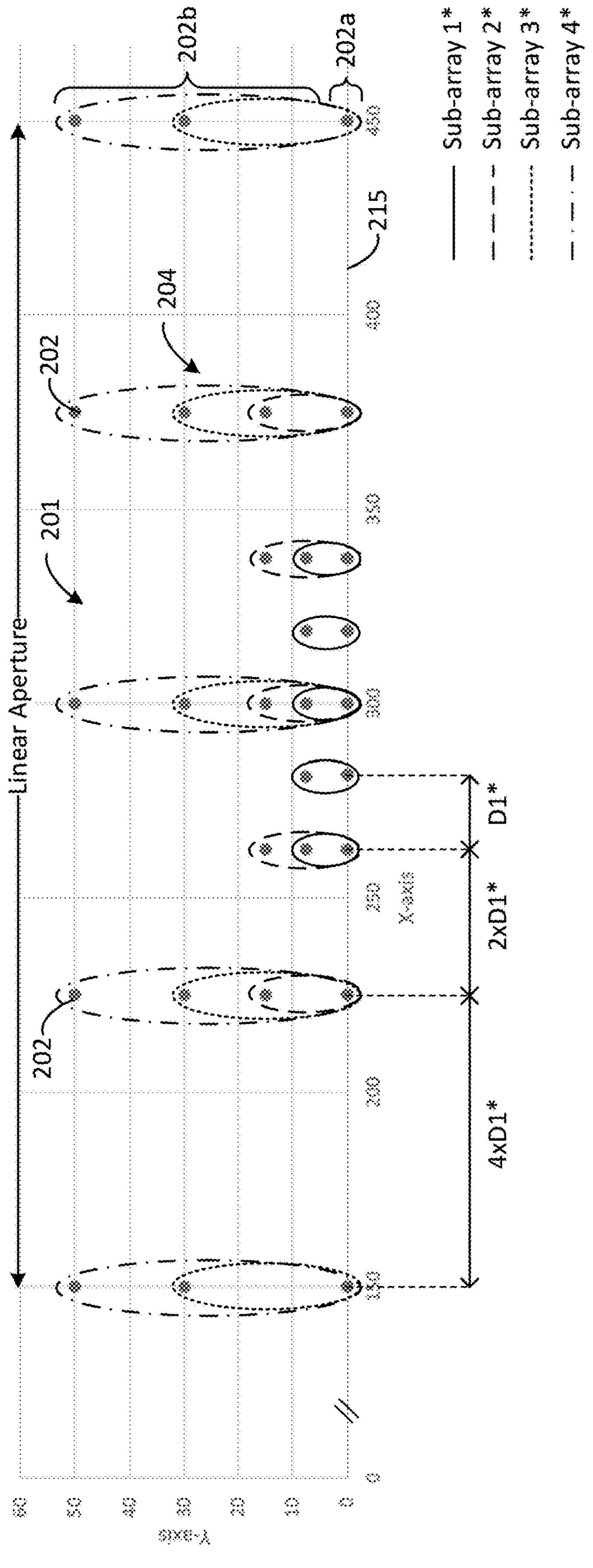
FIG. 8 is a schematic diagram of a first plane of another exemplary array microphone, in accordance with one or more embodiments.

To illustrate, FIG. 8 depicts a first plane 201, or portion, of another exemplary array microphone 200 that has a smaller aperture size but is otherwise configured to be substantially similar to the array microphone 100, in accordance with embodiments. As an example, the array microphone 200 may have a linear aperture size that is about half the size of the array microphone 100. In embodiments, the array microphone 200 may include fewer microphone boards 204 than the array microphone 100 (e.g., nine instead of eleven) in order to accommodate the smaller linear aperture size, using scalable geometry techniques described herein. For example, the microphone boards 204, and the microphone elements 202 included thereon, may be harmonically-nested like the microphone elements 102, by subdividing the linear aperture size into four harmonically nested sub-arrays of five microphone each. However, the smallest distance value, D1*, between first microphone elements 202*a* disposed along a common axis 215 of the array microphone 200 may be smaller than the distance value, D1, used for the array microphone 100. Moreover, because there are fewer microphone boards 204 overall, the fourth sub-array may be configured to completely overlap with the third sub-array, or be positioned on the same microphone boards 104, as shown in FIG. 8. In various embodiments, the array microphone 200 can maintain low frequency directionality with minimal performance loss (e.g., due to self-noise, etc.) despite the overlapping sub-arrays.

Figure 9:
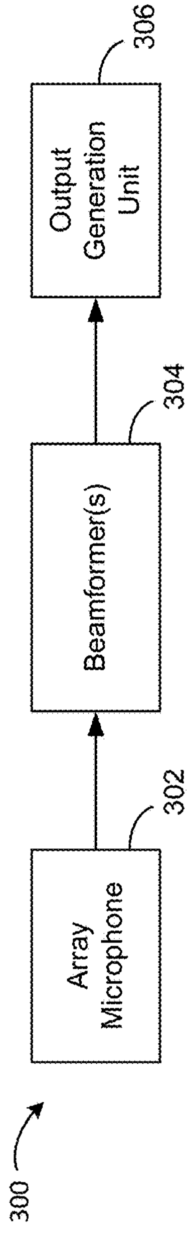
FIG. 9 is a block diagram of an exemplary audio system comprising an array microphone, in accordance with one or more embodiments.

FIG. 9 illustrates an exemplary audio system 300, in accordance with embodiments. The audio system 300 comprises an array microphone 302 similar to the array microphone 100 (or array microphone 200), a beamformer 304, and an output generation unit 306. The array microphone 302 may include the microphone boards 104 of the array microphone 100 shown in FIG. 1, and the microphone elements 102 included on each board 104, or other microphone designed in accordance with the techniques described herein. The beamformer 304 may be in communication with the array microphone 302 and may include one or more components to facilitate processing of audio signals received from the array microphone 302. The output generation unit 306 may be in communication with the beamformer 304 and may be used to process the output signals received from the beamformer 304 for output generation via, for example, loudspeaker, telecast, etc.

Various components of the audio system 300 may be implemented using software executable by one or more computers, such as a computing device with a processor and memory, and/or by hardware (e.g., discrete logic circuits, application specific integrated circuits (ASIC), programmable gate arrays (PGA), field programmable gate arrays (FPGA), etc.). For example, some or all components of the beamformer 304 may be implemented using discrete circuitry devices and/or using one or more processors (e.g., audio processor and/or digital signal processor) (not shown) executing program code stored in a memory (not shown), the program code being configured to carry out one or more processes or operations described herein. Thus, in embodiments, the audio system 300 may include one or more processors, memory devices, computing devices, and/or other hardware components not shown in FIG. 9. In a preferred embodiment, the system 300 includes at least two separate processors, one for consolidating and formatting the microphone elements and another for implementing DSP functionality.

The beamformer 304 may be used to apply appropriate beamforming techniques to the audio signals captured by the microphone elements of the array microphone 302 to create a desired pickup pattern, such as, e.g., a first-order polar-pattern (e.g., cardioid, super-cardioid, hypercardioid, etc.), and/or to steer the pattern to a desired angle, relative to the axis of the array, to obtain additional directionality. For example, in some embodiments, the beamformer 304 may be configured to combine audio signals captured by each microphone element disposed on a first or primary axis of the array microphone 302 to form a primary array output; combine the audio signals captured by the microphone elements one the first axis with those captured by the differential microphone elements correspondingly disposed on different orthogonal axes of the array microphone 302 to form outputs for each differential pair; for each orthogonal plane of the array microphone 302, combine the differential pair outputs for that plane to form octave-specific sub-array outputs; combine the sub-array outputs for each orthogonal plane to create a linear array output with a first-order polar pattern (such as, e.g., a cardioid pickup pattern) directed along an axis in that plane; combine the linear array outputs for the two orthogonal planes to generate a directional output steered to any direction or angle within a plane that is perpendicular to the first axis of the array; and combine one or more of the linear array outputs with the primary array output to generate a directional output steered to any direction or angle about a sphere centered around a center of the array. The beamformer 304 may be configured to use any appropriate beamforming algorithm to combine the received audio signals and generate the steered output, including, for example, delay and sum techniques, weight and sum techniques, sum and difference techniques, filter and sum techniques, minimum variance distortionless response ("MVDR") techniques, first-order differential techniques, or any combination thereof.

Figure 10:
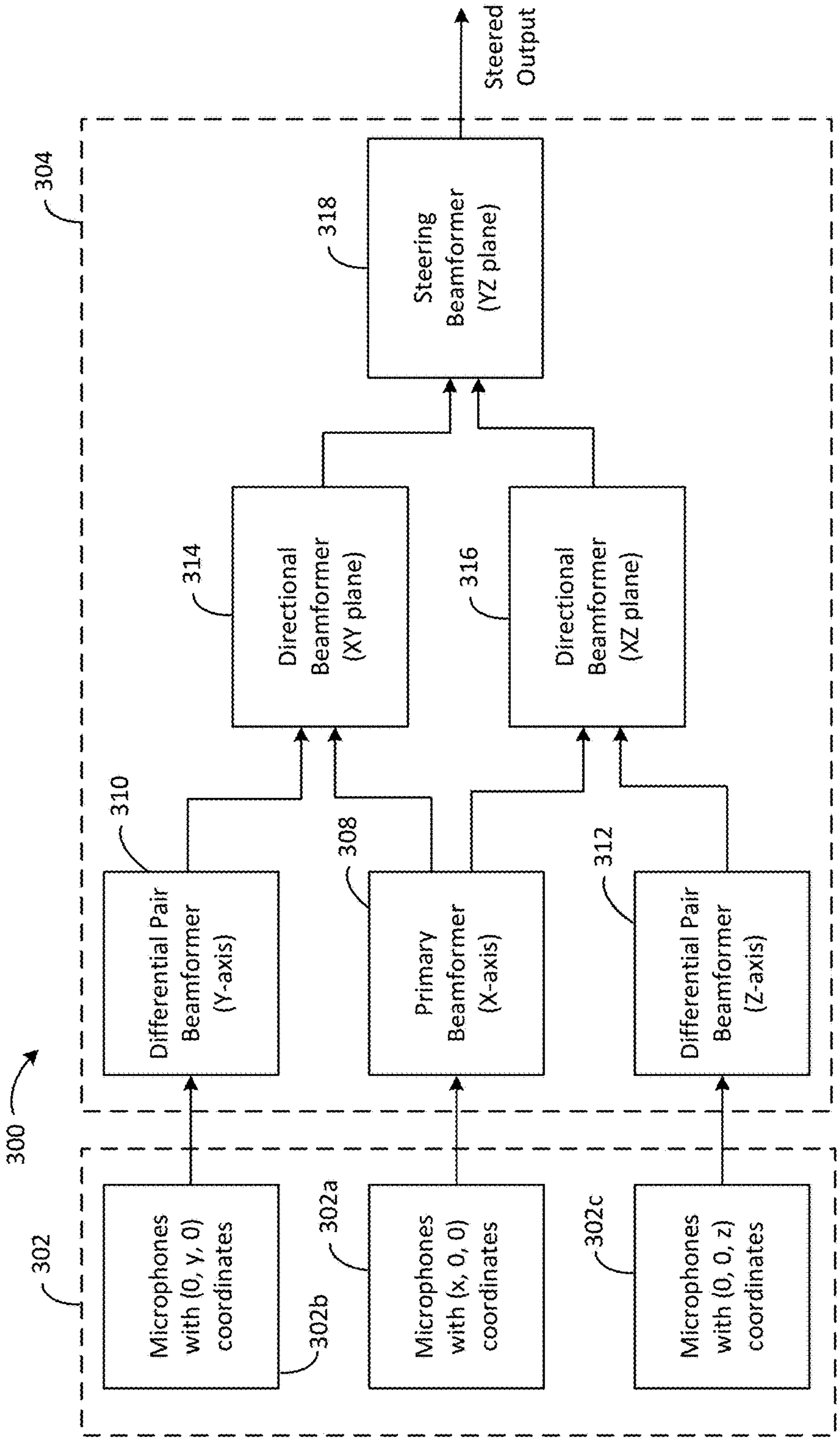
FIG. 10 is a block diagram of the array microphone and beamformer included in the audio system of FIG. 9, in accordance with embodiments.

FIG. 10 shows the array microphone 302 and the beamformer 304 of the audio system 300 in more detail. For ease of explanation, the array microphone 302 will be described with reference to the XYZ axes, or assuming that the array microphone 302 has been situated in alignment with the XYZ axes, for example, by aligning the centers 114 of the microphone boards 104 with the X axis and aligning the sides 112 and 110 of the boards 104 with the Y and Z axes, respectively (e.g., as shown in FIGS. 6 and 7). The Y axes may coincide with a first plane (e.g., first plane 101) of the array microphone 302 that is orthogonal to the first axis, while the Z axes may coincide with a second plane (e.g., second plane 103) of the array microphone 302 that is orthogonal to both the first axis and the first plane.

As shown, the array microphone 302 comprises a plurality of first microphone elements 302*a* disposed along a primary or first axis that is aligned with the X axis, such that the coordinates for each first microphone element 302*a* have a zero value along both the Y and Z axes (e.g., similar to the first microphone elements 102*a* disposed on the first axis 115 shown in FIG. 3B). In addition, the array microphone 302 comprises a plurality of second microphone elements 302*b* disposed on second axes that are aligned with the Y axes of the microphone boards, such that the coordinates for each second microphone element 302*b* have a zero value along both the X and Z axes of its respective microphone board (e.g., similar to the second microphone elements 102*b* disposed on the Y axis in FIG. 6). As shown, the array microphone 302 also comprises a plurality of third microphone elements 302*c* disposed on third axes that are aligned with the Z axes of the microphone boards, such that the coordinates for each third microphone element 302*c* have a zero value along both the X and Y axes of its respective microphone board (e.g., similar to the third microphone elements 102*c* disposed on the Z axis in FIG. 6). In embodiments, the second microphone elements 302*b* may be arranged to form a mirror image of the third microphone elements 302*c*, so that the Y values for the second microphone elements 302*b* on a given microphone board have the same numeric value as the Z values for the third microphone elements 302*c* correspondingly arranged on the same microphone board (e.g., as shown in FIG. 3A).

According to embodiments, the beamformer 304 may comprise a plurality of individual beamformers, or beamforming components, configured to combine the audio signals received from the array microphone 302 and generate a steered output that is directed towards a desired audio source (e.g., sound source 113 in FIGS. 5A and 5B) and/or generates nulls in selected locations. In some embodiments, the various beamforming components may be in communication with each other, for example, in order to provide the output of one beamforming component as the input to another beamforming component. In some embodiments, though not shown, the beamformer 304 includes multiple instances of a given beamforming component, for example, in order to tailor that component to the specific characteristics of the microphone elements, or sub-arrays, coupled thereto (e.g., microphone separation distance, covered frequency octave, etc.). Other beamforming techniques or combinations thereof may also be performed by the beamformer 304 to provide a desired output.

As shown, the beamformer 304 comprises a primary beamforming component 308 configured to receive the audio signals captured by the first microphone elements 302*a* and combine those signals to generate primary sub-array outputs for the primary array formed along the X axis (e.g., primary array 118 of FIG. 3B). The primary beamforming component 308 (or "primary beamformer") can be configured to generate an octave-specific output for each of the harmonically-nested sub-arrays formed by the primary array. The primary beamformer 308 can also be configured to combine the primary sub-array outputs to generate a primary array output that has a first-order polar pattern directed along an axis of the array. For example, the primary array output may be directed in either direction along the axis 119 in FIG. 3A. As will be appreciated, the polar pattern of the primary array output may be omnidirectional in the YZ plane. In embodiments, the primary beamformer 308 may be configured to generate these primary sub-array outputs using one or more beamforming algorithms, such as, e.g., delay and sum techniques, filter and sum techniques, delay and difference techniques, magnitude shading techniques, and minimum variance distortionless response ("MVDR") techniques.

The beamformer 304 also comprises two differential pair beamforming components 310 and 312, one for each orthogonal axis of the microphone boards included in the array microphone 302. More specifically, a first differential pair beamforming component 310 (or "first differential beamformer") can be configured to combine the audio signals captured by each differential pair included on the Y axis of each microphone board. Similarly, a second differential pair beamforming component 312 (or "first differential beamformer") may be configured to combine the audio signals captured by each differential pair included on the Z axis of each microphone board. Each differential beamformer 310 and 312 may generate one or more differential pair outputs for each microphone board depending on the number of differential pairs included thereon. For example, for the central microphone board 104*a* shown in FIG. 3A, a total of four differential outputs may be generated by each of the differential beamformers 310 and 312, corresponding to the four differential pairs formed along each of the Y and Z axes. Conversely, each of the other microphone boards 104*b* and 104*c* may have one to three differential pair outputs per axis.

According to embodiments, the first differential beamformer 310 can be further configured to combine the Y axis differential pair outputs generated across the plurality of microphone boards to create an octave-specific output for each of the harmonically-nested sub-arrays formed by the boards within the first orthogonal plane. Similarly, the second differential beamformer 312 can be further configured to combine the Z axis differential pair outputs generated across the plurality of microphone boards to create an octave-specific output for each of the harmonically-nested sub-arrays formed by the boards within the second orthogonal plane. That is, each sub-array output generated by the differential beamformers 310 and 312 may be configured to cover a specific octave of the covered frequency bands. In embodiments, the differential beamformers 310 and 312 may be configured to generate these differential sub-array outputs using one or more beamforming algorithms, such as, e.g., delay and sum techniques, filter and sum techniques, delay and difference techniques, magnitude shading techniques, and minimum variance distortionless response ("MVDR") techniques.

The beamformer 304 further comprises two directional beamformers 314 and 316 configured to combine the primary sub-array outputs generated by the primary beamformer 308 with corresponding differential sub-array outputs generated by each of the differential beamformers 310 and 312 to create a linear array output for each orthogonal plane of the array microphone 302. In particular, a first directional beamformer 314 can be configured to combine the primary sub-array outputs with corresponding Y axis differential sub-array outputs provided by the first differential beamformer 310. For example, each primary sub-array output may be combined with the Y axis sub-array output that corresponds to the same octave. Similarly, a second directional beamformer 316 can be configured to combine the primary sub-array outputs with corresponding Z axis differential sub-array outputs provided by the second differential beamformer 312. For example, each primary sub-array output may be combined with the Z axis sub-array output that corresponds to the same octave. The linear array output generated by the first directional beamformer 314 may have a first-order polar pattern directed along a Y axis of the first orthogonal plane (e.g., the XY plane), while the linear array output generated by the second directional beamformer 316 may have a first-order polar pattern directed along a Z axis of the second orthogonal plane (e.g., the XZ plane). In embodiments, the directional beamformers 314 and 316 can be configured to use any appropriate beamforming algorithm for pattern formation and/or to create the various sub-array outputs, including, for example, sum and difference techniques (e.g., as shown in FIG. 11), first-order differential combining techniques (e.g., as shown in FIG. 12), or any combination thereof.

As shown, the beamformer 304 also comprises a steering beamforming component 318 configured to combine the linear array outputs received from the first and second directional beamformers 314 and 316 to generate a steered output. In embodiments, the steering beamforming component 318 (or "steering beamformer") can be configured to provide additional control of the array output around the axis of the array, or transverse to the array axis. For example, due to the multi-dimensional placement and harmonic nesting of the microphone elements 302*a*, 302*b*, and 302*c*, the steering beamformer 318 can be configured to create a directional output that can have any first-order pattern (e.g., cardioid, toroid, etc.) and can be steered to any direction within a plane (e.g., the YZ plane) that is perpendicular to the first axis. The steering beamformer 318 also receives the primary array output from the primary beamformer 308 and can be configured to combine the primary array output with the directional outputs from the beamformers 314 and 316 to generate a directional output steered to any angle relative to the axis of the array (e.g., the X axis), or to any direction at any azimuth or elevation about a sphere centered around the center of the array. The steering beamformer 318 may include a combiner or the like for combining together the various outputs to generate a steered directional output for the overall array microphone 302. In embodiments, the steering beamformer 318 may be configured to use any appropriate beamforming algorithm to combine the two directional outputs, including, for example, weight and sum (or magnitude and summation) techniques, filter and sum techniques, and differential techniques.

Thus, the beamformer 304 can be configured to apply array processing techniques (e.g., beamformers 308, 310, and 312), coupled with secondary beamforming processing techniques (e.g., beamformers 314 and 316), and a tertiary beamforming step of magnitude and summation techniques to provide greater control of the array, or the audio pick-up lobe with highest sensitivity. In embodiments, the beamformer 304 may be agnostic to the order in which its components operate due to the linear independence of the three beamforming steps. For example, because the microphone elements within the array microphone 302 are disposed on different axes, the audio signals captured by those elements can be processed along any one of the axes in any order. Thus, while FIG. 10 shows the components of the beamformer 304 arranged in a specific order, in other embodiments, one or more components of the beamformer 304 may be positioned differently or performed in a different order. For example, in some embodiments, the differential beamformers 310 and 312 and the primary beamformer 308 may be performed at the end, e.g., after operation of the directional beamformers 314 and 316 and the steering beamformer 318.

Figure 11:
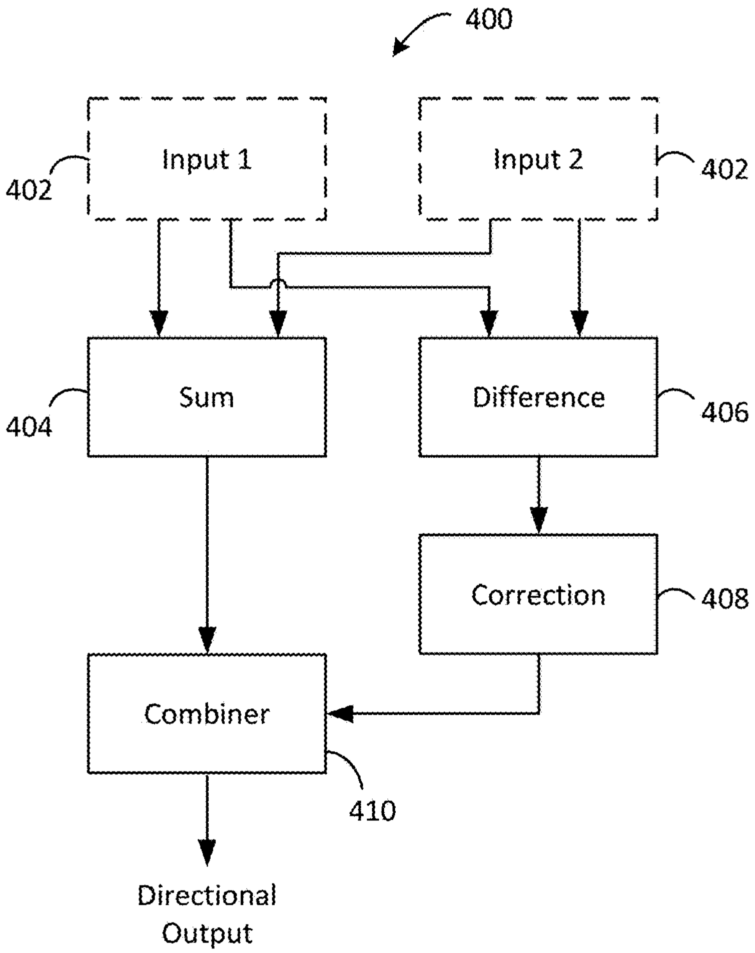
FIG. 11 is a block diagram of an exemplary sum and difference beamformer included in the beamformer of FIG. 10, in accordance with embodiments.
Figure 12:
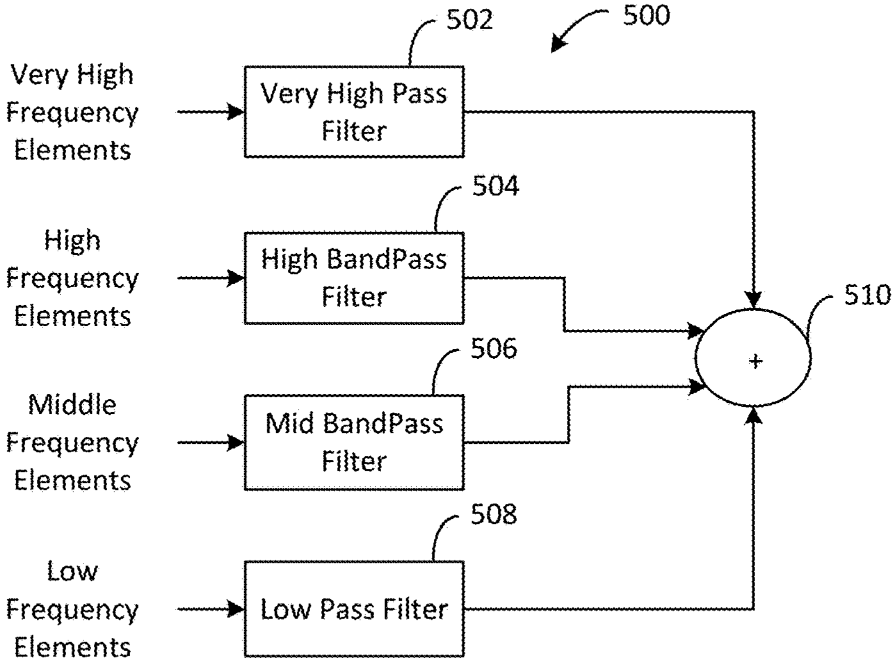
FIG. 12 is a block diagram of an exemplary pattern-forming beamformer included in the beamformer of FIG. 10, in accordance with embodiments.

FIG. 11 illustrates an exemplary sum and difference beamformer 400 that may be used to implement all or part of any one of the beamformers 310, 312, 314, and 316 in FIG. 10, in accordance with embodiments. In general, the beamformer 400 can be configured to combine first and second audio inputs 402 using appropriate sum and difference beamforming techniques to generate a combined audio output signal that has a directional polar pattern.

In some embodiments, the audio inputs 402 may be the audio signals captured by the differential pairs located on each microphone board of the array microphone 302, and the beamformer 400 may be used to combine each differential pair to form cardioid elements with narrowed lobes (or sound pick-up patterns), for example, as compared to the full omnidirectional polar pattern of the individual microphone elements of the array microphone 302. For example, the first audio input 402 may include the audio signals captured by the first microphone element 302*a* on each microphone board and the second audio input 402 may include the audio signals captured by one of the second microphone elements 302*b* arranged on the first orthogonal axis of the same microphone board, or one of the third microphone elements 302*c* arranged on the second orthogonal axis of the same microphone board.

In other embodiments, the audio inputs 402 may include sub-array outputs received from the primary beamformer 308 and one of the differential beamformers 310 and 312 to cover the same covered octave. In such cases, the beamformer 400 may be configured to use sum and difference beamforming techniques to combine the sub-array outputs to form a directional output that is specific to the frequency octave covered by the inputs 402 and constitutes a first-order pattern within the corresponding orthogonal plane of the array microphone 302. For example, the first audio input 402 may include one of the primary sub-array outputs received from the primary beamformer 308, and the second audio input 402 may include a differential sub-array output corresponding to the same octave as the first audio input 402 and received from one of the differential beamformers 310 and 312. The exact beamforming technique used to combine the sub-array signals may vary depending on how the corresponding sub-array is formed, or how the microphone elements are arranged within that sub-array (e.g., linear array, orthogonal array, broadside array, endfire array, etc.). For example, audio signals received from microphone elements arranged in a linear or broadside array may be summed together to generate the sub-array signal. Other techniques may be used for other types of sub-arrays.

As shown in FIG. 4, the first and second audio inputs 402 are provided to a summation component 404 of the beamformer 400, as well as a difference component 406 of the same. The summation component 404 may be configured to calculate a sum of the first and second audio signals (e.g., Input 1+Input 2) to generate a combined or summed output for the pair of audio inputs 402. The difference component 406 may be configured to subtract the second audio signal from the first audio signal (e.g., Input 1−Input 2) to generate a differential signal or output for the first and second audio inputs 402. As an example, the summation component 404 may include one or more adders or other summation elements, and the difference component 406 may include one or more invert-and-sum elements.

As also shown, beamformer 400 further includes a correction component 408 for correcting the differential output generated by the difference component 406. The correction component 408 may be configured to correct the differential output for a gradient response caused by the difference calculation. For example, the gradient response may give a 6 dB per octave slope to the frequency response of the audio inputs 402. In order to generate a first-order polar pattern (e.g., cardioid) for the pair of audio inputs 402 over a broad frequency range, the differential output must be corrected so that it has the same magnitude as the summation output. In a preferred embodiment, the correction component 408 applies a correction value of $(c*d)/(j*\omega)$ to the difference output to obtain a corrected difference output for the two audio inputs 402 (e.g., $(\text{Mic }1-\text{Mic }2)*((c*d)/(j*\omega)))$), where c equals the speed of sound in air at 20 degrees Celsius, d equals the distance between the first and second microphones (e.g., D2 or a multiple thereof), and ω equals the angular frequency. In some cases, a second magnitude correction may be performed to match the sensitivity of the difference component to that of the summation component.

The beamformer 400 also includes a combiner 410 configured to combine, or sum, together the summed output generated by the summation component 404 and the corrected difference output generated by the correction component 408. The combiner 410 thus generates a combined output signal with directional polar pattern (e.g., cardioid) for the pair of audio inputs 402, as shown in FIG. 4.

FIG. 12 illustrates an exemplary pattern-forming beamformer 500 that may be used to implement all or part of any of the beamformers 308, 310, 312, 314, and 316 shown in FIG. 10, in accordance with embodiments. The beamformer 500 may be configured to combine outputs from the harmonically-nested microphone elements 302*a*, 302*b*, and 302*c* to form cardioid outputs, or other directional outputs with a first-order polar pattern. For example, the beamformer 500 may receive outputs from respective nests or sub-arrays formed along one or more axes of the array microphone 302. In some embodiments, the beamformer 500 may be included in each of the beamformers 314 and 316 and used to combine sub-array outputs received from the primary beamformer 308 and the corresponding differential beamformer 310 or 312, so as to create a first-order directional output for each orthogonal plane of the array microphone 302.

In embodiments, the beamformer 500 can be configured to use cross-over filtering techniques to create the first-order polar patterns. As shown, the beamformer 500 comprises a plurality of filters 502, 504, 506, and 508 and each filter is configured to receive audio signals from a different set of microphone elements. In particular, a very high pass filter 502 is configured to receive audio signals from microphone elements, or sub-arrays, that are configured to cover very high frequencies (e.g., greater than about 4 kHz). A high frequency bandpass filter 504 is configured to receive audio signals from microphone elements, or sub-arrays, that are configured to cover high frequencies (e.g., about 2 kHz to about 4 kHz). A mid frequency bandpass filter 506 is configured to receive audio signals from microphone elements, or sub-arrays, that are configured to cover middle or mid-range frequencies (e.g., about 1 kHz to about 2 kHz). And a low pass filter 508 is configured to receive audio signals from microphone elements, or sub-arrays, that are configured to cover low frequencies (e.g., less than about 1 kHz). The cut-off frequencies for the filters 502, 504, 506, and 508 may be selected based on the specific frequency response characteristics of the corresponding set of microphone elements, including, for example, location of frequency nulls, a desired frequency response for the microphone array, etc.

In various embodiments, the filters 502, 504, 506, and 508 may be analog or digital filters (e.g., digital finite impulse response (FIR) filters on a digital signal processor (DSP), or the like). While FIG. 12 shows four filters, in other embodiments, the beamformer 500 may include more or fewer filters. In still other embodiments, the beamformer 500 may be configured to include a different combination of filters, such as, e.g., multiple bandpass filters, or any other combination.

As shown, the filtered outputs of the filters 502, 504, 506, and 508 may be provided to a summation element 510 of the beamformer 500. The summation element 510 may be configured to combine or sum the filtered outputs to generate a combined output signal that may represent a cardioid output for the input microphone elements or other first-order polar pattern.

Thus, the techniques described herein provide an array microphone with improved directivity transverse to the axis of the array, thus providing a larger level of control with regards to where the array is most effective at collecting sound, and a geometry that is designed to allow for minimal diffraction and resonance. For example, the structure of the array microphone is broken up into separate unit cells (or microphone boards) in order to use a minimum amount of interfering material (e.g., PCB substrate) while still placing the microphone elements in a multi-dimensional formation. Moreover, due to the microphone arrangement and overall geometry of the array microphone, the main lobe, or beam with greatest sensitivity, can be placed in any direction within a plane that is perpendicular to the axis of the array. In some cases, the array microphone described herein can be used to simultaneously generate a plurality of individual audio channels, each tailored to capture a particular talker or audio source, while removing room noise, other talker noise, and other unwanted sounds. For example, the array microphone can be used for stage or live music reinforcement to provide selective coverage of the stage or audience, or in live sports environments to isolate ambience from game audio. Thus, the array microphone can provide not only improved directivity with wideband audio application (e.g., 20 Hz≤f≤20 kHz), but also improved signal to noise ratio (SNR) and acoustic echo cancellation (AEC) properties. The techniques described herein also provide an array microphone with greater flexibility, e.g., compared to existing linear arrays, that allows for expanded functionality. For example, the pattern formation techniques described herein may enable the array microphone to be used as a mid-side stereo array, or for mid-side stereo generation that is highly directional and could improve spatialization in simple two-channel recordings (e.g., with the addition of elevation information). As another example, the array geometry described herein may allow for first-order ambisonic collection, with only minor alteration to the signal flow. In some cases, the techniques described herein can be used for integrated or UC devices to minimize coupling between transmit and receive acoustic systems.

Referring back to FIG. 9, in various embodiments, the audio system 300 may also include various components that are not shown in FIG. 9, such as, for example, one or more loudspeakers, display screens, computing devices, and/or cameras. In addition, one or more of the components in the system 300 may include one or more digital signal processors or other processing components, controllers, wireless receivers, wireless transceivers, etc., though not shown or mentioned above. It should be understood that the components shown in FIG. 9 are merely exemplary, and that any number, type, and placement of the various components in the system 300 are contemplated and possible.

One or more components of the audio system 300 may be in wired or wireless communication with one or more other components of the system 300. For example, the array microphone 302 may transmit the plurality of audio signals to the beamformer 304, the output generation unit 306, a separate audio processor (not shown), or a computing device comprising one or more of the same, using a wired or wireless connection. In some embodiments, one or more components of the audio system 300 may communicate with one or more other components of the system 300 via a suitable application programming interface (API). For example, one or more APIs may enable components of the audio processor to transmit audio and/or data signals between themselves.

In some embodiments, one or more components of the audio system 300 may be combined into, or reside in, a single unit or device. For example, all of the components of the audio system 300 may be included in the same device, such as the microphone 302, or a computing device that includes the microphone 302. As another example, the output generation unit 306 may be included in, or combined with, the beamformer 304 and/or with the microphone 302. In some embodiments, the audio system 300 may take the form of a cloud based system or other distributed system, such that the components of the system 300 may or may not be physically located in proximity to each other.

The components of the audio system 300 may be implemented in hardware (e.g., discrete logic circuits, application specific integrated circuits (ASIC), programmable gate arrays (PGA), field programmable gate arrays (FPGA), digital signal processors (DSP), microprocessor, etc.), using software executable by one or more servers or computers, or other computing device having a processor and memory (e.g., a personal computer (PC), a laptop, a tablet, a mobile device, a smart device, thin client, etc.), or through a combination of both hardware and software. For example, some or all components of the microphone 302, the beamformer 304, and/or the output generation unit 306 may be implemented using discrete circuitry devices and/or using one or more processors (e.g., audio processor and/or digital signal processor) executing program code stored in a memory (not shown), the program code being configured to carry out one or more processes or operations described herein. Thus, in embodiments, one or more of the components of the audio system 300 may include one or more processors, memory devices, computing devices, and/or other hardware components not shown in the figures.

All or portions of the processes described herein may be performed by one or more processing devices or processors (e.g., analog to digital converters, encryption chips, etc.) that are within or external to the audio system 300 of FIG. 9. In addition, one or more other types of components (e.g., memory, input and/or output devices, transmitters, receivers, buffers, drivers, discrete components, logic circuits, etc.) may also be used in conjunction with the processors and/or other processing components to perform any, some, or all of the steps of any methods or processes described herein. As an example, in some embodiments, each of the methods described herein may be carried out by a processor executing software stored in a memory. The software may include, for example, program code or computer program modules comprising software instructions executable by the processor. In some embodiments, the program code may be a computer program stored on a non-transitory computer readable medium that is executable by a processor of the relevant device.

Any of the processors described herein may include a general purpose processor (e.g., a microprocessor) and/or a special purpose processor (e.g., an audio processor, a digital signal processor, etc.). In some examples, the processor(s) described herein may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

Any of the memories or memory devices described herein may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory described herein includes multiple kinds of memory, particularly volatile memory and non-volatile memory.

Moreover, any of the memories described herein may be computer readable media on which one or more sets of instructions can be embedded. The instructions may reside completely, or at least partially, within any one or more of the memory, the computer readable medium, and/or within one or more processors during execution of the instructions. In some embodiments, the memory described herein may include one or more data storage devices configured for implementation of a persistent storage for data that needs to be stored and recalled by the end user. In such cases, the data storage device(s) may save data in flash memory or other memory devices. In some embodiments, the data storage device(s) can be implemented using, for example, SQLite data base, UnQLite, Berkeley DB, BangDB, or the like.

Any of the computing devices described herein can be any generic computing device comprising at least one processor and a memory device. In some embodiments, the computing device may be a standalone computing device included in the audio system 300, or may reside in another component of the audio system 300, such as, e.g., the microphone 302, the beamformer 304, or the output generation unit 306. In such embodiments, the computing device may be physically located in and/or dedicated to the given environment or room, such as, e.g., the same environment in which the microphone 302 is located. In other embodiments, the computing device may not be physically located in proximity to the microphone 302 but may reside in an external network, such as a cloud computing network, or may be otherwise distributed in a cloud-based environment. Moreover, in some embodiments, the computing device may be implemented with firmware or completely software-based as part of a network, which may be accessed or otherwise communicated with via another device, including other computing devices, such as, e.g., desktops, laptops, mobile devices, tablets, smart devices, etc. Thus, the term "computing device" should be understood to include distributed systems and devices (such as those based on the cloud), as well as software, firmware, and other components configured to carry out one or more of the functions described herein. Further, one or more features of the computing device may be physically remote and may be communicatively coupled to the computing device.

In some embodiments, any of the computing devices described herein may include one or more components configured to facilitate a conference call, meeting, classroom, or other event and/or process audio signals associated therewith to improve an audio quality of the event. For example, in various embodiments, any computing device described herein may comprise a digital signal processor ("DSP") configured to process the audio signals received from the various microphones or other audio sources using, for example, automatic mixing, matrix mixing, delay, compressor, parametric equalizer ("PEQ") functionalities, acoustic echo cancellation, and more. In other embodiments, the DSP may be a standalone device operatively coupled or connected to the computing device using a wired or wireless connection. One exemplary embodiment of the DSP, when implemented in hardware, is the P300 IntelliMix Audio Conferencing Processor from SHURE, the user manual for which is incorporated by reference in its entirety herein. As further explained in the P300 manual, this audio conferencing processor includes algorithms optimized for audio/video conferencing applications and for providing a high quality audio experience, including eight channels of acoustic echo cancellation, noise reduction and automatic gain control. Another exemplary embodiment of the DSP, when implemented in software, is the IntelliMix Room from SHURE, the user guide for which is incorporated by reference in its entirety herein. As further explained in the IntelliMix Room user guide, this DSP software is configured to optimize the performance of networked microphones with audio and video conferencing software and is designed to run on the same computer as the conferencing software. In other embodiments, other types of audio processors, digital signal processors, and/or DSP software components may be used to carry out one or more of audio processing techniques described herein, as will be appreciated.

Moreover, any of the computing devices described herein may also comprise various other software modules or applications (not shown) configured to facilitate and/or control the conferencing event, such as, for example, internal or proprietary conferencing software and/or third-party conferencing software (e.g., Microsoft Skype, Microsoft Teams, Bluejeans, Cisco WebEx, GoToMeeting, Zoom, Join.me, etc.). Such software applications may be stored in the memory of the computing device and/or may be stored on a remote server (e.g., on premises or as part of a cloud computing network) and accessed by the computing device via a network connection. Some software applications may be configured as a distributed cloud-based software with one or more portions of the application residing in the computing device and one or more other portions residing in a cloud computing network. One or more of the software applications may reside in an external network, such as a cloud computing network. In some embodiments, access to one or more of the software applications may be via a web-portal architecture, or otherwise provided as Software as a Service (SaaS).

In general, a computer program product in accordance with embodiments described herein includes a computer usable storage medium (e.g., standard random access memory (RAM), an optical disc, a universal serial bus (USB) drive, or the like) having computer-readable program code embodied therein, wherein the computer-readable program code is adapted to be executed by a processor (e.g., working in connection with an operating system) to implement the methods described herein. In this regard, the program code may be implemented in any desired language, and may be implemented as machine code, assembly code, byte code, interpretable source code or the like (e.g., via C, C++, Java, ActionScript, Python, Objective-C, JavaScript, CSS, XML, and/or others). In some embodiments, the program code may be a computer program stored on a non-transitory computer readable medium that is executable by a processor of the relevant device.

The terms “non-transitory computer-readable medium” and “computer-readable medium” include a single medium or multiple media, such as a centralized or distributed database, and/or associated caches and servers that store one or more sets of instructions. Further, the terms “non-transitory computer-readable medium” and “computer-readable medium” include any tangible medium that is capable of storing, encoding, or carrying a set of instructions for execution by a processor or that cause a system to perform any one or more of the methods or operations disclosed herein. As used herein, the term “computer readable medium” is expressly defined to include any type of computer readable storage device and/or storage disk and to exclude propagating signals.

Any process descriptions or blocks in the figures should be understood as representing modules, segments, or portions of code that include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be noted that in the description and drawings, like or substantially similar elements may be labeled with the same reference numerals. However, sometimes these elements may be labeled with differing numbers, such as, for example, in cases where such labeling facilitates a more clear description. In addition, system components can be variously arranged, as is known in the art. Also, the drawings set forth herein are not necessarily drawn to scale, and in some instances, proportions may be exaggerated to more clearly depict certain features and/or related elements may be omitted to emphasize and clearly illustrate the novel features described herein. Such labeling and drawing practices do not necessarily implicate an underlying substantive purpose. The above description is intended to be taken as a whole and interpreted in accordance with the principles taught herein and understood to one of ordinary skill in the art.

In this disclosure, the use of the disjunctive is intended to include the conjunctive. The use of definite or indefinite articles is not intended to indicate cardinality. In particular, a reference to “the” object or “a” and “an” object is intended to also denote one of a possible plurality of such objects.

This disclosure describes, illustrates, and exemplifies one or more particular embodiments of the invention in accordance with its principles. The disclosure is intended to explain how to fashion and use various embodiments in accordance with the technology rather than to limit the true, intended, and fair scope and spirit thereof. That is, the foregoing description is not intended to be exhaustive or to be limited to the precise forms disclosed herein, but rather to explain and teach the principles of the invention in such a way as to enable one of ordinary skill in the art to understand these principles and, with that understanding, be able to apply them to practice not only the embodiments described herein, but also other embodiments that may come to mind in accordance with these principles. The embodiment(s) provided herein were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally, and equitably entitled.

What is claimed is:

1. An array microphone, comprising:

a plurality of microphone boards arranged in a linear pattern along a first axis and comprising a plurality of microphone elements configured to cover a plurality of frequency bands, each microphone board comprising:

a first linear array comprising a first microphone element of the plurality of microphone elements and one or more second microphone elements of the plurality of microphone elements, the first microphone element located on the first axis and the one or more second microphone elements located on a second axis orthogonal to the first axis, and a second linear array comprising the first microphone element and one or more third microphone elements of the plurality of microphone elements, the one or more third microphone elements located on a third axis orthogonal to the first axis and to the second axis.

2. The array microphone of claim 1, wherein the linear pattern is configured to place the microphone boards in a harmonically-nested configuration for covering the plurality of frequency bands.

3. The array microphone of claim 1, wherein the microphone boards are arranged substantially parallel to each other to form the linear pattern.

4. The array microphone of claim 1, wherein the linear pattern is configured such that the plurality of microphone boards comprises a central microphone board, a first group of microphone boards arranged on one side of the central microphone board in a first pattern, and a second group of microphone boards arranged on an opposite side of the central microphone board in a second pattern that is a mirror image of the first pattern.

5. The array microphone of claim 1, wherein a distance between adjacent microphone boards along the first axis is configured based on a linear aperture size of the array microphone.

6. The array microphone of claim 1, wherein a distance between adjacent microphone boards along the first axis is configured based on a frequency value included in the plurality of frequency bands.

7. The array microphone of claim 1, wherein for each microphone board, the second linear array is a mirror image of the first linear array.

8. The array microphone of claim 1, wherein on each microphone board, a distance along the second axis between the first microphone element and each of the one or more second microphone elements is configured based on respective octaves of the plurality of frequency bands, and a distance along the third axis between the first microphone element and each of the one or more third microphone elements is respectively configured based on the same octaves.

9. The array microphone of claim 1, wherein the plurality of microphone elements are configured to form, across the plurality of microphone boards, a first sub-array for covering a first octave of the plurality of frequency bands and a second sub-array for covering a second octave of the plurality of frequency bands, the first sub-array being nested within the second sub-array.

10. The array microphone of claim 9, wherein the first microphone elements in the first sub-array are separated by a first distance along the first axis, and the first microphone elements in the second sub-array are separated by a second distance along the first axis that is twice the first distance, such that the first sub-array and the second sub-array are harmonically nested.

11. The array microphone of claim 1, wherein each microphone board is a printed circuit board configured to form a triangular shape.

12. The array microphone of claim 1, further comprising a housing configured to enclose the plurality of microphone boards.

13. The array microphone of claim 1, wherein each of the plurality of microphone elements is a micro-electrical-mechanical-system (MEMS) microphone.

14. An array microphone, comprising:

a plurality of microphone boards arranged in a first linear pattern along a first axis of the array microphone, the plurality of microphone boards comprising a plurality of microphone elements configured to cover a plurality of frequency bands, each microphone board comprising:

a first microphone element of the plurality of microphone elements located on the first axis;

one or more second microphone elements of the plurality of microphone elements located on a second axis of the microphone board, the second axis being orthogonal to the first axis; and one or more third microphone elements of the plurality of microphone elements located on a third axis of the microphone board, the third axis being orthogonal to the first axis and to the second axis, wherein the first microphone elements of the plurality of microphone boards are configured to form the first linear pattern along the first axis, and for each microphone board, the first microphone element and the one or more second microphone elements are configured to form a second linear pattern along the second axis of the corresponding microphone board, and the first microphone element and the one or more third microphone elements are configured to form the second linear pattern along the third axis of the corresponding microphone board.

15. The array microphone of claim 14, wherein the first linear pattern is configured to place the microphone boards in a harmonically-nested configuration for covering the plurality of frequency bands.

* * * * *